July 31, 1934.  E. A. HOLMGREN  1,968,146

MACHINE FOR SHAPING SHOE UPPERS

Filed April 1, 1932  13 Sheets-Sheet 1

INVENTOR
Eric A. Holmgren
By his Attorney
Harlow M. Davis

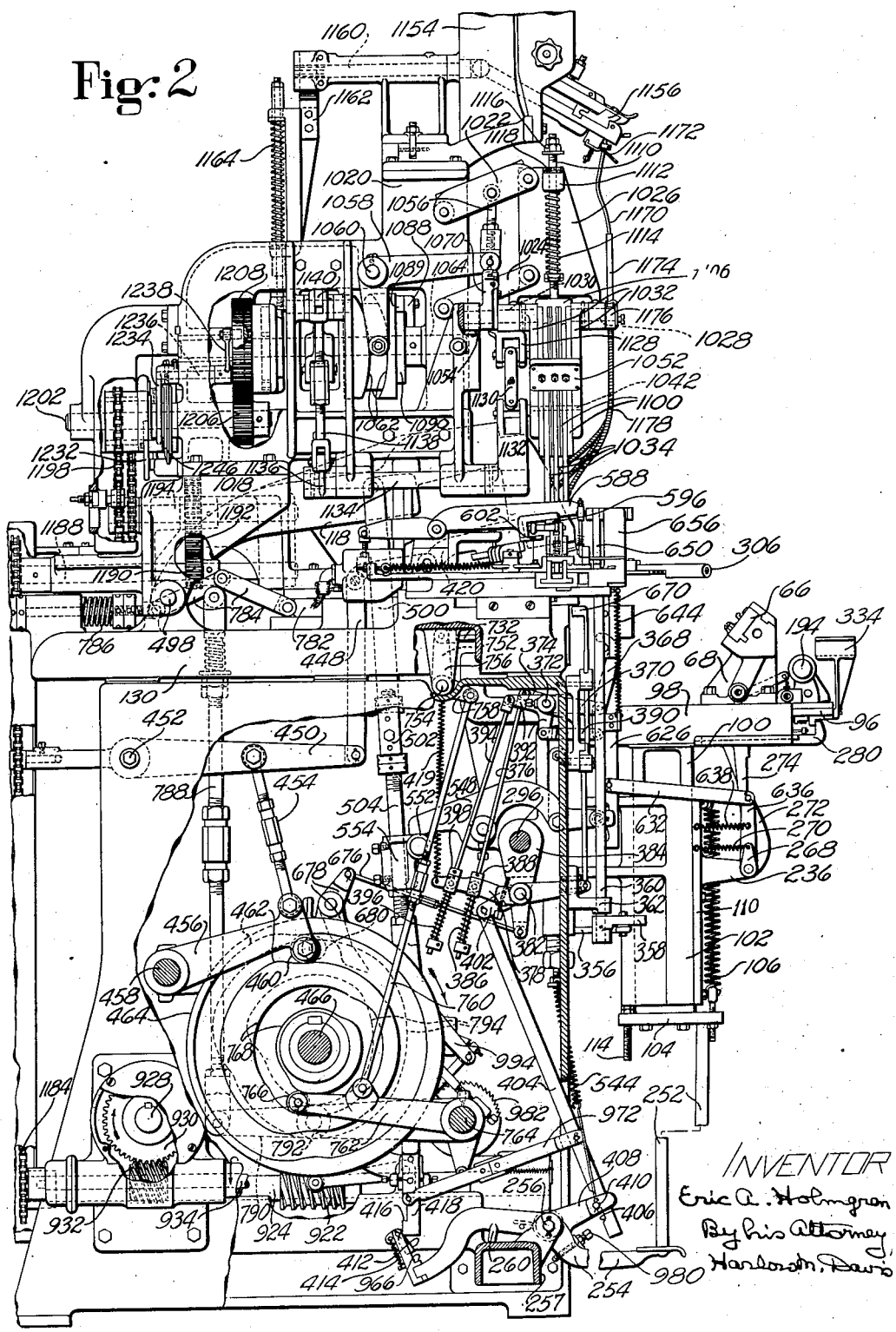

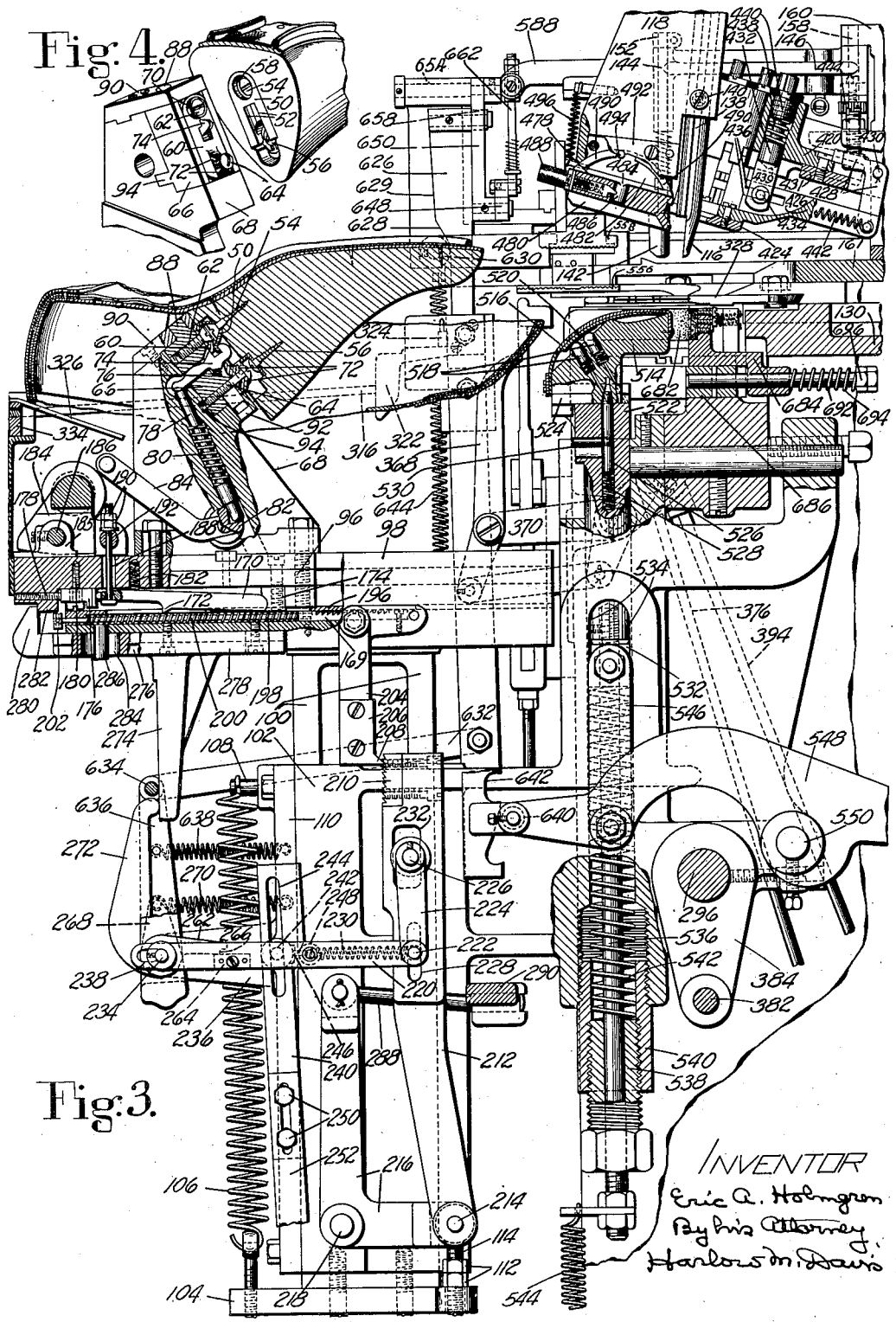

July 31, 1934.  E. A. HOLMGREN  1,968,146
MACHINE FOR SHAPING SHOE UPPERS
Filed April 1, 1932  13 Sheets-Sheet 4

July 31, 1934.　　　E. A. HOLMGREN　　　1,968,146
MACHINE FOR SHAPING SHOE UPPERS
Filed April 1, 1932　　13 Sheets-Sheet 5
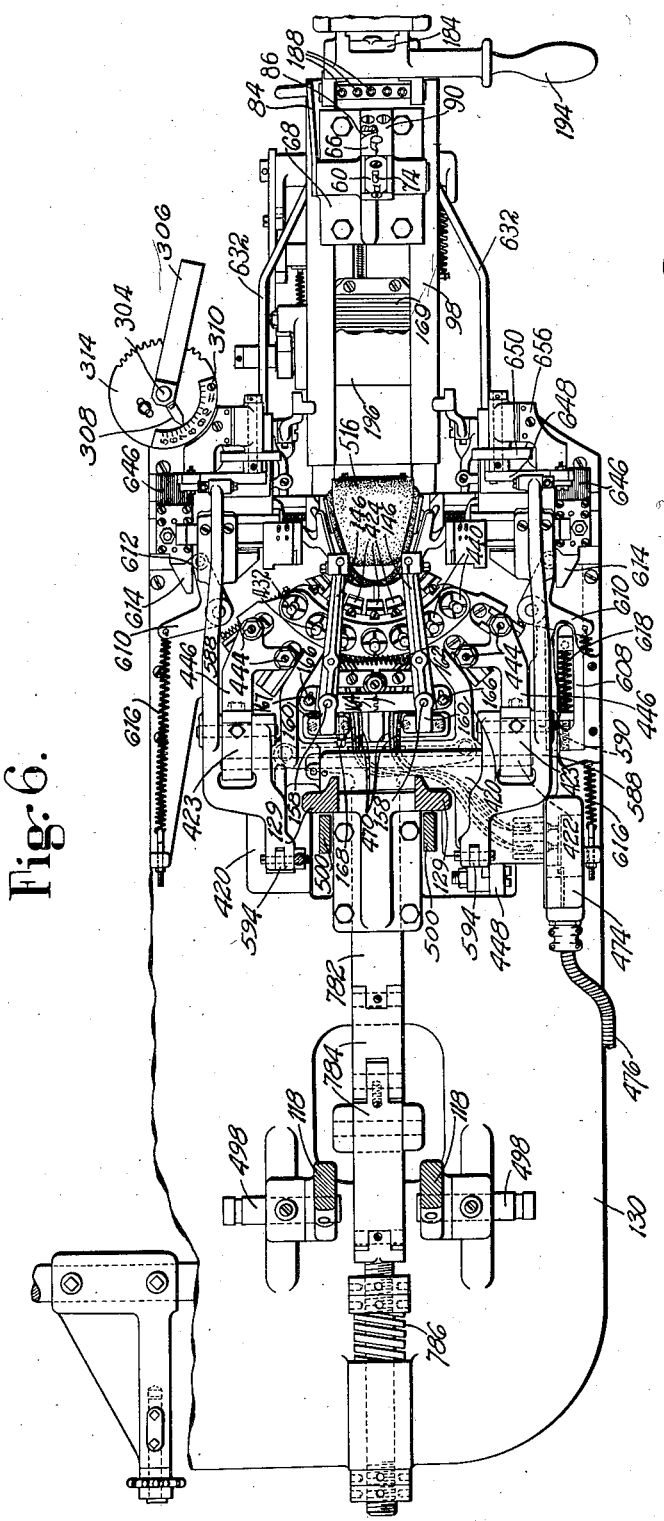
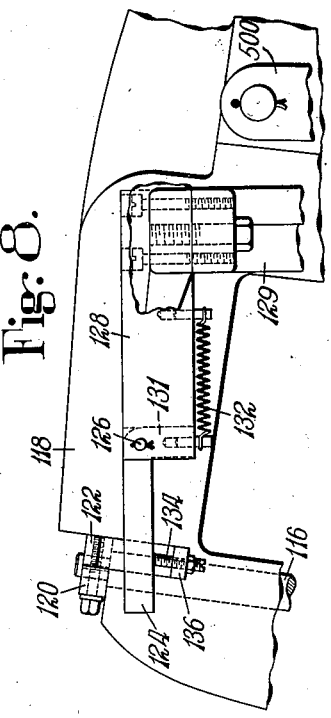
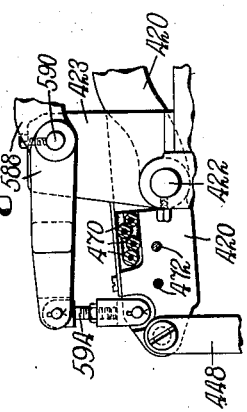
INVENTOR
Eric A. Holmgren
By his Attorney
Harlow M. Davis July 31, 1934.   E. A. HOLMGREN   1,968,146
MACHINE FOR SHAPING SHOE UPPERS
Filed April 1, 1932   13 Sheets-Sheet 6
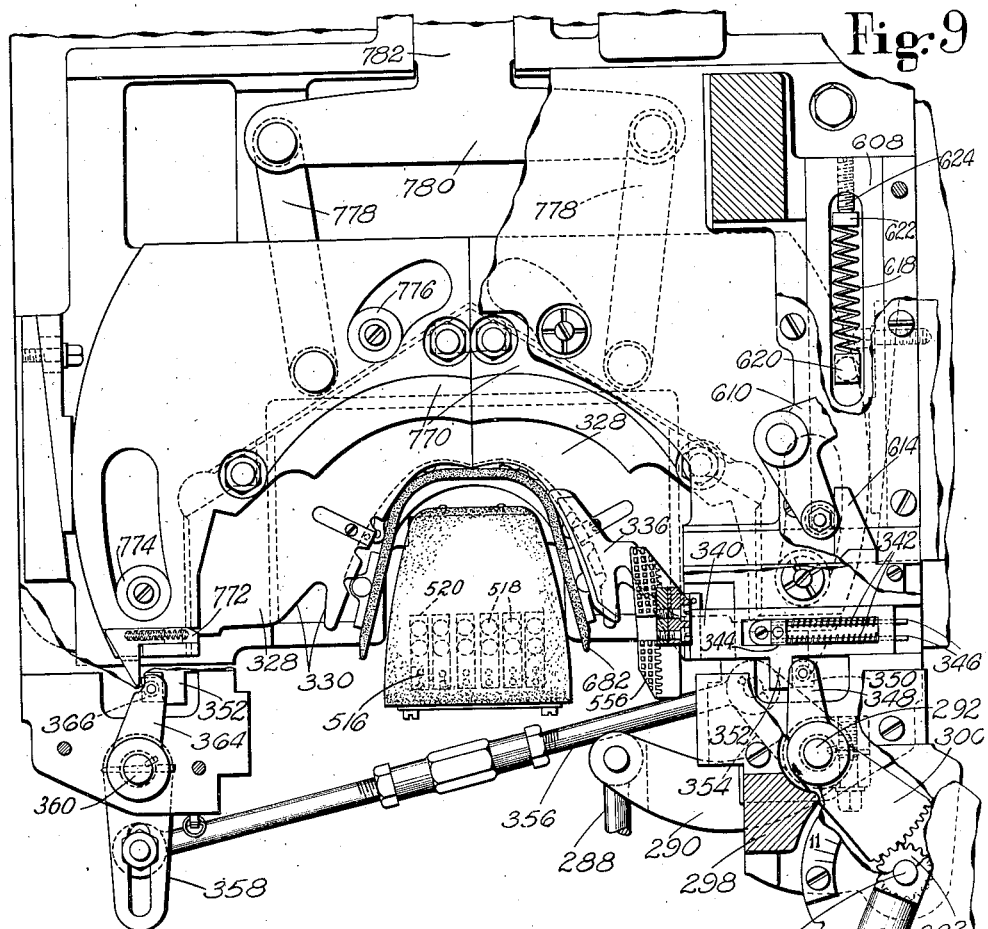
Fig. 9
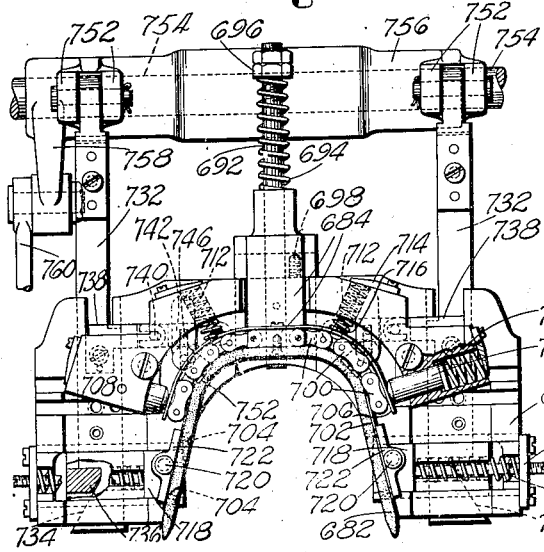
Fig. 10
Fig. 10a
INVENTOR
Eric A. Holmgren
By his Attorney
Harlow M. Davis July 31, 1934.  E. A. HOLMGREN  1,968,146
MACHINE FOR SHAPING SHOE UPPERS
Filed April 1, 1932  13 Sheets-Sheet 7
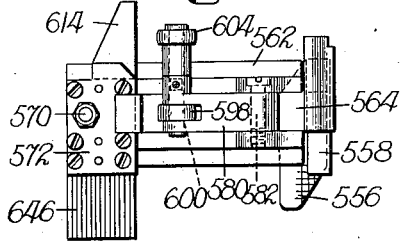
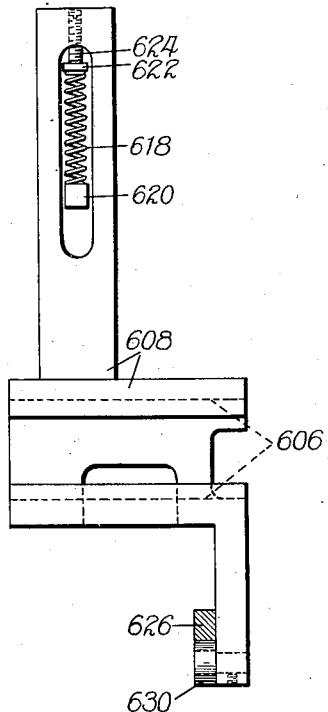
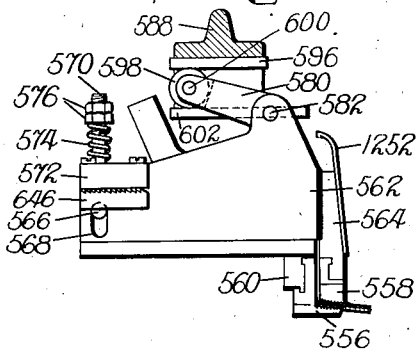
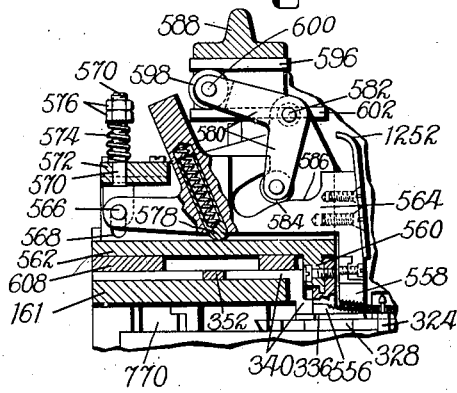

July 31, 1934.   E. A. HOLMGREN   1,968,146
MACHINE FOR SHAPING SHOE UPPERS
Filed April 1, 1932   13 Sheets-Sheet 8
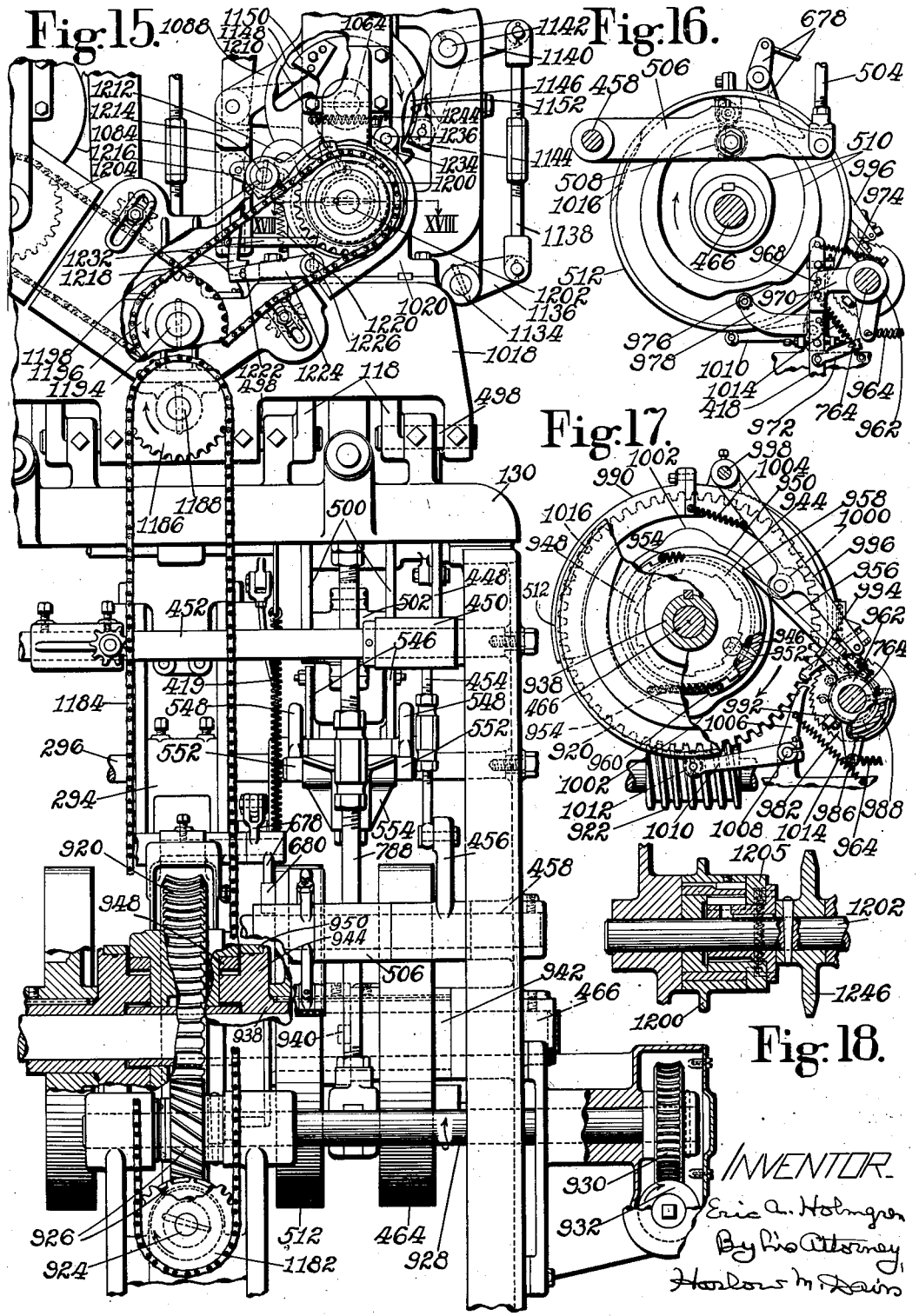

July 31, 1934.  E. A. HOLMGREN  1,968,146
MACHINE FOR SHAPING SHOE UPPERS
Filed April 1, 1932   13 Sheets-Sheet 9
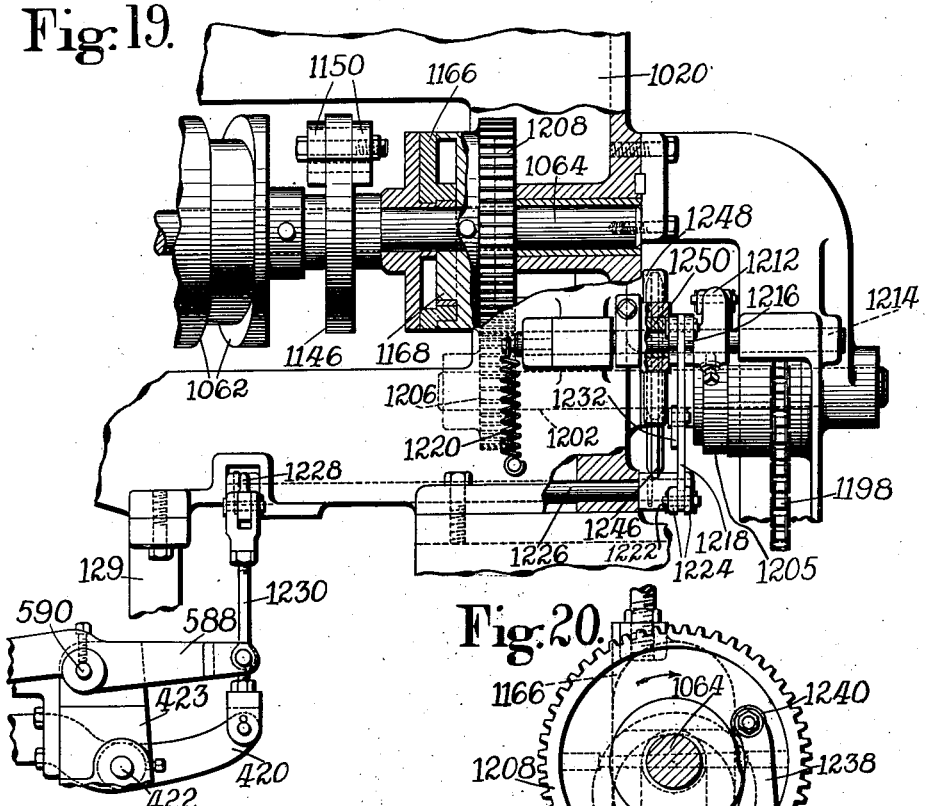
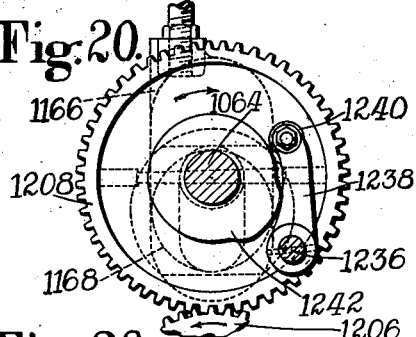
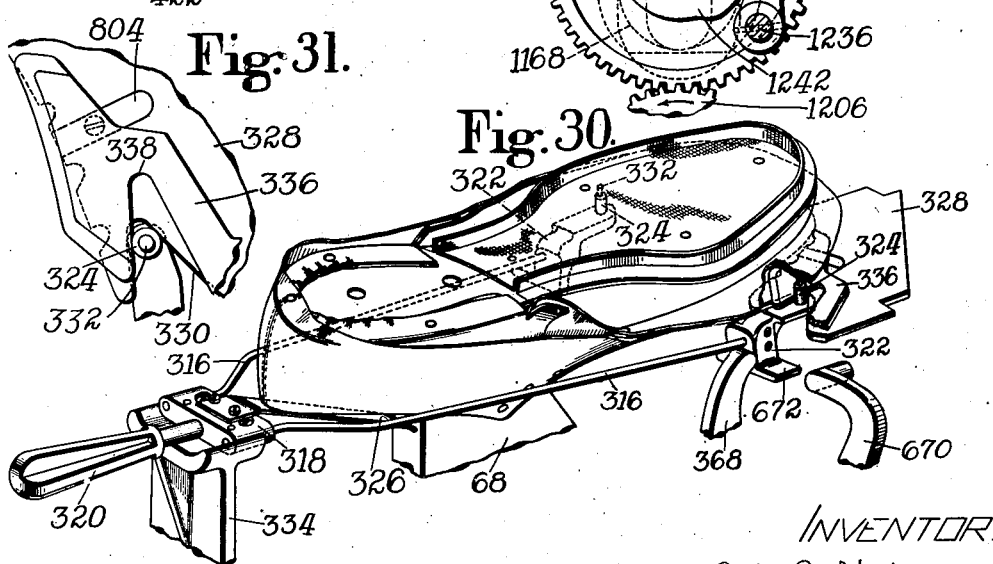
INVENTOR.
Eric A. Holmgren
By his Attorney
Harlow M. Davis July 31, 1934.  E. A. HOLMGREN  1,968,146
MACHINE FOR SHAPING SHOE UPPERS
Filed April 1, 1932   13 Sheets-Sheet 10

INVENTOR
Eric A. Holmgren
By his Attorney
Harlow M. Davis

July 31, 1934.  E. A. HOLMGREN  1,968,146
MACHINE FOR SHAPING SHOE UPPERS
Filed April 1, 1932  13 Sheets-Sheet 11
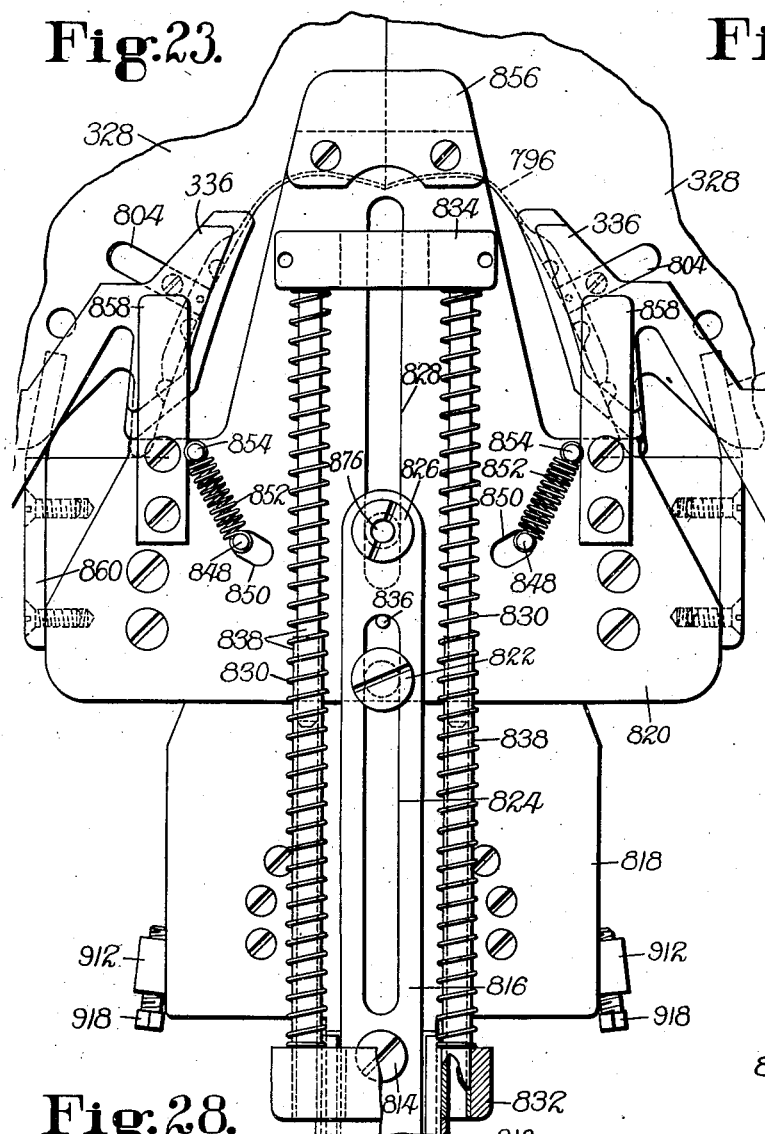
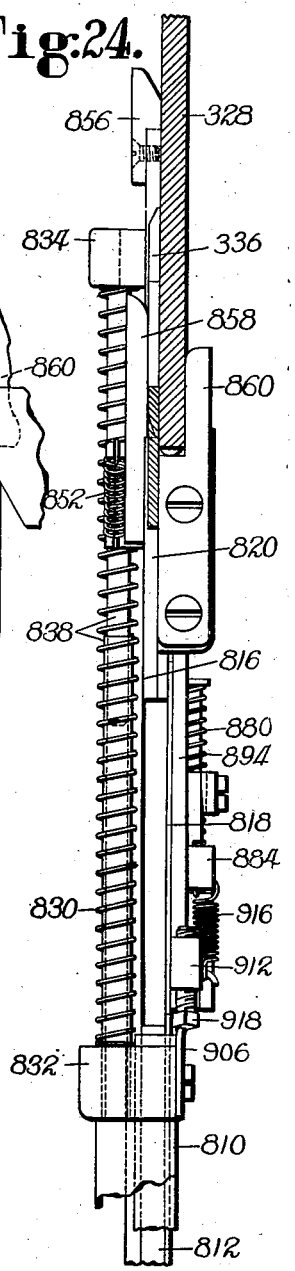
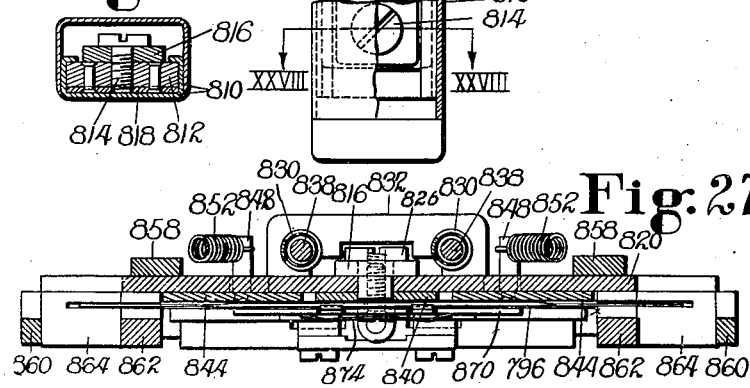

July 31, 1934.  E. A. HOLMGREN  1,968,146
MACHINE FOR SHAPING SHOE UPPERS
Filed April 1, 1932   13 Sheets-Sheet 12
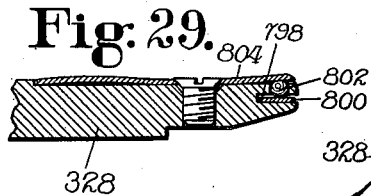
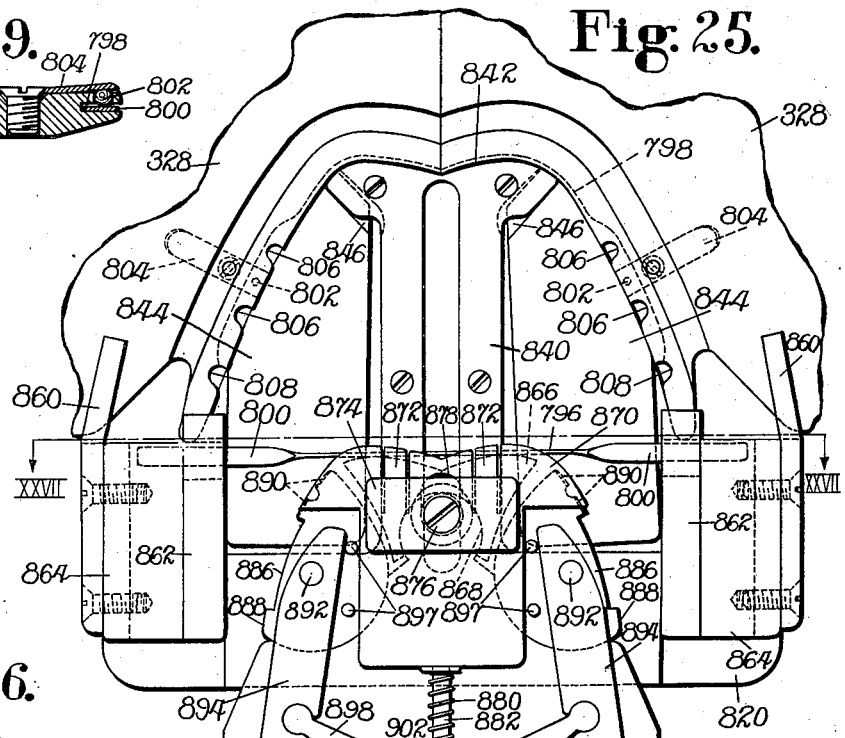
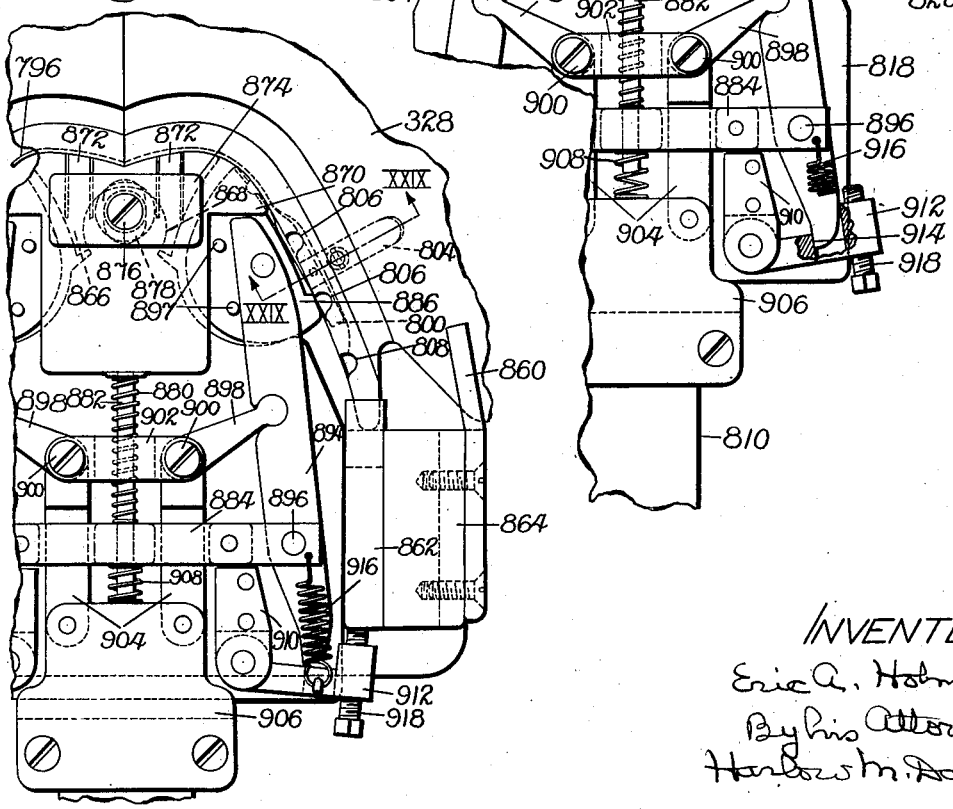
INVENTOR
Eric A. Holmgren
By his Attorney
Harlow M. Davis July 31, 1934.  E. A. HOLMGREN  1,968,146
MACHINE FOR SHAPING SHOE UPPERS
Filed April 1, 1932  13 Sheets-Sheet 13
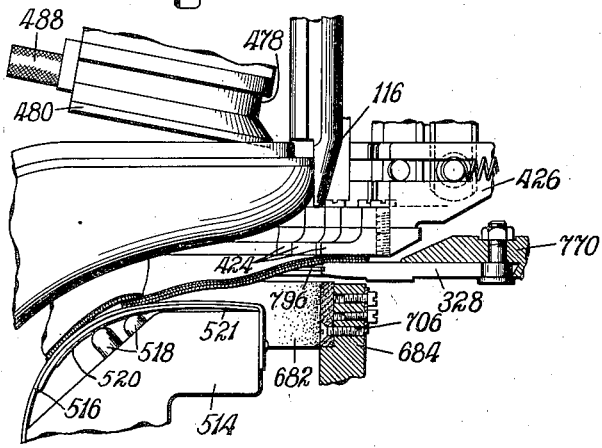
Fig. 32.
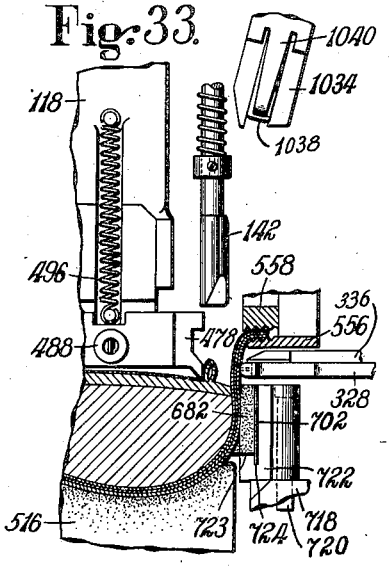
Fig. 33.
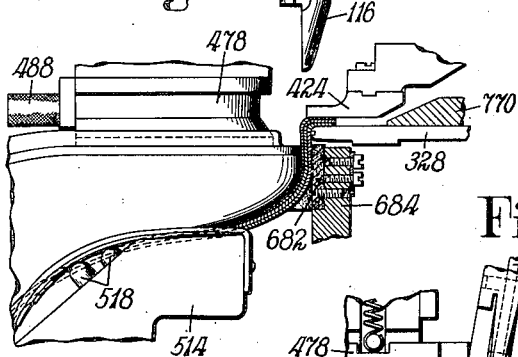
Fig. 34.
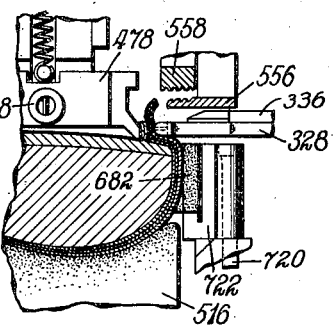
Fig. 35.
Fig. 37.
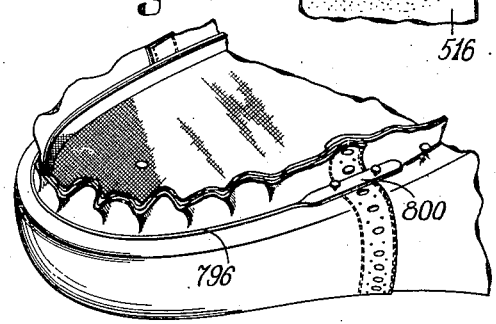
Fig. 38.
Fig. 36.
INVENTOR
Eric A. Holmgren
By his Attorney
Horace M. Davis Patented July 31, 1934

1,968,146

UNITED STATES PATENT OFFICE 1,968,146

MACHINE FOR SHAPING SHOE UPPERS

Eric A. Holmgren, Lynn, Mass., assignor to United Shoe Machinery Corporation, Paterson, N. J., a corporation of New Jersey Application April 1, 1932, Serial No. 602,480

230 Claims. (Cl. 12—4)

This invention relates to machines for use in the manufacture of boots and shoes (hereinafter referred to generically as shoes) for shaping the upper materials, and in some of its aspects more particularly to machines for shaping the toe-end portions of uppers.

Machines have been provided heretofore for shaping or molding the toe ends of uppers over a form from which each upper is removed after the upper-shaping operation to permit a last to be thereafter inserted in the shoe, and in Letters Patent No. 1,853,126, granted on April 12, 1932, I disclosed an improved machine constructed for that purpose. It has, however, been proposed to shape or last the toe end of each upper over the forepart of a divided last detached from the heel part, as a step in a novel method of making shoes disclosed and claimed in a copending application of A. F. Pym and A. R. Schoenky, Serial No. 603,278, filed on April 5, 1932. It is an object of the present invention, among others, to provide a machine so organized as to shape or last the toe end of the upper over the detached forepart of a divided last, the forepart of the last being removable from the machine with the upper after the upper-shaping operation, and various novel features of the invention are to be recognized in the means disclosed for this purpose, including means for supporting and controlling the forepart of the last in the upper-shaping operation. It is to be understood, however, that in many of its novel features the invention is not limited in utility to a machine that shapes the upper over the detached forepart of a last, as distinguished, for example, from a machine that receives and supports the whole last, and for this reason, as well as for convenience, the term "form" is frequently used hereinafter to designate generally the element over which the upper is shaped. It is further to be understood that the term "forepart" is used herein to distinguish the front part or section of the divided last from the rear part irrespective of the particular location of the division between the two parts.

As a part of its general organization for the purpose of shaping the upper over the detached forepart of a last as above described, the machine herein shown is provided with means constructed to receive and position the forepart of the last and to cooperate with the upper-shaping instrumentalities in shaping the toe end of the upper, the construction illustrated comprising mechanism that connects with the detached forepart at its rear end face to position and support it and is movable to present the toe end of the last in a location determined by gage mechanism for the upper-shaping operation. In this operation the upper is conformed to the contour of the toe end of the last and its marginal portion is wiped inwardly over an insole on the last, the insole shown being provided with a lip on its outer face against which the margin of the upper is wiped in upstanding position. The machine herein shown is further constructed to apply a binder around the toe for holding the upper against the lip and to drive fastenings at the opposite sides of the toe to fasten the binder in place. After the upper has thus been conformed to the toe end of the last and insole and fastened in lasted position, the forepart of the last, together with the upper and insole, is removed from the machine. While the invention is thus illustrated by reference to the manufacture of a shoe having an insole provided with a lip, it is to be understood that in many of its aspects it is not so limited, and in view of its general applicability to the manufacture of various kinds of shoes, the term "sole" is frequently used hereinafter as a general term to designate the shoe bottom part over which the marginal portion of the upper is shaped in the upper-conforming or lasting operation.

Considered more generally, without particular reference to the character of the form over which the upper is shaped, the invention presents various novel features relating especially to the work-positioning means. As illustrated, the form is mounted on a carrier or slide that is movable inwardly to present the toe end of the form in a position determined by gaging means and is locked automatically against retractive movement, this slide being mounted on a spring-controlled support that is movable in a direction heightwise of the form, or downwardly, in the upper-shaping operation, such downward movement resulting from pressure applied to the sole on the form. There is further provided means for locking the support against downward movement during the presentation of the work and for thereafter unlocking it, and also means for varying the height of the support for forms of different sizes. Movable with the form carrier in presenting the work is means for presenting the upper in proper position by the use of jig holes provided therein, in a manner generally similar to the disclosure of the above-mentioned Letters Patent No. 1,853,126.

With reference more particularly to the positioning of the upper, the invention provides novel means adjustable to determine the positions of uppers of different sizes. In accordance with the disclosure of my above-mentioned Letters Patent, the position of each upper is determined by jig pins that engage it in the jig holes provided therein and are themselves properly positioned by slots formed in the wipers that wipe the upper inwardly over the form. It is contemplated that in the use of the machine herein shown the same wipers will be used in operating on uppers of a number of different sizes. Since, however, the distance of the tip seam from the end of the form should vary correspondingly with variations in size, there are provided, as illustrated, gage members that cooperate with the wipers to determine the positions of the jig pins and are adjustable to vary the positions of the pins for uppers of different sizes.

In accordance with another feature of the invention, there is provided improved means for clamping the marginal portion of the upper upon the wipers to control it in the upper-shaping operation. The means herein shown for this purpose comprises a plurality of clamp members arranged to engage the upper respectively in different locations along the wipers and carried by a support that is movable toward the plane of the wipers to apply them to the upper, the different members being pressed upon the upper through spring-controlled plungers associated therewith and cooperating with means whereby the pressures applied by the different members may be independently varied. There is further provided novel means for maintaining each clamp member initially in a retracted position along the plane of the wipers, to prevent interference with other parts of the machine, and for moving it forwardly as the support for the members is moved toward the wipers. This means, as illustrated, comprises, for each member, a bell-crank lever whereby the member is retracted automatically in response to movement of the support away from the wipers and is released to permit it to be moved forwardly by a spring as the support is moved toward the wipers.

For moving the form and its support heightwise in the upper-shaping operation the machine is provided with a member arranged to engage the toe end of the sole at the inner side of the lip so as to serve also as a support for the lip against the pressure of the wipers when the latter are operated to wipe the upper inwardly against the lip, this member being so mounted as to permit it to tip about an axis extending widthwise of the form to seat itself evenly upon the sole. As illustrated, this member is controlled by a spring which tends to tip it in one direction and thus positions it for initial engagement with the sole close to the end of the toe, the spring yielding as the member tips to seat itself upon the sole in the manner described. This affords increased insurance that the member will engage the sole properly, especially if the sole is provided with a lip, as shown.

As the form is moved heightwise in the upper-shaping operation, the upper at the top of the forepart is engaged by a shoe rest which moves with the form and assists in holding the upper against displacement and also in shaping it to the contour of the form. In order not to interfere with the presentation of the form and the upper in operating positions in the manner hereinbefore described, the machine is further provided with novel means for maintaining the shoe rest in a position at a substantial distance from the form when the latter is presented and for thereafter moving it toward the form into upper-clamping position. As herein shown, the shoe rest is controlled by a spring which tends to raise it and against the resistance of which it is movable downwardly with the form, and mechanism controlled by the means that depresses the form is provided for maintaining it initially in a somewhat depressed position and for releasing it after the starting of the power operation of the machine to permit it to be moved upwardly against the upper by its spring. A further feature of the invention is to be recognized in the construction of the shoe rest, comprising a novel arrangement of spring-controlled members relatively yieldable in conformity to the contour of the form. In the construction shown a plurality of pairs of spring-controlled plungers are arranged in a series extending widthwise of the form to press on the upper along the tip seam and at the rear thereof, the different pairs of plungers being arranged to bear upon thin flexible plates that extend lengthwise of the form and transmit the pressure of the plungers to the upper through a flexible cover that engages the upper.

For controlling the upper in the upper-shaping operation and to assist in shaping it over the form, the machine includes grippers that grip the margin of the upper at the opposite sides of the forepart, as illustrated both forwardly and rearwardly of the tip seam, and are movable inwardly toward the form in response to the pull of the upper thereon, these grippers in the construction herein shown being mounted in guideways along which they are thus movable in straight paths. To avoid any possibility of undue strain on the upper the invention provides means that acts independently of the upper to impart such inward movements to the grippers at a predetermined time in the upper-shaping operation, as illustrated near the end of the downward movement of the form. In accordance with another feature also there is provided means for imparting to the grippers movements lengthwise of the form to assist in shaping the upper properly, the construction shown being such that the grippers are thus moved in directions away from the toe end of the form to assist in avoiding excessive wrinkling of the gathered margin of the upper about the toe and to locate the ends of the tip seam at the proper distances from the toe end of the form. As illustrated, these movements of the grippers, and also their movements inwardly toward the form as above described, are effected by mechanisms that are operated by the downward movement of the shoe rest. In still another aspect, the invention provides upper-gripping means of novel construction for the purposes in view.

Another feature of the invention is to be recognized in improved means for clamping an end of an upper about a form, such clamping means in the machine herein shown being utilized to wipe the toe end of the upper heightwise of the form as the form is depressed. The structure disclosed comprises an end band and novel means for controlling it in various ways to apply pressure to the upper and to relax the pressure. For the latter purpose there are provided wedge bars that are movable lengthwise of the form and serve to retract the opposite end portions of the band from the form, together with devices controlled by the wedge bars for also relaxing the pressure of other portions of the band on the upper.

The machine herein shown, in accordance with a further novel feature, is constructed to apply about the toe an upper-holding binder having flattened end portions adapted to be pierced by fastenings driven to fasten the binder in place, the wipers being provided at their wiping edges with a groove formed to receive such a binder and having notches in their edges through which the fastenings are to be driven. The wipers also carry members arranged to press yieldingly on the flattened ends of the binder to assist in holding it in the groove.

In accordance with another feature of the invention there is provided novel means for presenting each binder preliminarily in position to be applied to the upper in the operation of the machine. This means, as illustrated, comprises a device constructed for use by the operator to present the binder in the groove in the wipers and having members arranged to guide the binder into the groove and other members movable to force the binder into the proper position. The binder-guiding members in the construction shown are relatively movable to positions determined by the contour of the edges of the wipers as the device is presented to the wipers, so as to adapt the device for use with wipers that are differently formed to operate on the uppers of shoes of various styles and sizes, and are arranged to guide both the intermediate and end portions of the binder. The members that act on the binder to force it along the guiding means into the required position comprise a member for engaging the intermediate portion of the binder and other members for engaging portions of the binder nearer the ends thereof. These several members are mounted for advancing movements together under control of a handle by which the operator manipulates the device, and the members that engage the binder at or near its ends are also movable in directions away from each other to force the end portions of the binder into the required positions.

There are further novel features in the combination of upper-shaping and binder-applying means and means for inserting fastenings to fasten the binder, and also in the combination of upper-shaping means and fastening-inserting means irrespective of the presence of the binder. As illustrated, a plurality of fastening-inserting devices, each including means for holding a fastening and a driver for driving the fastening, are arranged to act at each of the opposite sides of the toe and are all movable as a unit heightwise of the form, together with spring means that operates the drivers, prior to the fastening-inserting operation, the fastenings being supplied by separating means relatively to which the devices are thus movable. By such movement the different devices are carried into engagement with the outer faces of the wipers, and prior to the insertion of the fastenings they are also moved inwardly along the wipers to positions determined by contact with the member hereinbefore referred to as engaging the sole at the inner side of the lip. To permit the different devices at the opposite sides of the toe to assume the proper relative positions, they are yieldingly movable relatively to one another both heightwise and widthwise of the form. For imparting to the devices their inward movements, and for also actuating the driver-operating means, there are provided, in the construction shown, cam-operated mechanisms relatively to which the devices are movable as described in directions heightwise of the form, the construction being such that these mechanisms maintain at all times their operative relations to the parts that they control notwithstanding such movements heightwise of the form. The drivers that drive the fastenings at the opposite sides are connected to members that are movable to retract them against the resistance of springs that act on the members to impart to the drivers their operative movements; and novel means is further provided for imparting to these members driver-retracting movements in predetermined relation to each other and for yet rendering them independent of each other in their driver-operating movements so that the limits of the movements of the drivers at each side may be independently varied and determined. As herein shown the fastenings utilized are tacks, but the invention is not limited to the use of fastenings of that particular character.

In accordance with still another novel feature of the invention the fastening-inserting mechanism is operated and controlled through a clutch that is automatically actuated separately from another clutch through which the upper-shaping means is operated, this means coming automatically to a stop with the wipers in upper-holding position to permit the driving of the fastenings.

The above and other features of the invention, including various novel details of construction and combinations of parts, will now be more particularly described by reference to the accompanying drawings and pointed out in the claims.

In the drawings,

Fig. 2 shows the machine partly in left hand side elevation and partly in section;

Fig. 3 shows partly in elevation and partly in section portions of the structure included in the left hand half of the machine, as viewed from the right hand side thereof;

Fig. 4 is a perspective view illustrating more fully how the forepart of a last is mounted on the work support;

Fig. 6 is a plan view of the left hand half of the machine with the fastening-inserting mechanism and certain other parts removed;

Fig. 7 is a view in side elevation of a portion of the structure shown in Fig. 6;

Fig. 8 shows in right hand side elevation a portion of the shoe-depressing arm and parts associated therewith;

Fig. 9 is a plan view showing the wipers and parts associated therewith, portions of the structure being broken away;

Fig. 10 is a plan view of the toe band and its controlling mechanism, with parts broken away;

Fig. 10a is a plan view illustrating in greater detail the construction of a portion of the toe-band-controlling mechanism;

Fig. 11 is a plan view of one of the grippers;

Fig. 12 shows the gripper in front elevation as it appears when gripping the upper;

Fig. 13 shows more fully in vertical section the construction of the gripper and of parts of the machine closely associated therewith;

Fig. 14 is a plan view of the slide on which the gripper is mounted;

Fig. 15 shows the left hand half of the machine in rear elevation, with parts broken away;

Fig. 16 is a detail view in elevation of a portion of the operating mechanism and of the means for controlling the main clutch;

Fig. 17 shows the main clutch and portions of the mechanism for controlling it;

Fig. 18 is a section on the line XVIII—XVIII of Fig. 15, showing the clutch through which the fastening-inserting mechanism is operated;

Fig. 19 is a view, partly in right hand side elevation and partly in section, of a portion of the means for operating and controlling the fastening-inserting mechanism in the left hand half of the machine;

Fig. 20 shows in greater detail a portion of the structure shown in Fig. 19 as viewed from a different direction;

Fig. 23 is a plan view of the binder-presenting device as it appears in its initial operative relation to the wipers;

Fig. 24 is a side view of the binder-presenting device in its relation to the wipers, one of the wipers being shown in section;

Fig. 25 is an inverted plan view of a portion of the binder-presenting device and the wipers, with the parts in the same positions as in Fig. 23;

Fig. 26 is a view similar to Fig. 25, but showing the parts as positioned at the end of the binder-presenting operation;

Fig. 27 is a section on the line XXVII—XXVII of Fig. 25;

Fig. 28 is a section on the line XXVIII—XXVIII of Fig. 23;

Fig. 29 is a section on the line XXIX—XXIX of Fig. 26 with the parts right side up instead of inverted;

Fig. 30 is a perspective view illustrating the positions of certain parts of the machine when the work is presented in position to be operated upon;

Fig. 31 is a plan view showing a portion of one of the wipers and of the gage member associated therewith for determining adjustably the position of the upper-presenting means;

Figure 1:
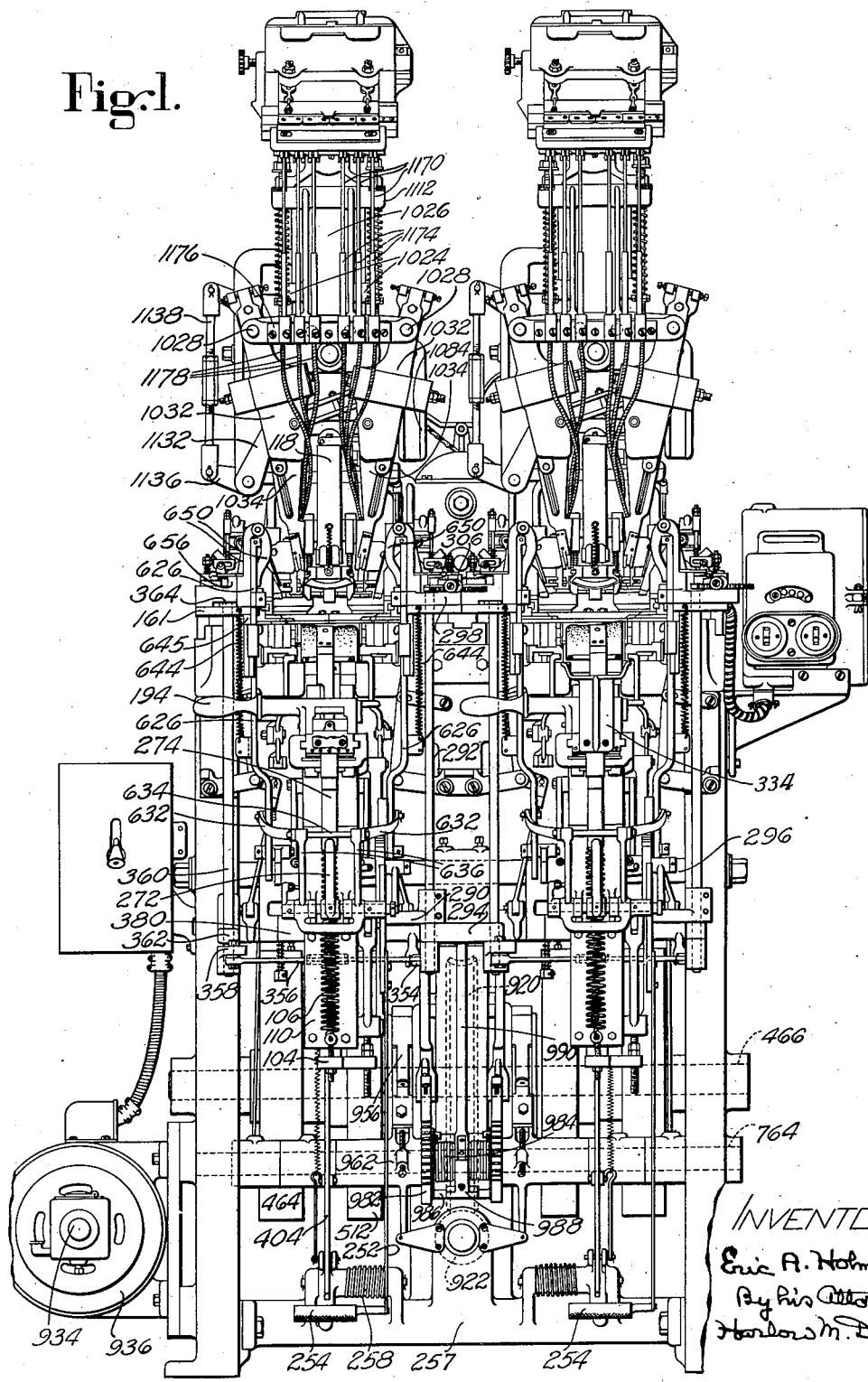
Fig. 1 is a view in front elevation of a machine in which the invention is embodied, with certain parts broken away.

Figs. 32 to 37, inclusive, illustrate the relation of parts of the machine to the work at different times in the cycle of operations; and Fig. 38 is a perspective view of the toe portion of a shoe after it has been operated upon by the machine.

In general similarity to the machine disclosed in the above-mentioned Letters Patent No. 1,853,126, the machine herein shown is a twin machine having two sets of instrumentalities with their operating and controlling mechanisms for operating respectively on the uppers of right and left shoes, each set being substantially independent of the other as far as its operation and control are concerned. For an understanding of the present invention reference accordingly need be made, for the most part, only to one of the sets of instrumentalities and the parts of the machine associated therewith, the following description being confined mainly to the structure of the left hand half of the twin machine.

The machine herein shown is specially constructed to receive and support the forepart section of a divided last of the character disclosed in Letters Patent No. 1,856,127, granted on May 3, 1932 upon an application of G. P. S. Cross. As therein disclosed, and as shown in Figs. 3 and 4, the forepart of the last has inserted in its rear end face a plate 50 provided with a slot 52 and secured in place by two screws 54 and 56, the head of the screw 54 being seated in a circular depression 58 in the plate and the head of the screw 56 engaging an inwardly bent portion of the plate so that it is spaced inwardly away from the slot 52. In accordance with the disclosure of the above-mentioned Cross Letters Patent this plate on the rear end of the forepart section of the last is a part of the bonding means for fastening the two parts of the last together and is arranged to cooperate for that purpose with mechanism carried by the heel part of the last. It is by use of similar mechanism cooperating with the plate 50 on the forepart of the last that the latter is positioned and supported in the machine herein shown. This mechanism comprises a plate 60 which is fastened by screws 62 and 64 to a small block 66 mounted as hereinafter described on a work carrier 68. The plate 60 has an upraised circular boss 70 against which the head of the screw 62 bears, this boss being arranged to enter the depression 58 in the plate 52 to assist in positioning the forepart of the last. The head of the screw 64 is arranged to seat against outturned portions 72 of the plate 60 which are positioned at the opposite sides of the screw and are of substantially the same width as the slot 52 in the plate 50, the head of the screw being wider than this slot. Projecting outwardly through an opening in the plate 60 is a latch 74 which is somewhat loosely mounted for rocking movements in a recess in the block 66 and is arranged to project through the slot 52 of the plate 50 and to hook over the inner face of this plate as illustrated in Fig. 3, the latch having also a projection which engages the inner face of the plate 60. A spring 76 tends to swing the projecting end of the latch 74 in an upward direction.

In mounting the forepart of the last on the support the operator presents it with the lower end of the slot 52 just above the screw 64 and the projecting portions 72 of the plate 60 and then slides it downwardly along the plate 60 until the latch 74 snaps over the inner face of the plate 50 and the boss 70 is seated in the depression 58, as illustrated in Fig. 3. The forepart of the last is then locked in substantially fixed relation to the block 66 by the latch 74, the screw 64, and the boss 70. For releasing the forepart of the last when it is desired to remove the work from the machine there is provided a plunger 78 slidingly mounted in the carrier 68 and arranged to engage the inner end of the latch 74 and to rock the latch against the resistance of its spring 76 when the plunger 78 is moved upwardly against the resistance of a spring 80 which tends to move it downwardly. For imparting such upward movement to the plunger 78 there is mounted in the carrier 68 a rock shaft 82 provided with a shoulder against which the lower end of the plunger rests, this rock shaft having fast on one end a crank arm 84 movable by the operator to effect the release of the forepart of the last.

In view of the differences in the contours of different lasts it is considered desirable to determine the lateral position of the forepart of each last relatively to the upper-shaping instrumentalities by engagement with the opposite side faces of the toe end of the last, as hereinafter more particularly described. To permit the positioning of the forepart of the last in this manner the block 66 is mounted in the carrier 68 for lateral rocking movements. By reference to Fig. 6 it will be seen that the block has a laterally curved inner face 86 which seats on a correspondingly curved face of the carrier 68 to assist in guiding it for rocking movements. As shown in Figs. 3 and 4, the block is further guided by a projection 88 on its upper end mounted to turn in a bearing formed in a plate 90 that is fast on the carrier 68, and also by a pin 92 which is detachably mounted in the carrier and projects into a recess in the lower end of the block. To limit the rocking movements of the block 66 it is provided with a rib 94 which extends into a slot in the carrier 68 and permits only limited lateral movement of the forepart of the last. The inner end of the latch 74 projects into a recess in the carrier 68 which is large enough to permit such rocking movements as the block 66 may receive without disturbing the operative relation of the latch to the plunger 78.

The carrier 68 is secured to a slide 96 horizontally movable forwardly and rearwardly in guideways formed in a horizontally extending head 98 on a slide 100 which is vertically movable in a bracket 102 on the frame of the machine. The slide 100 has fast on its lower end a plate 104 which is connected by a spring 106 to a pin 108 mounted on a cover plate 110 on the front of the bracket 102. The spring 106 thus tends to raise the slide 100 and the parts supported thereon, the limit of upward movement of the slide being determined by nuts 112 on an eye bolt 114 which is supported as hereinafter described and extends downward loosely through an opening in the plate 104, the lower nut being arranged for limiting engagement with the upper face of the plate. By its horizontal movement in the head 98 the slide 96 moves the carrier 68 from outer work-receiving position, in which it is shown in Fig. 3, inwardly to present the work in position for the machine to operate thereon. The slide 98 is thus movable by the operator who pushes it inwardly to present the work and later pulls it outwardly to withdraw the work from operating position. The inward movement of the slide and the parts supported thereon is limited by engagement of the toe-end face of the forepart of the last with a stop or gage 116 which is mounted on a vertically swinging arm 118 whereby, as hereinafter described, downward movement is imparted to the forepart of the last in the upper-shaping operation. The gage 116 is mounted for upward and downward movements in a guideway in the arm 118, its downward movement in the arm being limited by a member 120 (Figs. 5 and 8) which is clamped on its upper end and arranged to engage the arm. To limit downward movement of the gage 116 when the arm 118 is swung downwardly, so that the toe end of the last will be carried away from the gage to permit the shaping of the upper over it, the member 120 is provided with a projection 122 arranged to engage a horizontally extending arm 124 of a bell-crank lever which is pivoted at 126 on a plate 128 fast on a bracket 129 mounted on a top casting 130 (Fig. 6) of the frame of the machine, the bracket 129 being one of two brackets whereby the arm 118 is guided. The other arm 131 of the bell-crank lever is arranged to engage a shoulder on the plate 128 to hold the arm 124 against downward movement. A spring 132 holds the bell-crank lever yieldingly in the position thus determined. When the arm 118 is swung upwardly a screw 134 carried by a projection 136 on the member 120 is arranged to engage the lower face of the arm 124 to insure that the gage member 116 will be returned to its lower limit of movement in the arm, the spring 132 being strong enough for this purpose. The gage member 116 has a slot 138 (Fig. 3) in one side thereof into which projects the end of a screw 140 carried by the arm 118 so as to prevent the gage member from turning.

For centralizing the forepart of the last laterally there are provided two gages 142 (Figs. 3 and 5) arranged to contact with the opposite side faces of the toe end of the last, these gages being formed on the lower ends of rods 144 which are movable vertically in bearings in the front ends of horizontally swinging arms 146 (see also Fig. 6). Mounted on each rod 144 is a spring 148 which bears on a collar 150 on the rod and thus tends to move the rod downwardly, the limit of its downward movement being determined by a clamp 152 on its upper end in engagement with the arm 146. Projecting downwardly from each clamp 152 is a plate 154 provided with a slot into which projects a pin 156 on the arm 146 to prevent turning movement of the rod 144. Each of the arms 146 is pivotally mounted at 158 (Fig. 6) on a bracket 160 fast on a cover plate 161 (Fig. 5) positioned over parts hereinafter described. A spring 162 is connected at its opposite ends to the arms 146 and tends to swing them toward each other. The two arms are connected together for equal movements toward or from each other by arms 164 also pivotally mounted at 158 on the brackets 160 and connected together by gear teeth on their inner ends, the arms 164 being connected respectively to the different arms 146 by clamp screws 166 which are threaded in the arms 164 and extend through slots formed in lateral projections 167 of the arms 146. It will be understood that by means of these slot and screw connections each arm 146 may be adjusted independently of the other to position its gage 142 in proper relation to the toe-lasting instrumentalities. A screw 168 threaded in one of the brackets 160 and engaging one of the arms 164 limits adjustably the movements of the two arms 146 under influence of the spring 162. When the forepart of the last is forced downwardly by the arm 118 it is carried away from the gages 142, and if the shoe contacts with these gages in its return movement upwardly after the lasting operation the gages are moved upwardly by it against the resistance of the springs 148 without damage to the machine.

It is desirable that after the work support slide 96 has been moved inwardly to the position determined by the gage 116 it shall be held against outward return movement during the operation of the machine upon the work. For this purpose there is set into the head 98 on which the slide 96 is mounted a plate 169 (Fig. 3) having ratchet teeth thereon, and the slide 96 carries five pawls 170, one of which is shown in Fig. 3, having projections 172 arranged to engage the ratchet teeth. These projections on the several pawls are arranged in staggered relation to one another for greater precision in locking the slide 96 exactly in the position to which it is moved. The pawls 170 have inner curved ends seated in similarly curved recesses in a block 174 that is fastened to the slide 96, and they are confined in these recesses by a block 176 which is fast on the slide and is arranged close to their outer ends, this block being adjustable by screws 178 in the head 98 and held in adjusted position by clamping screws 180. Associated with each pawl is a spring 182 which tends to swing it downwardly to position its projection 172 in operative relation to the ratchet teeth. To permit the slide 96 to be moved outwardly by the operator after the completion of the toe-lasting operation there is provided a rocking member 184 which is mounted to turn on a rod 186 fast in a lug 185 on the slide 96 and carries a plurality of rods 188 which extend downward loosely through openings in the slide 96 and have on their lower ends heads which underlie portions of the respective pawls 170. The rods 188 are separately adjustable as to height by nuts 190 whereby they are supported on a cross pin 192 on the member 184. Projecting laterally from the member 184 is a handle 194 (Fig. 6) whereby the member may be rocked to lift the pawls from the ratchet teeth, this handle serving also as means by which the operator moves the slide 96 in both directions.

In order to prevent tacks or other articles from falling on the ratchet plate 169 and interfering with the proper action of the pawls 170, there is provided a thin plate 196 slidably mounted in the head 98 under the slide 96 and arranged to act as a shutter to cover the ratchet plate when the work support slide 96 is in its outer position. The plate 196 has an opening through it along a considerable portion of its length to receive the pawls 170, and into this opening projects the block 174 which acts by engagement with an edge of the plate to slide the latter away from over the ratchet teeth when the slide 96 is moved inwardly to present the work. The plate 196 is returned into position to cover the ratchet teeth by a spring 198 mounted in a recess in the head 98 and arranged to bear at one end on the ratchet plate 169 and at its other end on a shoulder formed on the plate 196. The spring 198 is mounted on a rod 200 which is screwed at its inner end into the plate 169 and has on its outer end a head 202 which limits outward movement of the plate 196.

The vertically movable work support slide 100, as previously stated, is upheld yieldingly by a spring 106. It is desirable, however, that when the operator is mounting the work on the work support the latter be held firmly against downward yield and also that it be so held during the movement of the slide 96 to present the work in position to be operated upon so as to insure that the toe-end face of the last will be high enough to contact with the gage 116. The machine is accordingly provided with means for holding the work support locked positively against downward movement prior to the starting of the power operation of the machine. For this purpose there is fast on the head 98 of the slide 100 an arm 204 (Fig. 3) on which is fastened a plate 206 provided with a tooth 208 arranged to engage upwardly directed ratchet teeth formed on a plate 210 which is fast on a lever arm 212. The arm 212 at its lower end is pivotally mounted on a pin 214 whereby it is connected to one arm of a bell-crank lever 216 pivoted at 218 on the bracket 102 controlled as hereinafter described. The arm 212 is controlled by a link 220 pivotally connected at one end by a pin 222 to the lower end of an arm 224 which is mounted for swinging movement on a pin 226 fast on the bracket 102, the pin 222 extending into a vertically elongated slot 228 in the arm 212. A spring 230 connected to the pin 222 and to the cover plate 110 tends to move the link 220 toward the left (Fig. 3) and thus through the pin 222 to swing the arm 212 in the same direction. In this manner the arm 212 is held yieldingly in position for one or another of the teeth of the ratchet plate 210 to engage the tooth 208 and thus to lock the slide 100 against downward movement. It will be observed that the pin 226 extends through a slot 232 in the arm 212, the slot being wider than the pin so as to permit swinging movements of the arm. At its front end the link 220 is supported on a shaft 234 which is mounted in two arms 236 (Figs. 2 and 3) projecting forwardly from the cover plate 110, the link being provided with a slot 238 whereby it is permitted to move lengthwise relatively to the shaft.

For unlocking the slide 100 to permit it to be moved downwardly with the work in the operation of the machine there is provided mechanism for moving the link 220 toward the right (Fig. 3) to swing the arm 212 and its ratchet plate 210 away from the tooth 208. This mechanism comprises a bar 240 guided for upward and downward movements by a pin 242 which is fast on the cover plate 110 and projects into a slot 244 in the bar, the latter being provided with a cam face 246 arranged to engage a roll 248 on the link 220 to move the link to the right when the bar is moved downwardly. The bar 240 is connected by screws 250 to another bar 252 (Figs. 1 and 2) which is pivotally connected at its lower end to a treadle 254 pivoted at 256 to a bracket 257 fast on the frame of the machine and utilized as hereinafter described to start the power operation of the machine. The treadle 254 is controlled by a coil spring 258 (Fig. 1) which tends to swing its front end upwardly and maintains it initially in a position determined by a lug 260 thereon (Fig. 2) in engagement with the bracket 257. With the parts in these positions the bar 240 (Fig. 3) is raised far enough to permit the engagement of the ratchet plate 210 with the tooth 208. When the treadle is depressed to start the machine the ratchet plate is swung away from the tooth to release the slide 100 as above described.

In order to prevent the arm 212 from being returned into position to lock the slide 100 throughout the operation of the machine, after the treadle 254 has been returned to starting position, there is provided a latch 262 (Fig. 3) arranged to cooperate with a plate 264 which is fast on the link 220, the latch having a notch in its end to provide a shoulder 266 for engagement with an end face of the plate. The latch 262 is fast on the shaft 234, which is mounted to turn in bearings in the arms 236, and also fast on the shaft is an arm 268 controlled by a spring 270 which tends to swing the latch 262 in a downward direction. When the link 220 is moved toward the right by depression of the starting treadle, as above described, the plate 264 on the link is accordingly carried into position to permit the latch 262 to be swung downwardly far enough to hold the link against return movement by engagement of the shoulder 266 on the latch with the end face of the plate. For releasing the link 220 to permit the arm 212 again to be swung into locking position by the spring 230 there is provided an arm 272 which is fast on the shaft 234 and extends upwardly into position to be engaged at its upper end by an arm 274 that projects downwardly from a slide 276, this slide being supported for horizontal movements on gibs 278 that are fast on the head 98. At its forward end the slide 276 is provided with an upturned lug 280 arranged to be engaged by a lug 282 on the work support slide 96 when the operator moves the latter outwardly to withdraw the work from the machine. In this manner a forward movement is imparted to the slide 276, whereby the arm 274 acts on the arm 272 to turn the shaft 234 and thus to lift the latch 262 as above described. The slide 276 is provided with a slot 284 into which projects a pin 286 on the head 98 to limit movement of the slide 276 and accordingly through the lug 280 to limit the outward movement of the work support slide 96. It will be noted that, as the parts are shown in Fig. 3, the pin 286 occupies an intermediate position in the slot 284 because of the action of the spring-controlled arm 272 and of other yieldingly controlled parts hereinafter described upon the depending arm 274, the latch 262 under the influence of the spring 270 resting upon the top of the plate 264.

The eye-bolt 114 carrying the nuts 112 which by engagement with the plate 104 limit upward movement of the slide 100 is hung on the pin 214 which connects the arm 212 to the bell-crank lever 216. When the foreparts of lasts of different sizes are mounted on the work support their bottom faces are presented at different heights relatively to the work support. It is desirable, however, for proper cooperation with the gage 116, that the bottom faces of different last foreparts be presented at substantially the same height in the machine regardless of their sizes. The machine is accordingly provided with means that acts through the bell-crank lever 216 to move the pin 214 upwardly or downwardly and thus to vary the position of the eye-bolt 114 and the nuts 112 to determine the proper height of the slide 100 for each size of last. This means comprises a link 288 connecting the upwardly extending arm of the bell-crank lever to an arm 290 (Figs. 1 and 9) which is fast on a vertical shaft 292 mounted to turn in a bearing formed in a fixed bracket 294 supported by a cross-rod 296 on the frame. The shaft 292 extends upwardly through a bearing in the plate 161 and also a bearing formed in a bracket 298 which is fast on the plate 161. Fast on the upper end of the shaft, in a recess in the bracket 298, is a gear sector 300 the teeth of which are engaged by a pinion 302 mounted on a short shaft 304. The shaft 304 is mounted to turn in a bearing in the bracket 298 and has fast thereon a crank arm 306 whereby the operator is enabled to turn it and thus to adjust the height of the work support in the manner described. The crank arm 306 carries a pointer 308 (Fig. 6) arranged to cooperate with a fixed scale 310 bearing size indications to indicate when the work support is properly adjusted for each size of last. For holding the parts in adjusted positions the arm 306 carries a spring-pressed plunger 312 (Fig. 9) having a V-shaped end arranged to enter recesses between teeth formed on a plate 314 which is fast on the bracket 298.

It is contemplated that in the use of the machine in the manner herein illustrated the upper will have been previously assembled with an insole and fastened thereto at the heel end and the insole fastened by tacks in proper relation to the forepart of the last, as illustrated in Figs. 3 and 30. Accordingly when the forepart of the last is mounted on the work support in the manner hereinbefore described the insole is fastened to it and the upper and insole unit are presented to the machine with the forepart of the last when the work support is moved inwardly to carry the toe end of the last into contact with the gage 116. For positioning the toe end of the upper in proper relation to the upper-shaping or lasting instrumentalities there is provided a portable presenter of substantially the same construction as disclosed in the previously-mentioned Letters Patent No. 1,853,126. This presenter comprises two rods 316 (Fig. 30) each mounted at one end on a cross bar 318 to which is secured a handle 320, and on the other ends of the rods 316 are secured blocks 322 provided with extensions on which are mounted jig pins 324 arranged to enter jig holes previously provided in the margin of the upper at the opposite sides of the toe substantially at the ends of the tip seam. The presenter includes a plate 326 mounted on the cross bar 318 and arranged to support the heel end of the upper. To locate the toe end of the upper in proper position the jig pins 324 are arranged to cooperate with toe-embracing wipers 328 whereby, as hereinafter described, the marginal portion of the upper around the toe is wiped inwardly into lasted relation to a lip on the insole, the wipers being provided with slots 330 (Fig. 31) to receive the jig pins. Preferably the jig pins will be inserted in the holes in the upper before the work is presented to the machine, and the operator will accordingly support the presenter in one hand while he positions the forepart of the last on the work support with the other hand. When the operator thereafter moves the work support slide 96 inwardly to bring the toe end of the last into contact with the gage 116, he continues to control the presenter and thereby guides the jig pins into the slots in the wipers. In thus presenting the work the margin of the upper around the toe is positioned outspread over the upper faces of the wipers upon which it is clamped in a manner hereinafter described in the operation of the machine. The jig pins are provided with ball-shaped ends 332 which are of a little larger diameter than the holes in the upper, so that the pins and portions of the presenter adjacent thereto will be supported by the upper after the work has been presented and thus permit the operator to release the presenter, the machine being further provided with a bracket 334 which is fast on the slide 96 and is arranged to support portions of the presenter at the opposite end thereof from the jig pins.

It has been found to be practicable to use the same wipers 328 for lasting the toes of shoes of a number of different sizes instead of using a different pair of wipers for every different size. Obviously, however, the tip seam of a comparatively large upper should be located farther from the toe-end face of the last than the tip seam of a smaller upper. The machine is accordingly further provided with means arranged to cooperate with the slots 330 in the wipers to determine different positions for the jig pins 324 in presenting the uppers of shoes of different sizes. This means comprises plates 336 (Figs. 9 and 31), one for each wiper, arranged to lie close to the upper faces of the wipers and provided with slots 338 arranged to receive the jig pins 324 and to cooperate with the slots 330 in the wipers to determine the positions of these pins, as illustrated in Fig. 31. That is, each plate 336 may be so positioned as partly to cover the slot 330 in the wiper that is beneath it, so that the jig pin is engaged on one side by an edge of the wiper and on the other side by an edge of the plate 336 and is thus prevented from being moved as far into the slot 330 as would be possible in the absence of the plate 336. The plates 336 are adjustable to position them in the proper relation to the slots 330 in the wipers for the purposes in view in operating on the uppers of shoes of different sizes, so as to determine the proper length of tip for each size. Each plate 336, as illustrated in Figs.

9 and 13, is carried by a slide 340 which is mounted in a guideway formed in the cover plate 161 for inward and outward movements and is controlled, in part, by two springs 342 which are positioned in a recess in the slide and bear at their outer ends on the slide and at their inner ends on a block 344 which is fast on the plate 161, the springs being mounted on rods 346 which are fast in the block and project through openings in the outer end of the slide. It will thus be evident that the springs 342 tend to move the slide 340 outwardly. The slide shown in Fig. 9, at the right hand side, is further controlled by an arm 348 which is fast on the shaft 292 previously referred to as a part of the means for adjusting the work support upwardly or downwardly for shoes of different sizes. The arm 348 has pivotally connected thereto a block 350 which bears on the outer side of a lug 352 on the slide 340. The gage plate 336 is accordingly adjusted properly for each size of shoe simultaneously with the work support. For similarly adjusting the plate 336 at the left hand side of the structure the shaft 292 is provided at its lower end with an arm 354 (Figs. 1 and 9) connected by a link 356 to an arm 358 which is fast on a vertical shaft 360 mounted in a bracket 362 on the frame and journaled at its upper end in the plate 161. The shaft 360 has fast thereon an arm 364 which carries a block 366 arranged to engage the lug 352 on the left hand slide 340 and thus to control this slide in the same manner as the one at the right hand side.

The machine is further provided with means constructed for the most part substantially as disclosed in Letters Patent No. 1,853,126 for insuring that the jig pins 324 of the presenter will be properly positioned in the locations determined by the wipers and by the gages 336. This means comprises two levers 368 (Figs. 2 and 5) arranged to engage the blocks 322 of the presenter to force the jig pins into the proper positions if they have not already been moved fully to those positions by the operator. The levers 368 are pivotally mounted on the front ends of forwardly extending levers 370 which are pivoted on fixed studs 372 and have rearwardly extending arms 374 connected by rods 376 to arms 378 projecting rearwardly from a sleeve 380 (Fig. 5) which is mounted to turn about a rock shaft 382 supported by a bracket 384 fast on the previously-mentioned cross rod 296. The connection between each arm 378 and the corresponding rod 376 includes a spring 386 through which downward movement is imparted yieldingly to the rod and a collar 388 on the rod through which upward movement is imparted positively thereto, as more fully described in the above-mentioned Letters Patent. The levers 368 at their lower ends are connected by links 390 to bell-crank levers 392 pivotally mounted on the studs 372, and these bell-crank levers are connected to the arms 378 by means of substantially the same construction as the means connecting the arms 374 to the arms 378, comprising rods 394, springs 396 and collars 398. It will thus be seen that when the sleeve 380 is turned to swing the arms 378 downwardly the levers 368 are both elevated and swung inwardly into contact with the blocks 322 of the presenter and apply to these blocks the required pressure for the purpose in view. The upward movements of the front ends of the levers 370 are limited by stop screws 400 (Fig. 5) on the frame of the machine to determine the proper height of the upper ends of the levers 368 relatively to the presenter and to render further movement of the arms 378 thereafter effective to swing the levers 368 about their connections with the levers 370.

For operating the arms 378 as described the movement of the starting treadle 254 is utilized. For this purpose there is fast on the sleeve 380 an arm 402 (Fig. 2) pivotally connected to a bar 404. In the construction herein shown this bar is provided near its lower end with a recess 406 in one side thereof, and fast on the treadle 254 is an arm 408 the front end of which is forked to embrace the bar 404 and carries a cross pin 410 which engages the bar in the recess 406. It will thus be seen that when the treadle is depressed the cross pin engages the bar at the lower end of the recess and imparts to it downward movement for the purpose described. The treadle is held against return movement by a latch member 412 which in the construction shown is pivoted on the rear end thereof and is controlled by a spring 414, this latch member being arranged to engage a shoulder 416 formed on the lower end of a bar 418 hereinafter more particularly referred to as a part of the means for controlling the clutch through which the machine is operated. The levers 368 are thus maintained in the positions to which they are moved by the treadle when the operator removes his foot from the treadle. Through connections hereinafter described the bar 404 is disconnected from the arm 408 after the beginning of the power operation of the machine, whereupon the levers 368 are returned to their starting positions by a spring 419 connected to one of the arms 378.

For clamping the marginal portion of the upper 110 on the top faces of the wipers around the end of the toe to assist in controlling the upper and in causing it to be drawn tightly about the forepart of the last as the latter receives its downward movement, the machine herein shown is provided with an arm 420 (Figs. 3 and 6) which is pivotally mounted on a rod 422 supported by lugs 423 on the cover plate 161. The arm is extended for a considerable distance laterally to serve as a holder for a plurality of clamping devices which, as illustrated, are seven in number and are arranged to engage the upper in a series about the toe. Each of these clamping devices comprises a plate 424 (Fig. 3) fast on an arm 426 which is pivotally connected at one end to one arm of a bell-crank lever 428 pivoted at 430 on a bracket 431 on the arm 420. Each arm 426 is provided with a recess into which projects the flattened lower end of a plunger 432 slidingly mounted in a recess in the supporting arm 420 and provided at its lower end with a cross pin 434 mounted in a slot 436 in the arm 426. A spring 438 mounted in the recess in the arm 420 about a diametrically reduced portion of the plunger 432 tends to force the plunger downwardly as far as permitted by a shoulder at the lower end 439 of the recess in the arm, the upper end of the spring being seated against a screw 440 threaded in the arm 420 and provided with an opening through which the reduced portion of the plunger 432 extends. It will thus be seen that the spring 438 affords provision for yield as the plate 424 is pressed downwardly upon the upper, the several plates accordingly accommodating themselves independently to the thickness of the upper materials and each screw 440 being adjustable to vary the pressure applied to the portion of the upper engaged by the corresponding plate. Each of the arms 426 is urged forwardly along the plane of the wipers by a spring 442 which accordingly tends to swing the bell-crank lever 428 in one direction about its pivot 430. The several bell-crank levers are further controlled by screws 444 the lower ends of which are arranged to bear on these levers and thus to maintain the arms 426 in retracted positions when the supporting arm 420 is in its uppermost position. Two of the screws 444 at each side of the structure are mounted on a bracket 446 (Fig. 6) which is fast on the lug 423, and the other screws are also mounted on fixed brackets not shown in detail. It will thus be understood that when the parts are in their initial positions the clamping plates 424 are retracted so as not to interfere with other parts of the machine and that as the arm 420 receives its downward swinging movement toward the plane of the wipers 328 the springs 442 act to move the arms 426 and the plates 424 forwardly to positions over the marginal portion of the upper outspread on the top faces of the wipers, such movements being limited by the pins 434. The plates are then forced yieldingly downward upon the margin of the upper materials as hereinabove described.

For imparting to the arm 420 its operative movement its rear end portion is connected by a link 448 (Figs. 2 and 7) to an arm 450 pivoted on a rod 452 on the frame of the machine, the arm 450 being connected by a link 454 to an arm 456 which is pivoted on a rod 458 on the frame. The arm 456 carries a roll 460 engaged by a path cam 462 formed in one side of a cam wheel 464 mounted to turn on a shaft 466 on the frame and operated through a clutch as hereinafter described.

To assist in maintaining thermoplastic box toe stiffening material at a margin of the toe portion of the upper in a soft and pliable condition in the upper-shaping operation, in lasting the toes of shoes provided with stiffening material of that character, the machine has means for maintaining the clamping plates 424 in a heated condition. For this purpose there are mounted in the arm 420 two electrical heating units 468 (Fig. 5) to which lead wires 470 (Fig. 6) that lie in recesses in the arm, these wires leading to terminal brushes 472 which are maintained in contact with terminal plates (not shown) in a box 474, these plates being supplied with current from a suitable source through a conduit 476. It will be understood that the terminal plates in the box 474 are continuously in contact with the respective brushes 472 and that accordingly the arm 420 is maintained continuously in a heated condition, the heat of the arm being transmitted by conduction to the clamping plates 424.

For imparting to the forepart of the last and the work support their downward movements the previously-mentioned arm 118 carries a plate 478 (Figs. 3 and 5) having a downturned flaring rim 480 curved similarly to the toe-end portion of the lip of the insole and arranged to engage the insole at the inner side of the lip to assist in supporting the lip against the inward pressure of the wipers 328 when the latter wipe the margin of the upper inwardly against the lip. Since it is desirable to use different plates in lasting shoes of different sizes, the plate 478 is made readily detachable. For this purpose it is mounted on the lower face of a block 482 having a downwardly projecting rib 484 arranged to enter a slot extending lengthwise of the plate, this rib having a pin 486 projecting downwardly therefrom to enter a hole in the plate. The plate 478 is detachably mounted on the block 482 by a spring-controlled pin 488 the inner end of which is arranged to enter a recess in the pin 486. When the pin 488 is pulled outwardly the plate 478 may be readily detached by moving it downwardly. To permit the plate 478 to adjust itself to the surface of the insole the block 482 is mounted for rocking movements about an axis extending laterally of the last, the block having thereon curved flanges 490 projecting into curved guideways formed in plates 492 which are fast on the opposite sides of the arm 118. Rocking movements of the block 482 are limited by pins 494 in the plates 492 each arranged to be engaged by one or the other of the flanges 490. A spring 496 connected to a pin on the block 482 and to a pin on the arm 118 holds the block initially in such a position that the rim 480 engages the insole first near the end of the toe, as illustrated in Fig. 32. As the arm 118 continues its downward movement the block 482 is rocked against the resistance of the spring 496 by the action of the shoe on the plate 478 until the plate seats itself evenly upon the insole all around the toe, as illustrated in Fig. 34. This affords substantial insurance that the plate will always seat itself properly at the inner side of the lip.

The arm 118 is forked at its rear end and is pivotally mounted on studs 498 (Figs. 6 and 15) supported by lugs on the top casting 130. Between its opposite ends the arm is connected by two links 500 (Figs. 2 and 15) to a block 502 which is adjustably connected to a rod 504 (Figs. 2 and 16), this rod being connected to an arm 506 pivotally mounted on the rod 458 and provided with a roll 508 engaged by a path cam 510 formed in one side of a cam wheel 512 on the shaft 466.

To assist in conforming the upper to the top of the forepart of the last there is provided a toe rest constructed and arranged to press on the upper in that location and movable downwardly with the shoe. This toe rest comprises a block 514 (Fig. 3) hollowed out to conform approximately to the shape of the last and having fastened thereto a leather cover 516 for engagement with the upper. To assist in maintaining that portion of the tip seam of the upper which extends across the top of the forepart of the last in the position determined initially by the presenter without distortion thereof in the upper-shaping operation, and also in pressing the upper against the last at the rear of the tip seam, there are mounted in the block 514 a plurality of pairs of spring-pressed plungers 518 arranged to extend in a series across the forepart and in engagement at their upper ends with thin flexible steel plates 520, one for each pair of plungers, fastened to a strip of leather 521 (Fig. 32) under the cover 516. It will be understood that these plungers are yieldable downwardly upon engagement of the toe rest with the shoe and increase the force with which the upper is pressed against the last forepart along the tip seam and at the rear thereof. The block 514 is detachably mounted on the upper end of a bar 522 vertically movable in a bearing in the previously-mentioned bracket 102. To permit it to be readily detached the block 514 is provided with flanges 524 movable in horizontal guideways in the top of the bar 522, and the block is held in operative position by a pin 526 pressed upwardly by a spring 528 in the bar and having a tapered upper end arranged to seat in a recess in the block. A small pin 530 projecting forwardly from the pin 526 through a slot in the bar 522 permits the pin 526 to be readily depressed to release the block 514.

The bar 522 at its lower end rests on a block 532 which is guided for movements in slots 534 in the bracket 102, and extending through a hole in the block is a rod 536 which is threaded in the lower end of the bar 522. The rod 536 extends downwardly through a nipple 538 in which it is slidingly mounted, this nipple being threaded in a sleeve 540 which is threaded in the bracket 102. The nipple 538 provides a seat for the lower end of a spring 542 the upper end of which bears against the block 532. A spring 544 connected to the lower end of the rod 536 and to the previously-mentioned arm 408 (Fig. 2) on the starting treadle serves to hold the bar 522 at all times down upon the block 532. It will be understood that in the operation of the machine the bar 522 and the block 532 are forced downwardly against the resistance of the spring 542 by the pressure of the shoe on the toe rest as the shoe receives its downward movement. It is desirable that initially the toe rest be held downward far enough not to interfere with the movement of the forepart of the last inwardly into contact with the gage 116. For this purpose the block 532 is connected by two links 546 to two levers 548 (Figs. 3 and 15) which are pivoted on a rod 550 on the bracket 102 and the rear ends of which rest on rolls 552 carried by a block 554 (Fig. 2) which is fast on the rod 504 previously referred to as a part of the means for operating the arm 118 that depresses the shoe. Initially, therefore, the levers 548 are so held as to maintain the block 532 in a lowered position, so that the toe rest is below the path of inward movement of the forepart of the last in the presentation of the work. As the rod 504 starts its downward movement the downward movement of the rolls 552 controlling the levers 548 permits the spring 542 to move the toe rest upwardly into contact with the shoe, this movement taking place before the arm 118 has been moved far enough to begin to depress the shoe. Thereafter the toe rest is moved downwardly by the shoe as previously described.

For controlling the marginal portion of the upper in locations farther rearwardly than the clamp members 424, to assist in drawing the upper tightly over the forepart of the last and also to insure that the opposite ends of the tip seam will be located at the proper distances from the toe-end face of the last at the end of the upper-shaping operation, the machine is provided with grippers which grip the margin of the upper at the opposite sides of the forepart, as illustrated both forwardly and rearwardly of the tip seam, each gripper comprising a lower jaw 556 (Figs. 11, 12 and 13) and an upper jaw 558. The jaw 556 is fastened to a projection 560 on a carrier 562, and the jaw 558 is fastened to an arm 564 which is mounted between two upwardly extending side portions of the carrier 562. The arm 564 at its outer end carries a pin 566 guided for upward and downward movements in slots 568 in the sides of the carrier 562, the pin being mounted on the lower end of a rod 570 which is slidingly movable upwardly and downwardly in a plate 572 fastened to the side portions of the carrier 562. A spring 574 between the plate 572 and nuts 576 on the rod 570 tends to lift the rod and the outer portion of the arm 564. This arm has also mounted therein between its opposite ends a spring-pressed plunger 578 which bears on the carrier 562 and thus tends to swing the arm upwardly about the pin 566 to lift the gripper jaw 558. The arm 564 is further controlled by a bell-crank lever 580 pivoted on a stud 582 on the carrier 562, one arm of this lever carrying a roll 584 in engagement with a cam face 586 on the arm 564. It will thus be seen that by movement of the bell-crank lever 580 in a counterclockwise direction (Fig. 13) the arm 564 is swung downwardly against resistance of the plunger 578, through the wedging action of the roll 584 on the arm, to carry the gripper jaw 558 into gripping relation to the jaw 556. The spring 574 affords provision for yield in accordance with variations in the thickness of different uppers, the outer end of the arm 564 being forced downwardly more or less by the bell-crank lever against the resistance of this spring after the upper has been gripped.

For operating each bell-crank lever 580 there is provided a lever 588 (Figs. 2, 6 and 7) pivotally mounted on a stud 590 on the lug 423. Each lever 588 is adjustably connected at its rear end by a link 594 to the previously described clamp-operating arm 420. At its front end each lever 588 carries a plate 596 (Fig. 12) arranged to overlie a roll 598 that is mounted on a stud 600 carried by the bell-crank 580. Accordingly by downward movement of the plates 596 the two grippers are operated to grip the upper at the same time that the clamp members 424 are operated to clamp the upper upon the wipers. Each lever 588 also carries a plate 602 arranged to underlie a roll 604 on the stud 600 (Fig. 11) to insure the opening of the gripper in the return of the parts to starting positions.

Each gripper carrier 562 is mounted for movements in directions widthwise of the forepart of the last in guideways 606 (Fig. 14) formed in a slide 608 which is mounted for movements in directions lengthwise of the forepart of the last on the cover plate 161. Each gripper carrier is controlled by mechanism that tends to urge it outwardly away from the last forepart and against the resistance of which it may be pulled inwardly along the guideways 606 by the action of the margin of the upper on the gripper as the forepart of the last is forced downwardly. This mechanism comprises, for each gripper carrier, a bell-crank lever 610 (Fig. 6) pivoted on the cover plate 161 and provided with a roll 612 arranged to engage an arm 614 projecting from the carrier 562. A spring 616 connected to each bell-crank lever 610 tends to swing it in the direction to force the gripper outwardly and is yieldable as the gripper is pulled inwardly by the upper. Such outward movements of the grippers are limited by contact of the jaws 556 with shoulders on the slides 340 previously referred to as carrying the gage plates 336, as shown in Fig. 13. Accordingly as these gage plates are adjusted for shoes of different sizes by the crank arm 306 in the manner hereinbefore described the grippers are adjusted with them in directions widthwise of the forepart of the last.

Each slide 608 supporting the gripper carrier 562 as described is controlled by a spring 618 (Figs. 6 and 14) which bears at one end on a lug 620 on the cover plate 161 and at its other end on a block 622 in engagement with a screw 624 in the slide, the spring thus tending to move the slide and the gripper lengthwise of the forepart of the last in a forward direction, i. e., a direction away from the heel-end portion of the shoe materials. The machine is further provided with means for moving each slide 608 and its gripper in the opposite direction in the upper-shaping operation to impart to the gripper what may be termed a reardrawing movement to assist in avoiding too prominent wrinkles in the marginal portion of the upper about the toe and to locate the end portions of the tip seam at the proper distances from the end of the toe and in proper relation to that portion of the tip seam that extends across the top of the forepart of the last. It will be understood that, in view of this operation, the upper materials will have been so cut and fitted that the tip seam initially will be curved and its opposite ends therefore located nearer the toe and face of the last, as the upper is presented by the jig pins and is first gripped by the jaws 556 and 558, than is required in the finished shoe. For imparting to the grippers such reardrawing movements there is associated with each slide 608 an upwardly and downwardly movable bar 626 (Figs. 3, 5 and 14) having cam faces 628 and 629 arranged to engage a roll 630 on the slide 608, so that when the bar 626 is moved downwardly the slide and the gripper are moved lengthwise of the forepart of the last against the resistance of the spring 618 for the purpose described. The cam face 628 imparts a comparatively quick initial movement to the gripper and the face 629 a slower movement as the upper-shaving operation progresses. Each bar 626 is suitably guided by the slide 608 and by the cover plate 161 and is connected near its lower end by a link 632 (Figs. 1 and 3) to a rod 634 supported by two arms 636 which are connected together and are pivotally mounted on the previously-mentioned shaft 234. Springs 638 connected to the arms 636 and to the fixed plate 110 tend to swing these arms inwardly and accordingly to swing the lower ends of the bars 626 in the same direction. It will be observed that the rod 634 bears on the arm 274 previously referred to as extending downwardly from the slide 276 on the work support and is accordingly in position to be controlled by the arm. The lower end portions of the bars 626 are held by the springs 638 in engagement with rolls 640 carried by the levers 548 previously referred to as controlling the toe rest 514. Each bar 626 has formed therein a notch 642 arranged to receive the roll 640, the bar, however, being held initially upraised, by a spring 644, so that when the notch is higher than the roll, as shown in Fig. 3. When in the operation of the machine the forward ends of the levers 548 are swung upwardly by the toe-rest-operating spring 542, as a result of the downward movement of the rolls 552 (Fig. 2) that control them, the rolls 640 are carried to positions opposite the notches 642, whereupon the bars 626 are swung by the springs 638 to positions in which the rolls lie in these notches. Accordingly, when the toe rest thereafter receives its downward movement in response to the pressure of the shoe thereon, the movement of the levers 548 resulting therefrom serves to impart downward movements to the bars 626, whereby the cam faces 628 and 629 are rendered operative to impart to the grippers their reardrawing movements simultaneously with the downward movement of the shoe and the inward movements of the grippers toward the sides of the forepart of the last. In the return of the parts of the machine to starting positions the bars 626 are disconnected from the rolls 640 by the action of the arm 274 on the rod 634 when the work support slide 96 is pulled outwardly by the operator. This permits the bars to be raised to their initial positions by their springs 644, their upward movements being limited by engagement of lugs 645 thereon (Fig. 1) with the plate 161.

Figure 5:
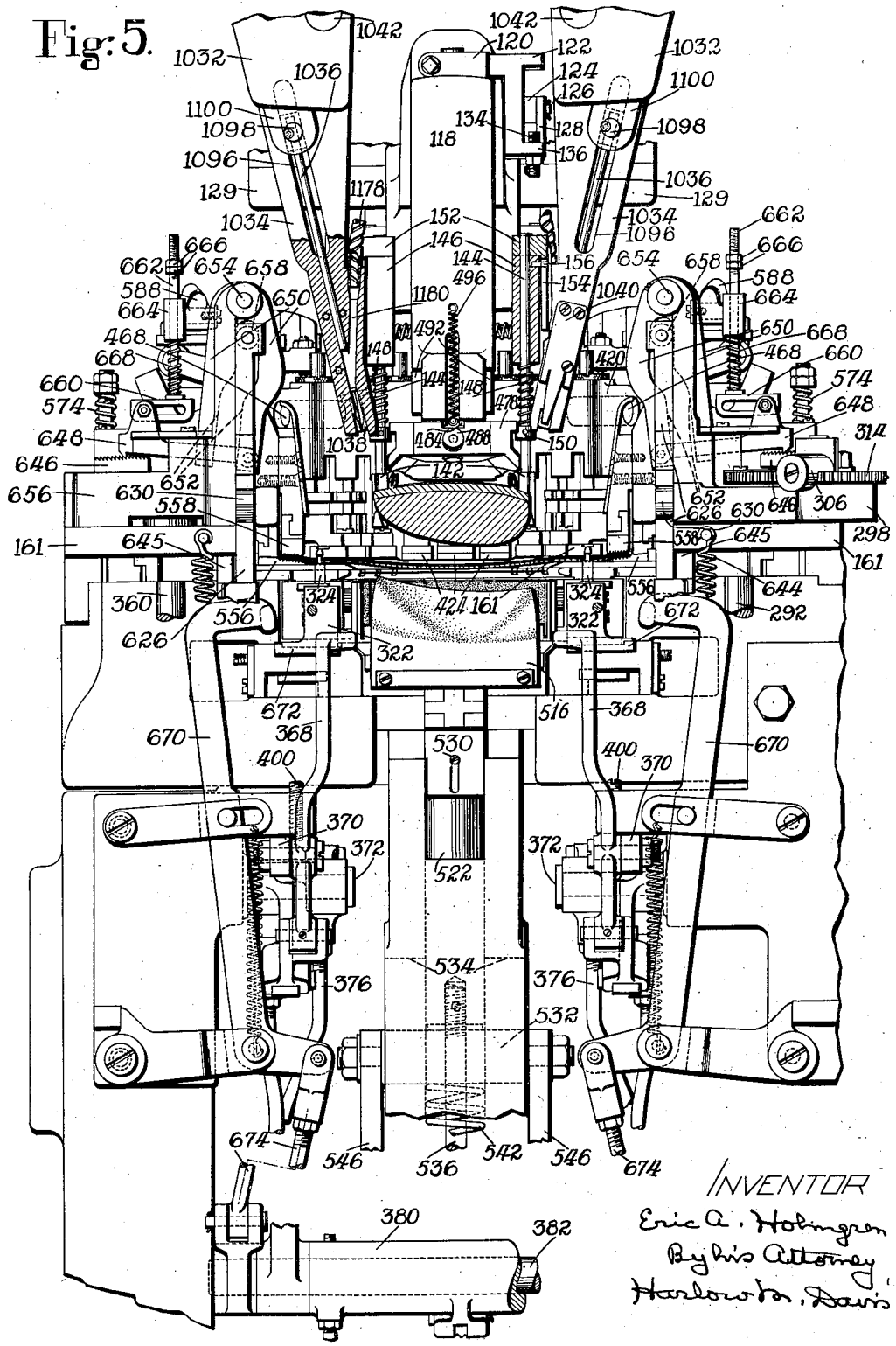
Fig. 5 is a view on an enlarged scale showing portions of the machine, partly in front elevation and partly in section, as they appear early in the cycle of operations.

It will be understood that when the upper is gripped by the gripper jaws 556, 558 it is outspread over the top faces of the wipers 328, and that as the forepart of the last is forced downwardly the upper is bent over the edges of the wipers, the margin of the upper exerting a force on the grippers by which they are pulled inwardly toward positions over the edges of the wipers. It will also be evident that the effectiveness of the inward pull of the upper on the grippers tends to decrease as the grippers approach positions over the edges of the wipers and that accordingly the strain of the grippers on the upper tends to increase toward the end of the downward movement of the forepart of the last. In order to prevent excessive strain on the upper by the grippers the machine is further provided with means for imparting to the grippers inward movements independently of the upper near the end of the downward movement of the work. For this purpose there is fastened to the plate 572 on each gripper carrier 562 (Figs. 11 and 12) a plate 646 having ratchet teeth thereon, and for engaging these teeth there is provided at each side a pawl 648 (Fig. 5). Each pawl 648 is pivotally connected to one arm of a two-armed lever 650 the two arms of which are arranged to provide a cam path 652 between them. The lever 650 associated with the right-hand gripper is pivoted at 654 for swinging movements laterally of the forepart of the last on an arm of the previously-mentioned bracket 298, and the lever at the left-hand side is pivoted at 654 on a corresponding bracket 656. Lying in the cam path 652 of each lever 650 is a roll 658 mounted on a stud on the upper end of the previously-mentioned bar 626. As will be evident from Fig. 5, the rolls 658 near the end of the downward movements of the bars 626 become effective on the levers 650 to swing them inwardly and thus to cause the pawls 648 to exert an inward pull on the grippers. Initially the pawls are held out of contact with the ratchet teeth by mechanisms connecting them with the arms 588 whereby the gripper jaws are closed on the upper. Each of these mechanisms comprises a member 660 provided with a horizontal slot to receive a stud carried by the pawl and having an upwardly extending rod 662 which is slidingly mounted in a sleeve member 664 pivotally supported on the end of the arm 588. On each rod 662 are nuts 666 through which the sleeve member acts to lift the rod and the pawl 648. As the arms 588 are swung downwardly to close the grippers the pawls are permitted to drop into engagement with the ratchet teeth, springs 668 being further provided through which the sleeve members 664 are rendered effective to hold the pawls pressed down upon the ratchet teeth. At a predetermined time in the cycle of the machine the pawls are lifted by the upward movements of the arms 588 to permit the outward return movements of the grippers.

After the margin of the upper has been gripped and has been clamped on the wipers in the manner hereinabove described, it is necessary that the jig pins 324 of the presenter be withdrawn from the holes in the upper prior to the shaping of the upper over the forepart of the last. For this purpose the machine is provided with mechanism of substantially the same construction as disclosed in Letters Patent No. 1,853,126 and which accordingly need not be described in detail. Briefly, this mechanism comprises levers 670 (Fig. 5) having inturned upper end portions arranged to engage lateral projections 672 on the presenter blocks 322 and to pull the jig pins downwardly away from the upper. For swinging these levers and moving them downwardly they are connected by links 674 to arms on the previously-mentioned rock shaft 382, and this rock shaft is connected by a link 676 (Fig. 2) to a bell-crank lever 678 one arm of which is in the path of a roll 680 carried by the cam wheel 512 (Fig. 15).

As the forepart of the last is forced downwardly the upper around the toe is wiped upwardly by an upwiping device including a toe band 682 (Fig. 10) preferably made of leather and arranged to contact with the upper. This toe band is fastened by screws midway between its opposite ends to a block 684 (see also Fig. 3) which is movable in directions lengthwise of the shoe in guideways formed in a casting 686 supported on portions of the top frame casting 130. Projecting rearwardly from the casting 686 is a rod 692 on which is a spring 694 bearing at one end on the block 684 and at its other end on a nut 696 on the rod. The spring thus tends to move the block 684 forwardly toward the toe but is yieldable to permit the block to be moved rearwardly by the pressure of the end face of the shoe on the toe band. A screw 698 threaded in the casting 686 and arranged to bear on a shoulder on the block 684 determines adjustably against the resistance of the spring 694 the normal position of the block. Pivotally connected to the block 684 at each side thereof is one link of a chain comprising, as shown, three links 700 which are pivotally connected together and extend around that portion of the toe band 682 that contacts with the upper around the corner of the toe. Between each chain and the band is a thin flexible steel plate or ribbon 702, this ribbon extending forwardly along the band beyond the chain and being fastened to the band by rivets 704. Around the outer sides of both series of links 700 extends a thin flexible steel plate or ribbon 706 which is fastened midway between its ends to the block 684. Fast on the casting 686 are two blocks 708, and in each block is mounted a spring-pressed plunger 710 which bears against the ribbon 706. Also supported on each block 708 is a spring 712 the outer end of which bears on a plate 714 on the block and the inner end against the ribbon 706, the inner end of the spring being maintained in proper position by a stud 716 on the ribbon. It will thus be seen that the plungers 710 and the springs 712 are yieldable to permit the band to be forced outwardly by the shoe. The band 682 is further controlled near its opposite ends by slides 718 mounted for movements laterally of the shoe in guideways in the casting 686 and each having thereon an upwardly extending stud 720 upon which is pivoted a plate 722. Each plate 722 has a shoulder 723 supporting the band 682 against downward movement, as illustrated in Fig. 33, and has a slot or groove 724 extending heightwise and lengthwise of the form and in which the lower edge portion of the ribbon or plate 702 is slidingly mounted. The plates 722 thus hold the band in place and support it while permitting the portions thereof at the opposite sides of the toe to move lengthwise relatively to the plates. Each slide 718 is backed up by a spring 726 which bears at its outer end on a plate 728 fast on the casting 686 and is guided by a rod 730 fast on the slide and movable through an opening in the plate 728. It will thus be seen that the slides 718 may be moved outwardly against the resistance of the springs 726 by the pressure of the shoe against the band.

In order to render the toe band 682 effective to wipe the upper tightly upward around the end and the sides of the toe, it is so positioned initially by the yieldable controlling means above described that it defines an opening a little smaller than the toe and accordingly is forced outward all around the toe as the shoe is forced downwardly within it. It is desirable that while the shoe remains in the machine during operations after the wiping of the marginal portion of the upper inwardly over the insole the pressure of the toe band on the upper be relaxed to avoid any danger of producing a mark on the upper which would be visible in the finished shoe. The machine is accordingly further provided with means for opening the toe band laterally and for moving it lengthwise of the shoe. For this purpose there are slidingly mounted in the casting 686 for movements lengthwise of the shoe bars 732 provided with wedge faces 734 arranged to contact with projections 736 on the lower faces of the slides 718. These wedge faces accordingly determine the initial positions of the slides 718 widthwise of the shoe, in cooperation with the springs 726, and upon rearward movement of the bars 732 also serve to force the slides outwardly to relax the pressure of the band on the sides of the toe. To relax the pressure of the band at the end and corners of the toe the bars 732 have fast thereon arms 738 carrying pins 740 that lie in slots formed in the ends of levers 742 pivoted at 744 on the casting 686 (Fig. 10a). Each lever 742 carries a pin 746 that lies in a slot 748 in a link 750 which is pivotally connected to an angularly-shaped bracket 752 secured to the band 682. It will thus be seen that as the bars 732 are moved rearwardly they swing the levers 742 which act through the links 750 to pull the band outwardly away from the shoe at the corners of the toe. The force applied through this mechanism is effective also on the central slide 684 to move this slide rearwardly against the resistance of the spring 694 enough to relax the pressure on the end of the toe for the purposes in view. It will be understood that the slots 748 in the links 750 permit these links to move relatively to the levers 742 as the band is forced outwardly by the pressure of the shoe against it.

The wedge bars 732 are operated by lever arms 752 (Figs. 2 and 10) fast on a rock shaft 754 which is mounted in a holder 756 on the top casting 130. Also fast on the rock shaft 754 is a crank arm 758 connected by a link 760 to a lever 762 mounted on a cross rod 764 on the frame, the lever being provided with a roll 766 engaged by a path cam 768 formed in one side of the cam wheel 464. The cam is so formed and arranged that initially the wedge bars 732 are in their foremost positions, with the toe band 682 positioned as required for the upwiping operation as the shoe is forced downwardly within it. After the wiping of the upper inwardly over the insole by the wipers 328 the wedge bars are operated by the cam to relax the pressure of the toe band on the upper as hereinbefore described. Near the end of the cycle of operations the wedge bars are returned to their initial positions preparatory to the operation of the machine upon the next shoe.

As the forepart of the last is forced downwardly the marginal portion of the upper slips inwardly toward it, more or less, between the several clamping members 424 and the wipers at the same time that the side grippers are moving inwardly. At the end of the downward movement the wipers 328 are advanced and closed to wipe the marginal portion of the upper inwardly over the feather and against the lip of the insole. These wipers are supported on wiper carriers 770 (Fig. 9) upon which they are detachably fastened by spring-controlled retaining members 772 substantially as disclosed in Letters Patent No. 1,853,126. The wiper carriers 770 are suitably guided for advancing and closing movements by rolls 774 and 776 mounted on the top casting 130 and cooperating with slots in the carriers. The two carriers are connected by links 778 to a cross bar 780 on one end of a slide 782 which is operated through a toggle 784 (Fig. 2) backed up by a spring 786 whereby the wipers are pressed yieldingly against the upper. The toggle 784 is operated through a link 788 from a lever 790 mounted on the rod 764, this lever carrying a roll 792 engaged by a path cam 794 formed in one side of the cam wheel 464.

As the wipers 328 are advanced and closed to wipe the marginal portion of the upper against the lip of the insole in the manner above described, they carry with them and apply to the upper around the toe a toe binder 796, shown in Fig. 38 as applied to the shoe, this binder as illustrated having been previously formed from wire and placed in a groove 798 (Figs. 25 and 29) formed in the edges of the wipers and spaced from the opposite upper and lower faces of the wipers. The binder is preferably made of comparatively soft and flexible metal, such as aluminum, and at its opposite ends it is stamped to provide flattened portions 800 adapted to be readily pierced by tacks to fasten the binder to the shoe. The binder is forced into the groove 798 in the wipers, before the presentation of the work to the machine, by the use of mechanism hereinafter described. As thus positioned it lies substantially flush with the wiping edges of the wipers all along these edges, the groove 798 being suitably widened to receive its flattened end portions 800, and these portions are held yieldingly in place by balls 802 mounted respectively in recesses in the different wipers and each pressed yieldingly against the binder by a small spring plate 804 which is fastened to the wiper. In the portions of the edges of the wipers where the flattened ends of the binder lie there are provided notches 806 through which tacks may be driven by means hereinafter described to pierce the ends of the binder and fasten it to the shoe, another notch 808 also being provided in each wiper through which to drive an additional tack into the shoe in a location rearwardly of the end of the binder. By reference to Fig. 25 it will be seen that the groove 798 does not extend throughout the length of the wiper edges, but terminates short of the ends of the wipers.

For presenting each binder in the groove 798 of the wipers there is provided mechanism shown in Figs. 23 to 28, inclusive. This mechanism consists of a portable device having a handle portion 810 by which the operator manipulates it. Within the handle 810 is a plate 812 (Fig. 28) relatively to which there is provision for limited lengthwise sliding movement of the handle for a purpose hereinafter described. Fastened to the plate 812 by screws 814 is a bar 816, and also fastened to the plate by these screws is a thin plate 818 in spaced relation to the bar 816 and arranged to serve as a carrier for binder-engaging members hereinafter described. Mounted parallel to the plate 818 is another plate 820 carrying a screw 822 which projects through a slot 824 in the bar 816 and the head of which overlaps the bar. This bar at its outer end carries a screw 826 which extends through a slot 828 in the plate 820. It will thus be seen that by these screw and slot connections the bar 816 is guided for movements with the plate 818 along the plate 820. Springs 830 mounted between a block 832 on the handle 810 and a block 834 fast on the plate 820 tend to retract the handle, together with the bar 816 and the plate 818, such movement being limited by a pin 836 on the plate 820 in engagement with the bar 816 at the end of the slot 824. Telescopic rods 838 between the blocks 832 and 834 serve to hold the springs 830 in place.

Fast on one side of the plate 820 (Fig. 25) is a small plate 840 having a slot that registers with the slot 828 and provided with a front edge 842 so shaped as to conform to the intermediate portion of the edges of the wipers 328 when the wipers are in their open positions. Mounted also on the plate 820 are two plates 844 having outer edges shaped to conform substantially to those portions of the edges of the wipers that engage the upper at the sides of the toe, hereinafter referred to as the side portions of the wiper edges. In order that the same binder-presenting device may be used to present binders to wipers of different sizes the two plates 844 are movably mounted on the plate 820. At their front end portions they are reduced in thickness to provide flanges 846 arranged to be overlapped by flanges on the plate 840 to assist in holding the plates 844 in place while permitting them to have inward and outward sliding movements over the plate 820. Each plate 844 carries a pin 848 (Fig. 23) that projects through a slot 850 in the plate 820 and is connected by a spring 852 to a pin 854 on the plate 820. The springs 852 thus tend to slide the plates 844 outwardly to limits determined by the pins 348 while permitting them to be forced inwardly upon engagement with the edges of the wipers to accommodate themselves to the size of the wipers. The plates 844 are also overlapped by other mechanism, hereinafter described and illustrated in Fig. 25, which assists in holding them close to the plate 820. When the device is in binder-presenting position the plates 842 and 844 thus engage the edges of the wipers just above the groove 798 in the wipers, Figs. 25 and 26 being inverted plan views, so that this groove is substantially in the plane of the lower faces of these plates which serve as guiding means for the binder. To assist in positioning the device in exactly this relation to the wipers the end portion of the plate 820, beyond the edge of the plate 840, is arranged to overlap the wipers (Fig. 23), and on this end portion of the plate is fastened a member 856 which assists in guiding and locating the device. There are also fastened on the plate 820 arms 858 arranged to overlie and contact with the gage plates 336 which are over the top faces of the wipers, and arms 860 arranged to underlie and engage the bottom faces of the wipers.

Before the binder 796 is presented to the machine it is in a substantially straight condition, as illustrated in Fig. 25, and it is placed upon the plates 840 and 844 with its flattened ends 800 projecting into slots formed in blocks 862 and 864 fast on the plate 820, the blocks 862 having end portions arranged to underlie the ends of the wipers, as illustrated. In thus placing the binder the operator holds the presenting device inverted, with the lower faces of the plates 840 and 844 uppermost. The intermediate portion of the binder as thus positioned rests against the edge of a thin plate 866 which has an edge contour substantially complemental to the contour of the intermediate portion of the edges of the wipers and is swiveled for limited rocking movements about an axis perpendicular to the plane of the wipers on a curved guideway 868 formed on the forward end of the plate 818. To assist in maintaining the binder in position there is provided a thin plate 870 mounted over the plate 866 and having spring fingers 872 under which the binder is pushed by the operator, the plate 870 being confined by a spring clip 874 which overlaps it and is held in place by a screw 876 threaded in an opening in the previously-mentioned screw 826 (Fig. 23). The plate 870 has a slot 878 through which the screw 876 extends, and the plate is movable relatively to the plate 818 within the limits determined by the screw and slot. A spring 880 mounted on a rod 882 that projects from the plate 870 and is slidingly mounted in a hole formed in a cross bar 884 fast on the plate 818 tends to move the plate 870 forwardly but is yieldable upon engagement of the plate with the edges of the wipers, the plate having an edge contour substantially complemental to the contour of the intermediate portion of the wiper edges. Through the provision for such yield of the plate 870 the plate 818 is permitted to force the binder into the groove in the intermediate portion of the wipers by pressure of the swiveled plate 866 against the binder.

In the use of the device, after positioning it with the plates 842 and 844 in engagement with the edges of the wipers, the operator pushes forwardly on the handle 810, thereby sliding the plate or carrier 818 forwardly along the plate 820 against the resistance of the springs 830. In this operation the plate 866 in engagement with the intermediate portion of the binder advances it along the plates 840 and 844, bending it by reason of the engagement of its end portions with the ends of the wipers and forcing its intermediate portion into the groove in the wipers, the plate 866 rocking, if necessary, on its guideway 868 so as to assume a position in conformity to the curvatures of the wiper edges. Just before the plate 866 arrives at the end of its movement the plate 870 comes into engagement with the edges of the wipers below the groove 798 and is stopped, so that the binder is forced inwardly away from it. At this time the binder is seated approximately in proper position in the groove all along the edges of the wipers. To insure that the end portions of the binder will be properly positioned there are further provided two plates 886 that lie in recesses in the plate 818 in the same plane as the plate 866 and have projections 888 and 890 for engagement with the binder. The plates 886 are pivoted at 892 on arms 894 that are pivoted, in turn, at 896 on the bar 884 previously referred to as fast on the plate 818. Pins 897 on the plates 886 serve by engagement with the arms 894 to limit turning movements of the plates. Swiveled in recesses in the arms 894 are links 898 that are pivoted on studs 900 on the ends of a cross-bar 902 connected by links 904 to a plate 906 fast on the handle 810. As previously stated, there is provision for sliding movement of the handle 810 along the bar 812 which is fast on the plate 818 (Fig. 28), and by such movement of the handle and the links 904 the links 898 are operated in a toggle-like manner to swing the arms 894 outwardly and thus cause the plates 886 to press the ends of the binder fully into the groove in the wipers, the plates turning about their pivotal connections 892 with the arms as may be necessary to cause their projections 888 and 890 to bear firmly against the binder. A spring 908 between the bar 884 and the plate 906 resists such movement of the handle until the plate 818 has been moved forwardly as far as permitted by the wipers, in the manner hereinbefore described, and accordingly serves initially to hold the plates 886 retracted within the recesses in the plate 818 in which they are mounted, the plates 886 by engagement with the plate 818 serving to limit retractive movement of the handle 810 under the influence of the spring 908. For further insurance that the arms 894 will not be swung outwardly too soon, there are pivoted on blocks 910 on the plate 818 latches 912 provided with shoulders 914 (Fig. 25) which by engagement with the arms 894 prevent them from swinging. Springs 916 connected to these latches and to the bar 884 hold them normally in operative positions. To cause the latches to release the arms there are provided stop screws 918 mounted in the latches and arranged to be engaged by the blocks 862 on the plate 820, as shown in Fig. 26, to swing the latches away from the arms 894 substantially at the end of the forward movement of the plate 818.

The mechanism for driving tacks to fasten the binder to the shoe and to hold the upper at the rear of the binder is operated through a clutch which is separate from the main clutch and is actuated automatically at a predetermined time in the cycle of the machine. It will therefore be convenient first to describe the main clutch and the means whereby it is operated and controlled. In most respects these parts are generally similar to the disclosure of Letters Patent No. 1,853,126. Mounted to turn on a sleeve on the stationary shaft 466 (Fig. 15) is a worm gear 920 driven continuously by a worm 922 (Fig. 2) fast on a shaft 924, this shaft being driven through spiral gears 926 by a shaft 928. Fast on the shaft 928 is a gear wheel 930 driven by a worm 932 on a shaft 934 which, in the machine hereinshown, is operated by an electric motor 936 (Fig. 1). The worm gear 920 serves as one element of each of two clutches associated respectively with the two halves of the twin machine and controlled by separate treadles 254. Each clutch is of a well-known type and serves to connect the gear 920 to a sleeve member 938 (Fig. 15) on which the cam wheel 512 is keyed, this sleeve member being connected by a tongue 940 to another sleeve member 942 that carries the cam wheel 464. The sleeve member 938 is so formed as to provide a hub 944 in which is swiveled a clutch pin 946 (Fig. 17) adapted to be turned either into or out of position for a flattened inner end thereof to be engaged by one or another of a series of teeth formed on a ring 948 which is fast in a recess in the hub of the gear wheel 920. For controlling the clutch pin 946 there is mounted on the periphery of the hub 944 a ring 950 having a recess into which loosely projects a pin 952 fast in the clutch pin. Springs 954 tend to turn the ring 950 to a position such that the clutch pin 946 is in the path of the teeth on the member 948, so that the clutch is operative to drive the cam wheels. When the clutch is inoperative the ring 950 is held in a position such that the pin 946 is out of the path of the teeth by a finger 956 in engagement with one or another of two shoulders 958 and 960 on the ring. When the finger is in engagement with the shoulder 958 the parts of the machine are in their starting positions, and when it is in engagement with the shoulder 960 they are in the positions that they assume with the upper under the pressure of the wipers 328 at the end of the operative movements of the wipers. At this point in the cycle the cam wheels 464 and 512 are thus brought automatically to a stop to permit the driving of the tacks by the separately controlled tacking mechanism.

The finger 956 is fast on a sleeve 962 mounted to turn on the rod 764 and is held against the ring 950 by a spring 964 (Fig. 16) connected to an arm on the sleeve. To start the machine the finger is lifted by turning the sleeve against the resistance of the spring. This is done in the first instance by the treadle 254 which has a shoulder 966 (Fig. 2) for engaging the lower end of the previously mentioned bar 418 and lifting the latter, the bar being pivoted at 968 (Fig. 16) on an arm 970 that projects from the sleeve 962. It will be understood that before the treadle has been moved far enough thus to start the machine the levers 368 are operated by it through the bar 404 and mechanism connected therewith to insure that the work presenter will be in proper position, as hereinbefore described. In the construction herein shown the bar 404 is connected to the clutch-actuating bar 418 by a link 972 (Fig. 2) and a spring 974 (Fig. 16) connected to the bar 418 tends to swing it about its pivotal connection with the arm 970 and thus to maintain the bar 404 against its operating pin 410 on the treadle arm 408 and also to maintain the lower end of the bar 418 in position to be operated upon by the treadle. After the starting of the machine the treadle is held against return movement by the latch 412 in engagement with the shoulder 416 on the bar 418, as previously described, to maintain the levers 368 in operative positions. To release the treadle, in the machine herein shown, there is provided a cam 976 (Fig. 16) on the cam wheel 512 arranged to act on an arm 978 adjustably mounted on the bar 418 and thus to swing the bar to withdraw its shoulder 416 from under the latch 412 on the treadle and also to carry its lower end from over the shoulder 966. In case the operator should still hold the treadle depressed, the link connection 972 between the bar 418 and the bar 404 serves at this time to disconnect the bar 404 from the treadle arm 408 so as to release the levers 368 and permit their return to starting positions. The withdrawal of the bar 418 from over the shoulder 966 on the treadle also insures that the clutch will be released at the proper time by the finger 956 even though the treadle is held depressed, since the movement of the treadle is limited by a stop screw 980 thereon in engagement with the member 257. The treadle when released by the operator is returned by the previously mentioned spring 258.

After the cam wheels 464 and 512 have been brought to a stop by the finger 956 in engagement with the shoulder 960 of the ring 950 to permit the tacking operation, they are started again automatically by the lifting of the finger after a predetermined interval during which the tacking takes place. The mechanism for accomplishing this is generally similar to that disclosed in Letters Patent No. 1,853,126 for determining the time that the machine there shown remains at rest with the upper under molding pressure. This mechanism comprises a ratchet wheel 982 (Figs. 1 and 17) mounted to turn on the rod 764 and held normally by a torsion spring 984 in a position determined by a lug 986 thereon in engagement with a stop 988 adjustably secured to a part of a casting 990 mounted over the gear wheel 920. The ratchet wheel 982 has mounted in a lug thereon a screw 992 which, after the wheel has been turned a definite distance from the position determined by the stop 988, engages a projection on the sleeve 962 to which the clutch-controlling finger 956 is fastened and then turns the sleeve to lift the finger. The ratchet wheel is moved by a pawl 994 mounted on the lower end of an arm 996 which is pivoted at 998 on the casting 990, the arm 996 carrying a roll 1000 in the path of two cams 1002 on the hub of the gear wheel 920. A spring 1004 acts on the arm to hold the roll on the hub of the gear wheel. The arm 996 is therefore swung repeatedly by the cams on the continuously running gear wheel 920 and acts through the pawl 994 to turn the ratchet wheel 982; but normally the ratchet wheel is returned by the spring 984 to its initial position each time that the pawl is retracted. To render the ratchet wheel operative for the purpose in view, there is provided a retaining pawl 1006 pivotally mounted at 1008 and having rigidly connected thereto an arm 1010 carrying a roll 1012 in engagement with the periphery of the cam wheel 512. A spring 1014 tends to pull the pawl into engagement with the ratchet teeth, but normally it is held out of such engagement by the periphery of the cam wheel. Immediately before the finger 956 engages the shoulder 960 to disconnect the parts of the clutch, a depression 1016 in the periphery of the cam wheel arrives in a position opposite the roll 1012, permitting the spring 1014 to engage the pawl 1006 with the ratchet teeth. After this occurs the ratchet wheel is held by the retaining pawl 1006 each time that it is turned by the pawl 994. By the repeated movements of the arm 996 the ratchet wheel is therefore turned far enough ultimately to lift the finger 956 and thus actuate the clutch to start the cam wheels 464 and 512 again in operation. Immediately thereafter the retaining pawl 1006 is withdrawn from the ratchet teeth by the action of the cam wheel 512 on the arm 1010, whereupon the ratchet wheel is returned to its starting position by the spring 984.

Figure 21:
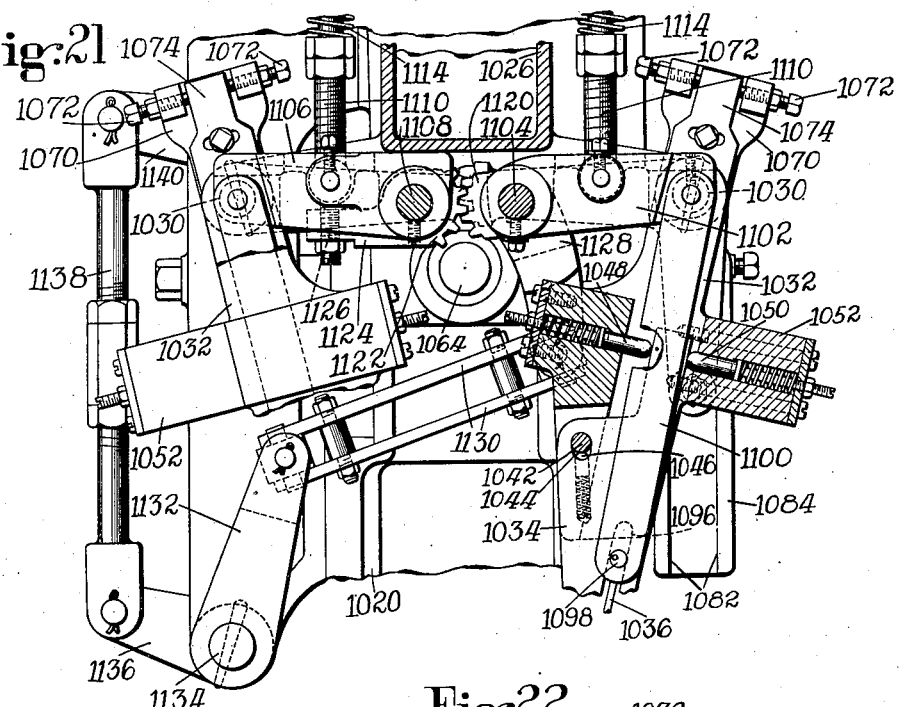
Fig. 21 is a view partly in front elevation and partly in section, showing a portion of the fastening-inserting mechanism.

For supporting the tacking mechanism there is mounted on the top frame casting 130 a casting 1018 and over this another casting 1020 (Fig. 2). Supported for upward and downward movements by parallel links 1022 and 1024 (Fig. 2) that are pivoted on the casting 1020 is a tacker carrier 1026. Mounted in bearings in arms that project laterally from the lower end of the carrier 1026 at its opposite sides are front and rear shafts 1028 and 1030 on which are secured for swinging movements widthwise of the forepart of the last tacker arms 1032 (Fig. 1). Each of these arms is so formed as to provide front and rear portions arranged to receive between them a plurality of fastening-inserting devices or tackers herein shown as three in number, each tacker comprising a plate 1034 (Figs. 2 and 5) provided with a guideway for a tack driver 1036 and with a pair of tack-holding fingers 1038 controlled by spring plates 1040 which are yieldable to permit the fingers to separate in the tack-driving operation. Each set of tacker plates 1034 is suspended on a pin 1042 in the arm 1032 to permit the different plates to swing relatively to one another in directions widthwise of the shoe, and in each plate is a slot 1044 (Fig. 21) which permits upward movement thereof on the arm 1032 for a purpose hereinafter explained. Each plate also carries a spring plunger 1046 bearing against the pin 1042 and against the resistance of which the plate is upwardly movable. Each tacker plate 1034 is also yieldingly controlled by two spring-pressed plungers 1048 and 1050 which bear against opposite sides of the upper end portion thereof, and thus serve normally to centralize the plate with respect to swinging movement about the pin 1042, the plunger 1048 being mounted in a portion of the arm 1032 and the plunger 1050 being mounted in a block 1052 which is fast on the outer side of the arm. By downward movement of the carrier 1026 the several tacker plates 1034 are carried into engagement with the upper faces of the wipers 328 when the wipers are at the end of their advancing and closing movements over the shoe, and by swinging movements of the arms 1032 the plates are carried inwardly into engagement with the previously-mentioned member 478 which rests on the insole, as illustrated in Fig. 37, this member serving thus to determine the positions of the different tackers widthwise of the shoe in the tack-driving operation. The provision for upward yield of the tacker plates 1034 against the resistance of the spring plungers 1046, as described, permits them to adjust themselves relatively to one another to rest upon the upper faces of the wipers. It will further be understood that the several tackers adjust themselves laterally of the shoe to positions determined by the member 478 by reason of the provision for their swinging movements about the pins 1042 under yielding control of the spring plungers 1048 and 1050. The two tackers at the opposite sides that are nearest the end of the toe accordingly assume the proper positions for driving their tacks through the notches 806 in the wipers and through the flattened ends of the binder 796, and the other tackers assume proper positions for driving their tacks through the notches 808 beyond the ends of the binder.

Figure 22:
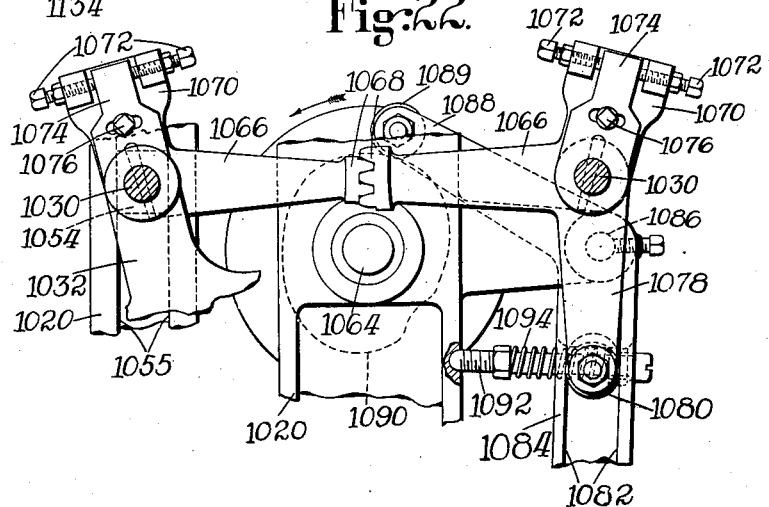
Fig. 22 is a view of substantially the same character as Fig. 21, but showing parts farther to the rear than those shown in Fig. 21.

The carrier 1026 and the parts supported thereby are further guided in their upward and downward movements by a block 1054 (Figs. 2 and 22) which is carried by one of the shafts 1030 and runs in a guideway 1055 formed in the front of the casting 1020. For effecting such upward and downward movements the link 1022 is connected by a link 1056 to one arm of a bellcrank lever 1058 fulcrumed at 1060 on the casting 1020, the other arm of this lever carrying a roll engaged by a path cam 1062 formed in a cam wheel which is fast on a cam shaft 1064 mounted in bearings in the casting.

The two arms 1032 are connected together for inward and outward swinging movements in unison by means of two levers 1066 (Fig. 22) mounted on the shafts 1030 and provided on their ends with interengaging gear teeth 1068. These levers are loosely mounted on the shafts 1030, but are provided with arms 1070 in which are mounted set screws 1072 arranged to engage opposite sides of members 1074 that are fast on the shafts. In this manner the levers 1066 are connected to the shafts with provision for adjustment of each shaft independently of the other to vary the position of its tacker arm 1032 laterally of the shoe.

In each arm 1070 is threaded a clamping screw 1076 which passes through a slot in the member 1074 and may be tightened to clamp this member to the arm 1070 after the adjustment. The right-hand lever 1066 has a downwardly extending arm 1078 carrying a roll 1080 which lies in a slot 1082 formed in a downwardly extending arm 1084 that is fulcrumed on a rod 1086 on the casting 1020. Integral with the arm 1084 is another arm 1088 provided with a roll 1089 in engagement with a peripheral cam 1090 on the cam shaft 1064. For controlling the arm 1084 there is provided a rod 1092 one end of which is seated in a recess in the casting 1020, this rod extending through an opening provided in an ear on the arm 1084 and having thereon a spring 1094 which by engagement with this ear serves to maintain the roll 1089 in engagement with the cam 1090. It will thus be seen that the cam 1090 acts to swing the arms 1032 and the tackers supported thereon inwardly toward each other at the proper time in the cycle of operations, the arms being thereafter swung outwardly again by the action of the spring 1094. It will be understood that the slot 1082 permits upward and downward movements of the arm 1078 with the tacker carrier 1026 without interrupting the operative connection between the tacker arms 1032 and the mechanism that swings them.

In each of the tacker plates 1034 (Fig. 5) there is a slot 1096 through which extends a pin 1098 that carries the driver 1036, the pin 1098 being mounted in the lower ends of a pair of driver-operating bars 1100 positioned at opposite sides of the tacker plate (Fig. 2). The several bars 1100 of the right-hand set of tackers are all pivotally connected at their upper ends (Fig. 21) to a lever 1102 which is fast on a shaft 1104 mounted in a bearing in the casting 1020, and the bars of the left-hand set of tackers are similarly connected to a lever 1106 fast on a shaft 1108. For operating the two levers 1102 and 1106 to impart to the driver bars 1100 their tack-driving movements there are provided two rods 1110 which are pivotally connected at their lower ends to the levers and extend upwardly through lugs 1112 (Fig. 2) on the carrier 1026. Between these lugs and nuts on the rods are mounted springs 1114 which thus tend to force the rods downwardly to operate the drivers, the limits of the downward movements of the rods being adjustably determined by nuts 1116 threaded thereon and arranged to engage cushioning disks 1118 on the lugs. The two levers 1102 and 1106 are connected together in such manner as to permit them both to be swung upwardly to retract the drivers and compress the springs 1114 by mechanism connected to one of them. For this purpose the lever 1102 has as a part thereof a gear sector 1120 in engagement with another gear sector 1122 associated with the lever 1106. The gear sector 1122, however, is not fast on the lever 1106 but is mounted to turn on the shaft 1108 and is provided with an arm 1124 that carries a screw 1126 arranged to engage the lower end of the rod 1110 to which the lever 1106 is connected. Accordingly when turning movement is imparted to the gear sector 1122 in a clockwise direction by the gear sector 1120 the arm 1124 serves to lift the lever 1106 at the same time that the lever 1102 is being lifted. The gear sector 1120 is of greater pitch radius than the sector 1122, and accordingly when the two levers 1102 and 1106 are swung downwardly to drive the tacks the gear sector 1122 turns farther than the sector 1120, so that the screw 1126 is retracted from the lower end of the rod 1110. The two levers 1102 and 1106 may accordingly move relatively to each other in the tack-driving operation, thus permitting the limits of driver-operating movements of the two rods 1110 to be independently varied by adjustment of the nuts 1116 on the rods 1110.

For lifting the two driver-operating levers 1102 and 1106 against the resistance of the springs 1114 there is formed integral with the lever 1102 a downwardly extending arm 1128 (Figs. 2 and 21) connected by a link 1130 to an arm 1132 fast on a rock shaft 1134 which is mounted in bearings in the casting 1020. An arm 1136 on this rock shaft is connected by a link 1138 to a bell-crank lever 1140 (Fig. 15) which is pivoted at 1142 on the casting 1020 and carries a roll 1144 engaged by a cam 1146 on the cam shaft 1064. The cam 1146 is provided with a steep declivity 1148 to effect the sudden release of the lever 1140 and thus to permit the springs 1114 to impart quick driver-operating movements to the levers 1102 and 1106. Contributing further to this end are shoes 1150 (Figs. 15 and 19) fast on the sides of the cam 1146 and arranged to run on faces 1152 of the lever 1140 after the cam disengages the roll 1144. The link 1130 has universal connections with the arms 1128 and 1132 so as not to interfere with such small forward and rearward movements as the tacker mechanism receives by reason of the swinging of the links 1022 and 1024 (Fig. 2) in the upward and downward movements of the mechanism. It will be evident that the link 1130 maintains an operative connection between the driver-retracting levers 1102 and 1106 and their operating mechanism notwithstanding the upward and downward movements of the tacker carrier 1026.

Any suitable means may be utilized for supplying tacks to the several tackers. As herein illustrated the machine is provided with an oscillatory tack hopper 1154 (Fig. 2) and tack-separating mechanism 1156 of well-known construction, similar to what is disclosed, for example, in Letters Patent No. 1,002,422, granted on September 5, 1911 upon an application of R. F. McFeely. The tack hopper is mounted on a shaft 1160 which is oscillated by a rack bar 1162 to which movements are imparted yieldingly through a spring 1164 from a slide 1166 (Figs. 19 and 20) operated by an eccentric 1168 on the cam shaft 1064 in substantially the same manner as disclosed in Letters Patent No. 1,107,337, granted on August 18, 1914 upon an application of R. F. McFeely. Leading downwardly from the separating mechanism are tack tubes 1170 (Figs. 1 and 2) which are yieldingly supported by clips 1172, and telescoping with these tubes are other tubes 1174 loosely supported at their lower ends in a bar 1176 fast on the movable carrier 1026. Communicating with the tubes 1174 are flexible tubes 1178 fastened at their upper ends to the bar 1176 and seated at their lower ends (Fig. 5) in recesses in the tacker plates 1034, these tubes leading to openings 1180 in the tacker plates which communicate with the driver passages. It will thus be seen that the tack-separating mechanism is in communication with the tackers at all times, notwithstanding the upward and downward movements of the carrier 1026 and the swinging movements of the tacker arms 1032.

For operating the cam shaft 1064 the continuously running shaft 924 carries a sprocket wheel 1182 (Fig. 15) which drives a chain 1184 connected to a sprocket wheel 1186 on a shaft 1188, and this shaft is connected by gears 1190 and 1192 (Fig. 2) to a shaft 1194 which carries a sprocket wheel 1196 (Fig. 15) connected by a chain 1198 to a sprocket wheel 1200 on a shaft 1202. There is a similar chain 1204 connecting the shaft 1194 to the tacker mechanism at the right-hand side of the machine. The sprocket wheel 1200 is a part of a clutch 1205 shown in section in Fig. 18 but which need not be described in detail since it is a well-known Horton type of clutch. By means of this clutch the sprocket wheel 1200 is connected to and disconnected from the shaft 1202, this shaft being connected by gears 1206 and 1208 (Fig. 2) to the cam shaft 1064. The clutch 1205 is controlled by a dog 1210 (Fig. 15) mounted on an arm 1212 which is fast on a rock shaft 1214 (see also Fig. 19), and fast on this shaft is also an arm 1216 upon which is pivotally suspended a latch 1218. A spring 1220 (Fig. 19) connected to an arm on the shaft 1214 acts, when permitted, to swing the arm 1212 downwardly to bring the dog 1210 into position to disconnect the parts of the clutch. Below the latch 1218 is a pin 1222 carried by an arm 1224 which is mounted on a rock shaft 1226, and also mounted on this rock shaft is an arm 1228 (Fig. 19) connected by a link 1230 to one of the two arms 588 previously described as mounted for swinging movements to close the side grippers upon the margin of the upper and to open the grippers. In thus closing the grippers early in the cycle of operations of the machine the rear end portions of the arms 588 are swung upwardly, and at this time the rock shaft 1226 is accordingly turned to lift the arm 1224 and thus to move the pin 1222 into position to connect with the latch 1218. When the arms 588 are moved in the opposite directions to cause the opening of the grippers substantially at the end of the wiping movements of the wipers 328, the arm shown in Fig. 19 pulls downwardly on the link 1230 and by turning the rock shaft 1226 causes the pin 1222 to impart downward movement to the latch 1218, thereby lifting the dog 1210 and actuating the clutch 1205 to start the tacking mechanism in operation. It will be understood that it is substantially at this time that the cam wheels 464 and 512 are brought to a stop by the controlling mechanism shown in Fig. 17.

For disconnecting the latch 1218 from the pin 1222 to permit the dog 1210 to be returned into position to stop the tacking mechanism at the end of its cycle of operations, there is provided a link 1232 (Figs. 2, 15 and 19) connecting the latch to the lower end of an arm 1234 which is fast on a rock shaft 1236, and also fast on this rock shaft is an arm 1238 (Figs. 2 and 20) provided with a roll 1240 arranged to be engaged by a cam 1242 on the gear wheel 1208. A spring 1244 (Fig. 15) connected to the hub of the arm 1234 tends to turn the rock shaft 1236 in the direction to swing the arm 1238 toward the cam 1242, and it will be understood that it is by this spring that the latch 1218 is maintained initially in position to connect with the pin 1222 when the latter is lifted. It will be evident from Fig. 20 that the cam 1242 acts to disconnect the latch from the pin and thus to release the clutch-controlling dog 1210 when the tacking mechanism has nearly completed its cycle of operations. There is also fast on the shaft 1202 a brake disk 1246 (Figs. 2 and 18) arranged to be engaged by a brake shoe 1248 (Fig. 19) which is mounted on an eccentric 1250 on the shaft 1214. This brake shoe is accordingly controlled by the same shaft that controls the clutch dog 1210 and is arranged to engage the brake disk 1246 to assist in bringing the shaft 1202 and the parts connected therewith to a stop as soon as the shaft is released by the clutch 1205.

In the operation of the machine, briefly summarized, the previously formed toe binder 796 is first placed in the groove 798 of the wipers 328 by use of the binder-presenting device in the manner hereinbefore described. Thereafter the forepart of the last, to which the upper and insole unit are attached, is mounted upon the work support in the position illustrated in Fig. 3, the toe box having been previously softened by heat and the upper mounted on the jig pins 324 of the upper-presenting device. The operator then moves the work support slide 96 inwardly to carry the toe of the last into contact with the gages 116 and 142, at the same time guiding the jig pins into the slots 330 of the wipers and positioning them as determined by these slots and by the gages 336. The slide 96 is locked in the position to which it is thus moved by one of the pawls 170. The toe portion of the upper as thus presented is outspread over the top faces of the wipers and over the lower gripper jaws 556. Having presented the work in this manner the operator starts the machine by depressing the treadle 254, the movement of the treadle serving to force the levers 368 into engagement with the work presenter to insure the proper location of the presenter. The treadle is locked in its depressed position by the latch 412 in engagement with the bar 418 (Fig. 2).

As the machine starts the clamping members 424 are swung downwardly to clamp the margin of the upper on the wipers, as shown in Fig. 32, and the gripper jaws 558 are moved downwardly by the levers 588 to grip the upper against the jaws 556. By this movement of one of the levers 588 the pin 1222 (Fig. 15) is moved upwardly to connect with the latch 1218 controlling the tacker mechanism. Substantially at this time also the treadle 254 is released from the bar 418, the levers 368 are returned to their starting positions, and the jig pins 324 are withdrawn from the upper by the levers 670. The arm 118 then begins its downward swinging movement to carry the plate 478 into engagement with the insole at the inner side of the lip. As the arm thus starts the levers 548 are released, permitting the toe rest 514 to be moved upwardly against the upper by its controlling spring 542, and thereafter the toe rest is forced downwardly by the forepart of the last as the latter is depressed by the arm 118. In this upward movement of the toe rest it is connected by the rolls 640 to the bars 626 that control the grippers. In the downward movement of the forepart of the last the upper is drawn tightly over it by the clamp members 424 and the wipers and also by the side grippers, the upper slipping more or less inwardly toward the toe end of the last between the clamp members and the wipers, and the grippers being pulled inwardly by the upper against the resistance of their controlling springs 616. At the same time the upper is wiped upwardly about the toe end of the last by the toe band 682. In the course of these operations also movements lengthwise of the last are imparted to the grippers by the downward movements of the bars 626 effected through the connections with the toe rest, and near the end of the downward movements of these bars the pawls 648 are operated by them to impart positive inward movements to the grippers. At the end of the downward movement of the arm 118 the parts are positioned substantially as illustrated in Figs. 33 and 34.

The parts having arrived substantially in these positions, the wipers 328 are advanced and closed to wipe the marginal portion of the upper over the feather and against the lip of the insole, the arm 118 being permitted to rise slightly near the end of the wiping operation to permit the shoe to be forced more firmly up against the wipers by the toe rest spring 542. Substantially throughout these movements of the wipers the clamp members 424 are maintained in clamping position and the grippers still maintain their hold on the upper to insure that the upper will be wiped tightly inward by the wipers, the grippers being pulled more or less inwardly by the upper in the wiping operation. In this operation the wipers also apply the binder to the upper in the position in which it is to be fastened to the shoe. Substantially at the end of the movement of the wipers the clamp members 424 are lifted and the grippers are opened (Fig. 35) in response to reverse swinging movements of the levers 588. In this movement the levers lift the pawls 648 to release the grippers, so that the latter may be moved outwardly by their controlling springs 616. When the wipers have substantially completed their wiping movements the toe band 682 is operated to relax its pressure on the upper.

The wipers having wiped the upper inwardly against the lip of the insole, as above described, the main cam wheels 464 and 512 are brought to a stop automatically. Just prior to this the tacker-operating clutch 1205 is tripped by the above-described reverse swinging movement of one of the gripper-controlling levers 588, to start the tacker mechanism in operation. In the operation of that mechanism the tacker carrier 1026 is lowered to carry the lower ends of the tacker plates 1034 into engagement with the top faces of the wipers. In time relation to this movement the tacker arms 1032, which in the upper-shaping operations are so positioned as to hold the tackers well inward out of the paths of movement of the side grippers, are operated first to swing the tackers outwardly against plates 1252 (Fig. 36) on the gripper jaw arms 564 to insure that when they are moved down upon the wipers they will be well clear of the margin of the upper. The arms 1032 are thereafter operated to move the tackers inwardly along the wipers to positions determined by their contact with the insole-engaging plate 478 (Fig. 37). The tackers having been thus positioned the tacks are driven by the drivers, the two tacks at each side that are nearest the end of the toe piercing the flattened ends of the binder to fasten the binder in place, as illustrated in Fig. 38. At the same time one tack is driven at each side beyond the end of the binder. It will be understood that the tacks are not fully driven, but are left in positions convenient for their later removal.

The tacks having been driven as described, the parts of the tacker mechanism are returned to their starting positions, and the latch 1218 is operated to release the member that controls the tacker clutch to cause the tacker mechanism to be brought to a stop at the end of its cycle of operations. The main clutch (Fig. 17) is then actuated by the automatic timing mechanism to start the cam wheels 464 and 512 again in operation for effecting the return of the rest of the power-operated parts of the machine to starting positions. In such return of the parts the toe band 682 is released by its operating mechanism and permitted to assume a position suitable for operation upon the next shoe. The cam wheels 464 and 512 having been brought to a stop automatically in their starting positions, the operator unlocks the work support slide 98 and moves it outwardly to withdraw the work from the machine, and thereafter operates the latch 74 by the arm 84 to release the last forepart and permit the removal of the work.

Having described the invention, what I claim as new and desire to secure by Letters Patent of the United States is:

1. In an upper-shaping machine, a device constructed to support the forepart of a divided last detached from the heel part, and means for shaping the toe end of an upper over the forepart of the last while thus supported.

2. In an upper-shaping machine, a work support constructed to receive and position the forepart of a divided last detached from the heel part, said work support having means for detachably fastening the forepart of the last thereon, and means for shaping the toe end of an upper over the forepart of the last on said support.

3. In an upper-shaping machine, a work support constructed to position the forepart of a divided last, detached from the heel part, by engagement with the rear end face of said forepart, and means for shaping the toe end of an upper over the forepart of the last on said support.

4. In an upper-shaping machine, a work support constructed for engagement with the rear end face of the forepart of a divided last detached from the heel part, a device for detachably fastening the forepart of the last on said support, and means for shaping the toe end of an upper over the forepart of the last while it is thus fastened.

5. In an upper-shaping machine, a work support constructed to receive and position the forepart of a divided last detached from the heel part, a latch arranged to connect with the forepart of the last at its rear end to hold it on said support, and means for shaping the toe end of an upper over the forepart of the last on said support.

6. In an upper-shaping machine, a work support constructed to receive and position the forepart of a divided last detached from the heel part, a latch arranged to connect with the forepart of the last at its rear end to hold it on said support, means for shaping the toe end of an upper over the forepart of the last, and a manually operated device for controlling said latch to release the forepart of the last after the upper-shaping operation.

7. In an upper-shaping machine, a work support constructed to receive and position the forepart of a divided last detached from the heel part and provided with bonding means for attaching it to the heel part, mechanism constructed to hold the forepart of the last on said support by engagement with said bonding means, and means for shaping the toe end of an upper over the forepart of the last on said support.

8. In an upper-shaping machine, a work support constructed to receive and position the forepart of a divided last detached from the heel part and provided with bonding means including a plate for attaching it to the heel part, a latch arranged to connect with said plate to hold the forepart of the last on said support, and means for shaping the toe end of the upper over the forepart of the last while it is thus held.

9. In an upper-shaping machine, a work support constructed to receive and position the forepart of a divided last detached from the heel part and having a sole thereon, means for detachably fastening the forepart of the last on said support, and means for shaping the toe end of an upper over the forepart of the last and over the sole.

10. In an upper-shaping machine, means for supporting the forepart of a divided last detached from the heel part and having a sole thereon, said supporting means being constructed to position the forepart of the last by engagement with its rear end face, and means for shaping the toe end of an upper over the forepart of the last and over the sole.

11. In an upper-shaping machine, means for supporting the forepart of a divided last detached from the heel part and having thereon a sole provided with a lip on its outer face, said supporting means being constructed to connect with the forepart of the last at its rear end, and means for conforming the toe end of an upper to the contour of the forepart of the last and for wiping the marginal portion of the upper inwardly against the lip of the sole.

12. In an upper-shaping machine, means constructed and arranged to control the forepart of a divided last detached from the heel part and having a sole thereon, and means for shaping the toe end of an upper over the forepart of the last and the sole and for fastening it to the sole.

13. In an upper-shaping machine, means constructed and arranged to control the forepart of a divided last detached from the heel part and having a sole thereon, and means for shaping the toe end of an upper over the forepart of the last and the sole and for applying a binder around the toe to hold the upper in lasted relation to the sole.

14. In an upper-shaping machine, means constructed and arranged to control the forepart of a divided last detached from the heel part and having thereon a sole provided with a lip on its outer face, means for shaping the toe end of an upper over the forepart of the last and against the lip of the sole and for applying a binder around the toe to hold the upper against the lip, and means for fastening the binder in upper-holding position.

15. In an upper-shaping machine, a work support constructed to receive and position the forepart of a divided last detached from the heel part and having a sole thereon, said work support having means for detachably fastening the forepart of the last upon it, and means for shaping the toe end of an upper over the forepart of the last and the sole and for fastening it to the sole.

16. In an upper-shaping machine, a work support constructed to receive and position the forepart of a divided last detached from the heel part and having a sole thereon, said work support being provided with a device arranged to connect with the forepart of the last at its rear end to hold it, and means for shaping the toe end of an upper over the forepart of the last and the sole and for fastening it to the sole.

17. In an upper-shaping machine, means constructed to receive and position the forepart of a divided last detached from the heel part and having a sole thereon, means for shaping the toe end of an upper over the forepart of the last, and means for driving fastenings to fasten the upper to the sole.

18. In an upper-shaping machine, a work support constructed to receive and position the forepart of a divided last detached from the heel part and having a sole thereon, means for shaping the toe end of an upper over the forepart of the last and over the sole and for applying a binder around the toe to hold the upper, and mechanism for driving fastenings to fasten the binder in upper-holding position.

19. In an upper-shaping machine, a work support constructed to receive and position the forepart of a divided last detached from the heel part and having thereon a sole provided with a lip on its outer face, means for shaping the toe end of an upper over the forepart of the last and against the lip of the sole and for applying a binder around the toe to hold the upper against the lip, and mechanism for driving fastenings at the sides of the toe to fasten the binder in upper-holding position.

20. In an upper-shaping machine, the combination with means for shaping the toe end of an upper over the forepart of a last, of a work support constructed to receive and position the forepart of a divided last detached from the heel part during the upper-shaping operation, means for detachably fastening the forepart of the last on said work support, and means for engaging the upper in jig holes provided therein at the opposite sides of the toe to determine the position of the upper relatively to the upper-shaping means.

21. In an upper-shaping machine, the combination with means for shaping the toe end of an upper over the forepart of a last and over a sole, of means for supporting the forepart of a divided last detached from the heel part and having a sole thereon, said supporting means being constructed to connect with the forepart of the last at its rear end face, and means for engaging the upper in jig holes provided therein at the opposite sides of the toe to determine the position of the upper relatively to the upper-shaping means.

22. In an upper-shaping machine, the combination with means for shaping the toe end of an upper over the forepart of a last, of a work support constructed to receive and position the forepart of a divided last deached from the heel part, said work support being so constructed as to permit lateral movements of the forepart of the last, and means for engaging the forepart of the last laterally to determine its position relatively to the upper-shaping means.

23. In an upper-shaping machine, the combination with means for shaping the toe end of an upper over the forepart of a last, of a work support constructed to receive and position the forepart of a divided last detached from the heel part, said work support being so constructed as to permit lateral movements of the forepart of the last, and gages arranged to contact with the opposite sides of the toe end of the last to determine its position relatively to the upper-shaping means.

24. In an upper-shaping machine, the combination with means for shaping the toe end of an upper over the forepart of a last, of a work support constructed to receive and position the forepart of a divided last, detached from the heel part, by engagement with the rear end portion thereof, said work support comprising a member movably mounted to permit the forepart of the last to swing laterally.

25. In an upper-shaping machine, the combination with means for shaping the toe end of an upper over the forepart of a last, of a work support constructed to receive and position the forepart of a divided last detached from the heel part, said work support including a member arranged to abut against the rear end face of the forepart of the last and mounted for rocking movements to permit the toe end of the last to swing laterally, and a device for detachably connecting the forepart of the last to said rocking member.

26. In an upper-shaping machine, the combination with means for shaping the toe end of an upper over the forepart of a last, of means for positioning the forepart of a divided last detached from the heel part, said positioning means being movable to carry the forepart of the last lengthwise into position for the upper-shaping operation.

27. In an upper-shaping machine, the combination with means for shaping the toe end of an upper over the forepart of a last, of means for positioning the forepart of a divided last detached from the heel part, said positioning means being movable to carry the forepart of the last lengthwise into position for the upper-shaping operation, and a member arranged to contact with the toe-end face of the forepart of the last to limit the movement of said positioning means.

28. In an upper-shaping machine, the combination with means for shaping the toe end of an upper over the forepart of a last, of a work support comprising a device constructed to position the forepart of a divided last, detached from the heel part, by engagement with the rear end portion of said forepart, said device being mounted for rectilinear movement to carry the forepart of the last into position for the upper-shaping operation.

29. In an upper-shaping machine, the combination with means for shaping the toe end of an upper over the forepart of a last, of a device for supporting the forepart of a divided last detached from the heel part, said device being movable to carry the forepart of the last lengthwise into position for the upper-shaping operation, and a support for said device movable therewith in a direction heightwise of the forepart of the last in the upper-shaping operation.

30. In an upper-shaping machine, the combination with means for shaping the toe end of an upper over the forepart of a last, of a slide provided with mechanism arranged to connect with the forepart of a divided last, detached from the heel part, at the rear end face of said forepart, said slide being movable to carry the forepart of the last lengthwise into position for the upper-shaping operation, and a yieldingly controlled support for said slide movable therewith in a direction heightwise of the forepart of the last in the upper-shaping operation.

31. In an upper-shaping machine, the combination with means for shaping the toe end of an upper over the forepart of a last and over a sole, of a device for supporting the forepart of a divided last detached from the heel part and having a sole thereon, said device being movable in a direction heightwise of the forepart of the last, and mechanism for imparting such movement to the device in the upper-shaping operation by engagement with the sole.

32. In an upper-shaping machine, the combination with means for shaping the toe end of an upper over the forepart of a last and over a sole, of means for supporting the forepart of a divided last detached from the heel part and having a sole thereon, said supporting means comprising a slide having mechanism arranged to connect with the forepart of the last at its rear end face and movable to carry the forepart of the last lengthwise into position for the upper-shaping operation, a support for said slide movable therewith in a direction heightwise of the forepart of the last, and means for imparting such movement to said support and slide in the upper-shaping operation by engagement with the sole.

33. In an upper-shaping machine, the combination with means for shaping the toe end of an upper over the forepart of a last, of a work support comprising a device constructed to receive and position the forepart of a divided last detached from the heel part and also constructed to permit lateral movements of the forepart of the last, said device being movable to carry the forepart of the last into position for the upper-shaping operation, a gage arranged to contact with the toe-end face of the last to limit the movement of said device, and gages arranged to contact with the opposite sides of the forepart of the last to centralize the toe end of the last laterally.

34. In an upper-shaping machine, the combination with means for shaping the toe end of an upper over a form, of a support for said form comprising a device movable to carry the form lengthwise into position for the upper-shaping operation, and a member arranged to engage the toe-end face of the form to limit the movement of said device.

35. In an upper-shaping machine, the combination with means for shaping the toe end of an upper over a form, of a work carrier movable to carry said form lengthwise toward the upper-shaping means prior to the upper-shaping operation, a gage arranged to contact with the toe-end face of the form to limit the movement of the carrier, and mechanism for locking the carrier against retractive movement.

36. In an upper-shaping machine, the combination with means for shaping the toe end of an upper over a form, of gages arranged to contact with the end and side faces of said form to determine its position for the upper-shaping operation, and means for moving the form in the direction of its height away from said gages in the upper-shaping operation.

37. In an upper-shaping machine, the combination with means for shaping the toe end of an upper over a form, of a support for said form, a member movable to depress the form and its support relatively to the upper-shaping means, a gage carried by said member and arranged to contact with the toe-end face of the form to determine the position of the form prior to the upper-shaping operation, and means for limiting movement of the gage with said member to permit the form to be carried away from the gage as it is depressed.

38. In an upper-shaping machine, the combination with means for shaping the toe end of an upper over a form, of a work carrier movable from a retracted work-receiving position to carry the form lengthwise toward the upper-shaping means prior to the upper-shaping operation, and a support for said work carrier movable therewith in a direction heightwise of the form in the upper-shaping operation.

39. In an upper-shaping machine, the combination with means for shaping the toe end of an upper over a form, of a slide mounted for rectilinear movement from a retracted work-receiving position to carry the form lengthwise into position for the upper-shaping operation, and a support for said slide mounted for movement therewith in a direction heightwise of the form in the upper-shaping operation.

40. In an upper-shaping machine, the combination with means for shaping the toe end of an upper over a form, of a slide mounted for movement from a retracted work-receiving position to carry the form lengthwise into position for the upper-shaping operation, a second slide supporting said form-carrying slide and movable therewith in a direction heightwise of the form in the upper-shaping operation, and a spring against the resistance of which the second slide is thus movable.

41. In an upper-shaping machine, the combination with means for shaping the toe end of an upper over a form and over a sole on the form, of a work carrier movable from a retracted work-receiving position to carry the form lengthwise toward the upper-shaping means, a support for said work carrier movable therewith in a direction heightwise of the form, means for imparting such movement to the work carrier and its support by engagement with the sole, and a spring against the resistance of which the support is thus movable.

42. In an upper-shaping machine, the combination with means for shaping the toe end of an upper over a form, of a support for the form, spring means against the resistance of which said support is movable downwardly in the upper-shaping operation, and a device for locking the support against downward movement while the operator mounts the form thereon.

43. In an upper-shaping machine, the combination with means for shaping the toe end of an upper over a form, of a support for the form, spring means against the resistance of which said support is movable downwardly in the upper-shaping operation, a device for locking the support against downward movement while the operator mounts the form thereon, and means for operating said device thereafter to unlock the support.

44. In a power-operated upper-shaping machine, the combination with means for shaping the toe end of an upper over a form, of a support for the form, spring means against the resistance of which said support is movable downwardly in the upper-shaping operation, a device for locking the support against downward movement while the operator mounts the form thereon, a treadle for starting the power operation of the machine, and mechanism controlled by said treadle for unlocking the support.

45. In an upper-shaping machine, the combination with means for shaping the toe end of an upper over a form, of a carrier movable to carry the form lengthwise into position for the upper-shaping operation, a support on which said carrier is mounted, spring means upholding said support and against the resistance of which it is movable downwardly in the upper-shaping operation, and a device for locking the support against downward movement during the form-positioning movement of the carrier.

46. In an upper-shaping machine, the combination with means for shaping the toe end of an upper over a form, of a carrier movable to carry the form lengthwise into position for the upper-shaping operation, a support on which said carrier is mounted, spring means upholding said support and against the resistance of which it is movable downwardly in the upper-shaping operation, a device for locking the support against downward movement during the form-positioning movement of the carrier, means for thereafter unlocking the support, and mechanism arranged to be operated by retractive movement of the carrier after the upper-shaping operation again to cause the locking of the support.

47. In an upper-shaping machine, the combination with means for shaping the toe end of an upper over a form and over a sole on the form, of a work carrier for supporting a form and a sole with which an upper is assembled, said work carrier being movable from a retracted work-receiving position to carry the work lengthwise toward the upper-shaping means prior to the upper-shaping operation, and upper-positioning means comprising jig pins arranged to engage the upper in jig holes provided therein and movable with the work carrier to position the upper relatively to the upper-shaping means.

48. In an upper-shaping machine, the combination with means for shaping the toe end of an upper over a form and over a sole on the form, comprising wipers arranged to wipe the marginal portion of the upper over the sole and having slots therein, of a work carrier for supporting a form and a sole with which an upper is assembled, said work carrier being movable from a retracted work-receiving position to carry the work lengthwise toward the upper-shaping means prior to the upper-shaping operation, and upper-positioning means comprising jig pins arranged to engage the upper in jig holes provided therein and movable with said work carrier into the slots in the wipers to position the upper in proper relation to the wipers.

49. In an upper-shaping machine, the combination with means for shaping the toe ends of uppers of different sizes over forms, of jig pins for engaging each upper in jig holes provided therein to position the upper in predetermined relation to the upper-shaping means, and mechanism arranged to cooperate with said jig pins to determine the position of each upper, said mechanism being adjustable to vary the positions of the jig pins for positioning uppers of different sizes.

50. In an upper-shaping machine, the combination with means for shaping the toe ends of uppers of different sizes over forms, including wipers for wiping the marginal portion of each upper inwardly over the form, of jig pins for engaging each upper in jig holes provided therein to position the upper in predetermined relation to the upper-shaping means, said wipers having slots therein to receive the jig pins, and adjustable means arranged to engage said jig pins to vary their positions in said slots for positioning uppers of different sizes.

51. In an upper-shaping machine, the combination with means for shaping the toe ends of uppers of different sizes over forms, including wipers for wiping the marginal portion of each upper inwardly over the form, of jig pins for engaging each upper in jig holes provided therein to position the upper in predetermined relation to the upper-shaping means, said wipers having slots therein to receive the jig pins, gage members positioned close to said wipers and arranged to engage the jig pins to determine their positions in the slots in the wipers, and mechanism for adjusting said gage members to vary the positions of the jig pins for positioning uppers of different sizes.

52. In an upper-shaping machine, the combination with means for shaping the toe ends of uppers of different sizes over forms, including wipers for wiping the marginal portion of each upper inwardly over the form, of jig pins for engaging each upper in jig holes provided therein to position the upper in predetermined relation to the upper-shaping means, said wipers having slots therein to receive the jig pins, gage members positioned close to the wipers and arranged to engage the jig pins to determine their positions in the slots in the wipers, springs tending to move said gage members each in one direction relatively to the wipers, devices arranged to move said members each against the resistance of its spring, and a member connected to both said devices for adjusting them to vary the positions of the gage members for uppers of different sizes.

53. In an upper-shaping machine, the combination with means for shaping the toe ends of uppers of different sizes over forms, including wipers for wiping the marginal portion of each upper inwardly over the form, of jig pins for engaging each upper in jig holes provided therein to position the upper in predetermined relation to the upper-shaping means, said wipers having slots therein to receive the jig pins, gage members positioned close to the wipers and arranged to engage the jig pins to determine their positions in the slots in the wipers, said gage members being movable inwardly and outwardly along the wipers, and adjusting means common to both said members for moving them inwardly or outwardly in unison to vary their positions and thus to determine different positions of the jig pins for positioning uppers of different sizes.

54. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamp members arranged to press on the upper respectively in different locations along the wipers, a support carrying said clamp members and movable in a direction transverse to the plane of the wipers to apply said members to the upper, the members being movable relatively to said support in directions transverse to said plane, springs carried by said support and tending respectively to move the different clamp members toward the plane of the wipers, and devices movable to vary the stresses of the different springs without affecting the relation of the clamp members to one another.

55. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamp members arranged to press on the upper respectively in different locations along the wipers, a support for said clamp members movable in a direction transverse to the plane of the wipers to apply said members to the upper and relatively to which the different members are movable in directions transverse to said plane, a plurality of plungers carried by said support for controlling the movements of the different respective clamp members, springs tending to move said plungers toward the plane of the wipers, the support being constructed to limit such movements of the different plungers, and members connected by screw threads to said support for turning movements to compress the different springs independently of one another.

56. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support for said devices movable in a direction transverse to the plane of the wipers to apply them to the upper and relatively to which they are mounted for swinging movements in directions transverse to said plane, a plurality of members movably mounted on said support and connected to the different devices for controlling their swinging movements, springs acting on the different members and tending to swing the devices toward the plane of the wipers, the support being provided with means for limiting the movements of said members under the influence of the springs, and screw-threaded members mounted on said support for variably compressing the different springs independently of one another.

57. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support carrying said devices and movable in a direction transverse to the plane of the wipers to apply them to the upper, the devices being mounted for swinging movements relatively to one another and to said support in directions transverse to the plane of the wipers, and springs on said support arranged to control respectively the swinging movements of the different devices and separately yieldable in applying the clamping pressure.

58. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along each of the wipers, and a support carrying said devices and mounted for swinging movement about a fixed axis extending laterally of the form to apply the clamping pressure, said devices being yieldable relatively to one another in directions transverse to the plane of the wipers in applying the clamping pressure.

59. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support carrying said devices and movable toward the plane of the wipers to apply them to the upper, and mechanisms on said support for moving the different devices forwardly and rearwardly along the plane of the wipers as the support is moved toward and from said plane respectively.

60. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support carrying said devices and movable toward the plane of the wipers to apply them to the upper, spring means arranged to impart forward movements to the different devices along the plane of the wipers as the support is moved toward said plane, and positive means for retracting the devices against the resistance of said spring means as the support is moved away from said plane.

61. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support carrying said devices and movable toward the plane of the wipers to apply them to the upper, spring means arranged to impart forward movements to the different devices along the plane of the wipers as the support is moved toward said plane, members mounted on said support for moving the devices reversely against the resistance of said spring means, and relatively stationary means arranged to act on said members to cause them to retract the devices in response to movement of the support away from the plane of the wipers.

62. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support carrying said devices and movable toward the plane of the wipers to apply them to the upper, spring means arranged to impart forward movements to the devices along the plane of the wipers as the support is moved toward said plane, bell-crank levers carried by said support for retracting the several devices against the resistance of said spring means, and stops arranged to act on said bell-crank levers in response to movement of the support away from the plane of the wipers to cause them to retract said devices.

63. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support carrying said devices and movable toward the plane of the wipers to apply them to the upper, means on said support for imparting to the devices forward movements along the plane of the wipers as the support is moved toward said plane and for retracting them as the support is moved away from said plane, and spring-controlled members carried by said support and relatively to which the devices are thus movable, said members being arranged to press the different devices upon the upper and being yieldable relatively to one another in applying the pressure to the upper.

64. In an upper-shaping machine, the combination with means for shaping the toe end of an upper over a form, comprising toe-embracing wipers for wiping the marginal portion of the upper around the toe inwardly over the form, of means for clamping the marginal portion of the upper upon said wipers to control it in the upper-shaping operation, said clamping means comprising a plurality of clamping devices arranged to press on the upper respectively in different locations along the wipers, a support carrying said devices and movable toward the plane of the wipers to apply them to the upper, means on said support for imparting to the devices forward movements along the plane of the wipers as the support is moved toward said plane and for retracting them as the support is moved away from said plane, and spring-controlled plungers carried by said support and having pin-and-slot connections with the different respective devices to permit forward and rearward movements of the latter relatively to the plungers, said plungers being arranged to press the different devices upon the upper and being yieldable relatively to one another in applying the pressure.

65. In an upper-shaping machine, the combination with a wiper for wiping the marginal portion of an upper inwardly over a form, of a device for clamping the marginal portion of the upper upon said wiper, a support carrying said device and movable in a direction transverse to the plane of the wiper to apply the device to the upper, the device being movable relatively to the support in directions transverse to said plane, a plunger movably mounted in the support for controlling the device, a spring tending to move said plunger toward the plane of the wiper, the support having means for limiting such movement of the plunger, and a member connected by screw threads to the support for varying the stress of the spring.

66. In an upper-shaping machine, the combination with a wiper for wiping the marginal portion of an upper inwardly over a form, of a device for clamping the marginal portion of the upper upon said wiper, an arm carrying said device and mounted for swinging movement toward the plane of the wiper to apply the device to the upper, means for swinging the arm, the device being mounted to swing relatively to the arm in directions transverse to the plane of the wiper, and a spring carried by the arm for controlling such swinging movement of the device and for pressing it yieldingly upon the upper.

67. In an upper-shaping machine, the combination with a wiper for wiping the marginal portion of an upper inwardly over a form, of a device for clamping the marginal portion of the upper upon said wiper, a support carrying said device and movable toward the plane of the wiper to apply the device to the upper, the device being mounted to move relatively to the support forwardly and rearwardly along the plane of the wiper, and mechanism carried by said support for moving the device forwardly and rearwardly along said plane as the support is moved toward and from said plane respectively.

68. In an upper-shaping machine, the combination with a wiper for wiping the marginal portion of an upper inwardly over a form, of a device for clamping the marginal portion of the upper upon said wiper, a support for said device movable toward the plane of the wiper to apply the device to the upper, a spring for moving the device forwardly along the plane of the wiper relatively to said support as the support is moved toward said plane, and mechanism for retracting the device against the resistance of said spring as the support is moved away from said plane.

69. In an upper-shaping machine, the combination with a wiper for wiping the marginal portion of an upper inwardly over a form, of a device for clamping the marginal portion of the upper upon said wiper, a support for said device movable toward the plane of the wiper to apply the device to the upper, a member pivotally mounted on said support and on which said device is mounted to swing relatively to the support in directions transverse to the plane of the wiper, spring means tending to swing the device toward said plane, and mechanism arranged to act on said pivotally mounted member to move the device forwardly and rearwardly along the plane of the wiper as the support is moved toward and from said plane respectively.

70. In an upper-shaping machine, the combination with a wiper for wiping the marginal portion of an upper inwardly over a form, of a device for clamping the marginal portion of the upper upon said wiper, a support for said device movable toward the plane of the wiper to apply the device to the upper, the device being movable relatively to the support along the plane of the wiper, and mechanism including a bell-crank lever carried by the support for controlling such movement of the device.

71. In an upper-shaping machine, the combination with a wiper for wiping the marginal portion of an upper inwardly over a form, of a device for clamping the marginal portion of the upper upon said wiper, a support for said device movable toward the plane of the wiper to apply the device to the upper, a spring for moving the device forwardly along the plane of the wiper relatively to the support as the latter is moved toward said plane, a bell-crank lever on the support for retracting the device against the resistance of the spring, and means arranged to act on said bell-crank lever in response to movement of the support away from the plane of the wiper to retract the device.

72. In an upper-shaping machine, the combination with a wiper for wiping the marginal portion of an upper inwardly over a form, of a device for clamping the marginal portion of the upper upon said wiper, a support for said device movable toward the plane of the wiper to apply the device to the upper, a spring-controlled plunger carried by the support for pressing the device yieldingly upon the upper, a pin-and-slot connection between said device and the plunger to permit forward and rearward movements of the device along the plane of the wiper, and mechanism carried by said support for thus moving the device forwardly as the support is moved toward the plane of the wiper and for retracting it as the support is moved away from said plane.

73. In an upper-shaping machine, the combination with means for shaping the toe end of an upper over a form and over a sole on the form, of means for moving the form heightwise relatively to the upper-shaping means by engagement with the toe end of the sole and for controlling the sole in the upper-shaping operation, said last-named means comprising a sole-engaging member and a support on which said member is mounted for tipping movement about an axis extending widthwise of the form to adjust itself to the plane of the sole, and a spring tending to tip said member in one direction about its axis and against the resistance of which the member is movable to seat itself evenly upon the sole.

74. In an upper-shaping machine, the combination with means for shaping the toe end of an upper over a form and over a sole on the form, of means for moving the form heightwise relatively to the upper-shaping means by engagement with the toe end of the sole and for controlling the sole in the upper-shaping operation, said last-named means comprising a sole-engaging member and a support on which said member is mounted for tipping movement about an axis extending widthwise of the form to adjust itself to the plane of the sole, and a spring tending to tip said member in one direction about its axis and arranged to position the member for engagement with the sole first close to the end of the toe and then to yield as the member tips to seat itself evenly upon the sole.

75. In an upper-shaping machine, the combination with means for shaping the toe end of an upper over a form and over a sole on the form provided with a lip on its outer face, of means for moving the form heightwise relatively to the upper-shaping means by engagement with the toe end of the sole, said last-named means comprising a plate shaped to conform substantially to the curvature of the lip of the sole and arranged to seat itself upon the sole at the inner side of the lip, said plate being mounted for tipping movement about an axis extending widthwise of the form, and yielding means for positioning the plate for engagement with the sole first close to the end of the toe and against the resistance of which it is movable about its axis to seat itself evenly upon the sole.

76. In a power-operated upper-shaping machine, the combination with means for shaping the toe end of an upper over a form, of a work support movable to carry the form lengthwise into position for the upper-shaping operation, a shoe rest arranged to engage the upper at the top of the forepart, a spring tending to move said shoe rest heightwise of the form toward the upper, and automatic means for holding the shoe rest retracted against the resistance of said spring during the form-presenting movement of the work support and for thereafter releasing it to permit it to be moved into operative position by the spring.

77. In a power-operated upper-shaping machine, the combination with means for shaping the toe end of an upper over a form, of a shoe rest for engaging the upper at the top of the forepart, a spring tending to move said shoe rest heightwise of the form toward the upper, mechanism for holding the shoe rest initially in a retracted position against the resistance of said spring, and automatic means to cause said mechanism to release the shoe rest and permit it to be moved into operative position by the spring after the starting of the power operation of the machine.

78. In a power-operated upper-shaping machine, the combination with means for shaping the toe end of an upper over a form, of mechanism for moving the form heightwise relatively to said upper-shaping means, a shoe rest arranged to engage the upper at the top of the forepart, a spring arranged to control said shoe rest and against the resistance of which it is movable with the form in response to the pressure of the form and the upper thereon, mechanism for holding the shoe rest initially in a retracted position against the resistance of said spring, and automatic means to cause said mechanism to release the shoe rest and permit it to be moved into operative position by the spring after the starting of the power operation of the machine.

79. In an upper-shaping machine, the combination with means for shaping the toe end of an upper over a form, of a shoe rest for engaging the upper at the top of the forepart in the upper-shaping operation, said shoe rest comprising a member having a plurality of spring-controlled plungers mounted thereon and arranged in a series extending widthwise of the form for applying pressure to the upper, said plungers being relatively movable into substantial conformity to the contour of the form in response to pressure of the upper thereon.

80. In an upper-shaping machine, the combination with means for shaping the toe end of an upper over a form, of a shoe rest for engaging the upper at the top of the forepart in the upper-shaping operation, said shoe rest comprising a member having a plurality of spring-controlled plungers mounted therein and arranged in a series extending widthwise of the form in positions to press on the upper substantially in the location of the tip seam to assist in holding the tip seam against displacement in the upper-shaping operation, the different plungers being relatively yieldable to adjust themselves in substantial conformity to the contour of the form in response to pressure of the upper thereon.

81. In an upper-shaping machine, the combination with means for shaping the toe end of an upper over a form, of a shoe rest for engaging the upper at the top of the forepart in the upper-shaping operation, said shoe rest comprising a plurality of rows of spring-controlled members positioned in different locations lengthwise of the form with the members of each row arranged in a series extending widthwise of the form, the several members being relatively yieldable to conform substantially to the contour of the form.

82. In an upper-shaping machine, the combination with means for shaping the toe end of an upper over a form, of a shoe rest for engaging the upper at the top of the forepart in the upper-shaping operation, said shoe rest comprising a plurality of rows of spring-pressed plungers arranged to apply pressure to the upper in different locations along the tip seam and at the rear of the tip seam to assist in holding the top of the forepart of the upper against displacement in the upper-shaping operation and in conforming the upper at the rear of the tip seam to the contour of the form.

83. In an upper-shaping machine, the combination with means for shaping the toe end of an upper over a form, of a shoe rest for engaging the upper at the top of the forepart in the upper-shaping operation, said shoe rest comprising a plurality of spring-pressed plungers arranged in a series extending widthwise of the form and relatively yieldable to conform substantially to the contour of the form, and a plurality of members arranged to extend lengthwise of the form and controlled respectively by different plungers to apply the pressure of the plungers to the upper.

84. In an upper-shaping machine, the combination with means for shaping the toe end of an upper over a form, of a shoe rest for engaging the upper at the top of the forepart in the upper-shaping operation, said shoe rest comprising a plurality of pairs of spring-pressed plungers arranged in a series extending widthwise of the form, the plungers of each pair being spaced from each other lengthwise of the form, and members controlled respectively by the different pairs of plungers for applying the pressure of the plungers to the upper.

85. In an upper-shaping machine, the combination with means for shaping the toe end of an upper over a form, of a shoe rest for engaging the upper at the top of the forepart in the upper-shaping operation, said shoe rest comprising a member hollowed out widthwise of the form and having a flexible cover for engaging the upper, and a plurality of spring-controlled plungers in said member arranged in a series extending widthwise of the form for applying pressure to the upper through said flexible cover.

86. In an upper-shaping machine, the combination with means for shaping the toe end of an upper over a form, of a shoe rest for engaging the upper at the top of the forepart in the upper-shaping operation, said shoe rest comprising a member having a flexible cover for engaging the upper, a plurality of spring-controlled plungers in said member arranged to apply their pressure to the upper respectively in different locations through said cover, and flexible plates interposed between different plungers and the cover.

87. In an upper-shaping machine, the combination with means for shaping the toe end of an upper over a form by relative movement of the form and said upper-shaping means in a direction heightwise of the form, of grippers for gripping the margin of the upper at the opposite sides of the toe substantially at the ends of the tip seam to control it in the upper-shaping operation, and supporting means for said grippers provided with guideways along which the grippers are movable inwardly toward the form in straight paths in the upper-shaping operation 88. In an upper-shaping machine, the combination with means for shaping the toe end of an upper over a form, including wipers for wiping the marginal portion of the upper around the toe inwardly over the form, of grippers for gripping the margin of the upper at the opposite sides of the toe, and means for guiding said grippers independently of the wipers for rectilinear movements inwardly toward the form in the upper-shaping operation.

89. In an upper-shaping machine, the combination with means for shaping the toe end of an upper over a form, including wipers for wiping the marginal portion of the upper around the toe inwardly over the form, of grippers for gripping the margin of the upper at the opposite sides of the toe, means provided with slideways along which the grippers are movable inwardly toward the form in directions substantially parallel to the plane of the wipers in the upper-shaping operation, and spring-controlled levers tending to move said grippers outwardly and against the resistance of which they are movable inwardly toward the form.

90. In an upper-shaping machine, the combination with means for shaping the toe end of an upper over a form, of grippers for gripping the margin of the upper at the opposite sides of the toe to control it in the upper-shaping operation, said grippers being movable inwardly toward the form in response to the pull of the upper thereon, and mechanism arranged to act on said grippers to impart to them inward movements toward the form at a predetermined time in the upper-shaping operation.

91. In an upper-shaping machine, the combination with means for shaping the toe end of an upper over a form by relative movement of the form and said upper-shaping means in a direction heightwise of the form, of grippers for gripping the margin of the upper at the opposite sides of the toe to control it in the upper-shaping operation, and mechanism arranged to act on said grippers to impart to them inward movements toward the form in predetermined time relation to the upper-shaping operation.

92. In an upper-shaping machine, the combination with means for shaping the toe end of an upper over a form by relative movement of the form and said upper-shaping means in a direction heightwise of the form, of grippers for gripping the margin of the upper at the opposite sides of the toe to control it in the upper-shaping operation, said grippers being movable inwardly toward the form in response to the pull of the upper thereon at the beginning of the upper-shaping operation, and devices arranged to act on said grippers thereafter to impart to them inward movements toward the form.

93. In an upper-shaping machine, the combination with means for shaping the toe end of an upper over a form, of grippers for gripping the margin of the upper at the opposite sides of the toe to control it in the upper-shaping operation, said grippers being movable inwardly toward the form in response to the pull of the upper thereon, members movable with said grippers and having ratchet teeth thereon, pawls arranged to engage said ratchet teeth, and mechanism arranged to operate said pawls at a predetermined time in the upper-shaping operation to impart to the grippers inward movements toward the form.

94. In an upper-shaping machine, the combination with means for shaping the toe end of an upper over a form by relative movement of the form and said upper-shaping means in a direction heightwise of the form, of grippers for gripping the margin of the upper at the opposite sides of the toe, said grippers being movable inwardly toward the form in response to the pull of the upper thereon in the upper-shaping operation, and mechanism automatically operative near the end of said relative movement of the upper-shaping means and the form to impart to the grippers inward movements toward the form.

95. In an upper-shaping machine, the combination with means for shaping the toe end of an upper over a form, of grippers for gripping the margin of the upper at the opposite sides of the form, said grippers being movable inwardly toward the form in response to the pull of the upper thereon in the upper-shaping operation and each comprising a pair of relatively movable jaws, members movable to close the jaws on the upper devices controlled by said jaw-closing members and movable into positions to connect with the grippers when the jaws are closed, and mechanism arranged to operate said devices to impart to the grippers inward movements toward the form in predetermined time relation to the upper-shaping operation.

96. In an upper-shaping machine, the combination with means for shaping the toe end of an upper over a form, of grippers for gripping the margin of the upper at the opposite sides of the form, means for moving the form heightwise relatively to said upper-shaping means, a shoe rest arranged to engage the upper at the top of the forepart and movable with the form, and mechanism operated by the movement of said shoe rest for moving the grippers inwardly toward the form.

97. In an upper-shaping machine, the combination with means for shaping the toe end of an upper over a form, of grippers for gripping the margin of the upper at the opposite sides of the form, means for moving the form heightwise relatively to said upper-shaping means, a shoe rest arranged to engage the upper at the top of the forepart and movable with the form, the grippers being movable inwardly toward the form in response to the pull of the upper thereon in the upper-shaping operation, and devices arranged to be operated by the movement of said shoe rest for imparting to the grippers inward movements toward the form near the end of the heightwise movement of the form.

98. In an upper-shaping machine, the combination with means for shaping the toe end of an upper over a form, of grippers for gripping the margin of the upper at the opposite sides of the toe to control it in the upper-shaping operation, members mounted for movements lengthwise of the form and supporting said grippers for movements inwardly toward the form in the upper-shaping operation, and means for moving said members lengthwise of the form to cause the grippers to pull the upper in that direction.

99. In an upper-shaping machine, the combination with means for shaping the toe end of an upper over a form, of grippers for gripping the margin of the upper at the opposite sides of the toe to control it in the upper-shaping operation, members mounted for movements lengthwise of the form and supporting said grippers for movements inwardly toward the form in the upper-shaping operation, springs tending to move said members in one direction lengthwise of the form, and means arranged to act on the members in predetermined time relation to the upper-shaping operation to move them in the opposite direction for pulling the upper lengthwise of the form.

100. In an upper-shaping machine, the combination with means for shaping the toe end of an upper over a form, of grippers for gripping the margin of the upper at the opposite sides of the toe to control it in the upper-shaping operation, said grippers being movable inwardly toward the form in the upper-shaping operation, and means for imparting to said grippers also upper-pulling movements lengthwise of the form in directions away from the toe end thereof in predetermined time relation to the upper-shaping operation.

101. In an upper-shaping machine, the combination with means for shaping the toe end of an upper over a form, of grippers for gripping the margin of the upper at the opposite sides of the form, means for moving the form heightwise relatively to said upper-shaping means, a shoe rest arranged to engage the upper at the top of the forepart and movable with the form, and mechanism operated by the movement of said shoe rest for imparting to the grippers upper-pulling movements lengthwise of the form in the upper-shaping operation.

102. In an upper-shaping machine, the combination with means for shaping the toe end of an upper over a form, of grippers for gripping the margin of the upper at the opposite sides of the form, means for moving the form heightwise relatively to said upper-shaping means, a shoe rest arranged to engage the upper at the top of the forepart and movable with the form, wedge members movable in directions heightwise of the form to impart to said grippers upper-pulling movements lengthwise of the form, and mechanism for connecting said wedge members to the shoe rest to operate them by the movement of the shoe rest.

103. In an upper-shaping machine, the combination with means for shaping the toe end of an upper over a form, of grippers for gripping the margin of the upper at the opposite sides of the form, means for moving the form heightwise relatively to said upper-shaping means, a shoe rest arranged to engage the upper at the top of the forepart and movable with the form, and mechanism operated by the movement of said shoe rest for moving the grippers lengthwise of the form and for also moving them inwardly toward the form.

104. In an upper-shaping machine, the combination with means for shaping the toe end of an upper over a form, of grippers for gripping the margin of the upper at the opposite sides of the form, mechanism for imparting to said grippers upper-pulling movements lengthwise of the form in predetermined time relation to the upper-shaping operation, and devices controlled by said mechanism for also imparting to the grippers movements inwardly toward the form.

105. In an upper-shaping machine, the combination with means for shaping the toe end of an upper over a form, of grippers for gripping the margin of the upper at the opposite sides of the form, wedge bars movable heightwise of the form for imparting to said grippers upper-pulling movements lengthwise of the form in the upper-shaping operation, and devices arranged to connect with said grippers and operated by the movements of said wedge bars for imparting to the grippers also movements inwardly toward the form.

106. In an upper-shaping machine, the combination with means for shaping the toe end of an upper over a form, comprising devices for wiping the upper heightwise of the toe and inwardly over a sole on the form, of grippers for gripping and controlling the margin of the upper at the opposite sides of the toe in the wiping operation, said grippers being movable inwardly toward the form in response to the pull of the upper thereon, and means for imparting to the grippers upper-pulling movements lengthwise of the form in directions away from the toe end thereof.

107. In an upper-shaping machine, the combination with means for shaping the toe end of an upper over a form, comprising devices for wiping the upper heightwise of the toe and inwardly over a sole on the form, of grippers for gripping and controlling the margin of the upper at the opposite sides of the toe in the wiping operation, said grippers being movable inwardly toward the form in response to the pull of the upper thereon, mechanism for imparting to said grippers inward movements toward the form at a predetermined time in the wiping operation, and mechanism for imparting to the grippers also upper-pulling movements lengthwise of the form in directions away from the toe end thereof.

108. In an upper-shaping machine, the combination with means for shaping the toe end of an upper over a form, comprising devices for wiping the upper heightwise of the toe and inwardly over a sole on the form, of grippers for gripping and controlling the margin of the upper at the opposite sides of the toe, mechanism for moving said grippers inwardly toward the form in the wiping operation, and mechanism for also imparting to the grippers upper-pulling movements lengthwise of the form in directions away from the toe end thereof in the wiping of the upper heightwise of the toe.

109. In an upper-shaping machine, the combination with means for shaping the toe end of an upper over a form, comprising devices for wiping the upper heightwise of the toe and inwardly over a sole on the form, of grippers for gripping and controlling the margin of the upper at the opposite sides of the toe, and mechanism for imparting to said grippers, in the wiping of the upper heightwise of the toe, upper-pulling movements lengthwise of the form in directions away from the toe end thereof.

110. In an upper-shaping machine, the combination with means for shaping the toe end of an upper over a form, of grippers for gripping the margin of the upper at the opposite sides of the toe to control it in the upper-shaping operation, and means for imparting to said grippers in the upper-shaping operation rectilinear upper-pulling movements lengthwise of the form in directions away from the toe end of the form.

111. In an upper-shaping machine, the combination with means for shaping the toe end of an upper over a form, of grippers for gripping the margin of the upper at the opposite sides of the toe to control it in the upper-shaping operation, means for moving the form heightwise relatively to said upper-shaping means, and mechanism for imparting to said grippers upper-pulling movements lengthwise of the form in directions away from the toe end thereof in the course of the heightwise movement of the form.

112. In an upper-shaping machine, the combination with means for shaping the toe end of an upper over a form, of grippers for gripping the margin of the upper at the opposite sides of the toe to control it in the upper-shaping operation, and mechanism for imparting to said grippers movements lengthwise of the form in directions away from the toe end thereof in predetermined time relation to the upper-shaping operation, said mechanism being so constructed as to impart to the grippers first comparatively quick movements followed by slower movements as the upper-shaping operation progresses.

113. In an upper-shaping machine, the combination with means for shaping the toe end of an upper over a form, of grippers for gripping the margin of the upper at the opposite sides of the toe to control it in the upper-shaping operation, means for moving the form heightwise relatively to said upper-shaping means, and mechanism constructed and arranged to act in the course of heightwise movement of the form to impart to said grippers first comparatively quick movements lengthwise of the form in directions away from the toe end thereof and thereafter slower movements in the same directions.

114. In an upper-shaping machine, the combination with means for shaping the toe end of an upper over a form, of grippers for gripping the margin of the upper at the opposite sides of the toe to control it in the upper-shaping operation, means for moving the form heightwise relatively to said upper-shaping means, and wedge bars for imparting to said grippers in the course of the heightwise movement of the form upper-pulling movements lengthwise of the form in directions away from the toe end thereof, said wedge bars being so formed as to impart to the grippers first comparatively quick movements and thereafter slower movements.

115. In an upper-shaping machine, the combination with means for shaping the toe end of an upper over a form, comprising wipers for wiping the marginal portion of the upper around the toe inwardly over the form, of grippers for gripping the marginal portion of the upper outspread relatively to the wipers at the opposite sides of the forepart to control it in the upper-shaping operation, each of said grippers comprising a pair of jaws one of which is movable toward the other in a direction transverse to the plane of the wipers, a member supporting said movable jaw, and another member mounted for turning movement about an axis substantially parallel to the plane of the wipers with a wedging action on said jaw-supporting member to impart upper-gripping movement to the movable jaw.

116. In an upper-shaping machine, the combination with means for shaping the toe end of an upper over a form, comprising wipers for wiping the marginal portion of the upper around the toe inwardly over the form, of grippers for gripping the marginal portion of the upper outspread relatively to the wipers at the opposite sides of the forepart to control it in the upper-shaping operation, each of said grippers comprising a pair of jaws one of which is movable toward the other in a direction transverse to the plane of the wipers, a member supporting said movable jaw, a bell-crank lever having one of its arms arranged to act on said jaw-supporting member to impart upper-gripping movement to the movable jaw by swinging movement of said lever, and a member movable in a direction transverse to the plane of the wipers and arranged to act on the other arm of said bell-crank lever to operate it.

117. In an upper-shaping machine, the combination with means for shaping the toe end of an upper over a form, comprising wipers for wiping the marginal portion of the upper around the toe inwardly over the form, of grippers for gripping the marginal portion of the upper outspread relatively to the wipers at the opposite sides of the forepart to control it in the upper-shaping operation, each of said grippers comprising a pair of jaws one of which is movable toward the other in a direction transverse to the plane of the wipers, an arm supporting said movable jaw and mounted for swinging movement to cause said jaw to grip the upper, said arm having a cam face thereon, a bell-crank lever having on one of its arms a roll for engaging said cam face to impart jaw-closing movement to the arm and having also a roll on its other arm, and a member movable in a direction transverse to the plane of the wipers for swinging the bell-crank lever by engagement with said last-named roll, said member being so constructed as to permit movements of the gripper along the plane of the wipers while maintaining an operative relation to said bell-crank lever.

118. In an upper-shaping machine, a gripper for gripping the marginal portion of an upper, said gripper comprising a pair of jaws one of which is movable toward and from the other, a member supporting said movable jaw, and another member mounted for swinging movement and arranged to have a wedging action on said jaw-supporting member to impart upper-gripping movement to the movable jaw.

119. In an upper-shaping machine, a gripper for gripping the marginal portion of an upper, said gripper comprising a pair of jaws one of which is movable toward and from the other, a member supporting said movable jaw, said member having a cam face thereon, and a lever mounted for swinging movement and provided with a roll for engaging said cam face to impart to the movable jaw its upper-gripping movement.

120. In an upper-shaping machine, a gripper for gripping the marginal portion of an upper, said gripper comprising a pair of jaws one of which is movable toward and from the other, a member supporting said movable jaw, a bell-crank lever having one of its arms arranged for wedging action on said member to impart upper-gripping movement to the movable jaw, and a member arranged to act on the other arm of said bell-crank lever to operate it.

121. In an upper-shaping machine, a gripper for gripping the marginal portion of an upper, said gripper comprising a pair of jaws one of which is movable toward and from the other, an arm supporting said movable jaw and mounted for swinging movements, means for engaging said arm to swing it in the direction to impart upper-gripping movement to the movable jaw, spring means for swinging the arm in the opposite direction, and additional spring means supporting said arm for swinging movements and yieldable in response to the jaw-closing force applied to the arm after the gripping of the upper.

122. In an upper-shaping machine, a gripper for gripping the marginal portion of an upper, said gripper comprising a pair of jaws one of which is movable toward and from the other, an arm having said movable jaw mounted on one end thereof, a pivotal support for said arm at its opposite end, means for engaging the arm between its ends to swing it in the direction to cause the movable jaw to grip the upper, a spring arranged to act on the arm to swing it in the opposite direction, and another spring controlling said pivotal support and yieldable in response to jaw-closing force applied to the arm after the gripping of the upper.

123. In an upper-shaping machine, a gripper for gripping the marginal portion of an upper, said gripper comprising a pair of jaws one of which is movable toward and from the other, an arm having said movable jaw mounted on one end thereof, a pivotal support for said arm at its opposite end, a swinging member arranged to have a wedging action on the arm between its ends to move it in the direction to cause the movable jaw to grip the upper, a spring for imparting to the arm movement in the opposite direction, and another spring controlling said pivotal support and yieldable in response to jaw-closing force applied to the arm after the gripping of the upper.

124. In an upper-shaping machine, a gripper for gripping the marginal portion of an upper, said gripper having a pair of jaws, a gripper carrier supporting one of said jaws and having opposite side portions spaced from each other, an arm supporting the other jaw and mounted for swinging movements between the opposite side portions of said carrier, and a bell-crank lever pivoted on said opposite side portions of the carrier for swinging said arm to impart to said other jaw its upper-gripping movement.

125. In an upper-shaping machine, a gripper for gripping the marginal portion of an upper, said gripper comprising a pair of jaws, a carrier supporting one of said jaws and provided with opposite side portions spaced from each other, an arm mounted for swinging movements between said opposite side portions of the carrier and having the other jaw mounted thereon at one end thereof, a pivotal support for the other end of said arm movably mounted on said carrier, means for engaging the arm between its opposite ends for swinging it to impart upper-gripping movement to the jaw thereon, and a spring controlling said pivotal support and yieldable in response to jaw-closing force applied to the arm after the gripping of the upper.

126. In an upper-shaping machine, the combination with means for shaping the toe ends of uppers of different sizes over forms, of grippers for gripping the marginal portion of each upper at the opposite sides of the form to control it in the upper-shaping operation, jig pins for engaging each upper in jig holes provided therein to position the upper relatively to the upper-shaping means prior to the upper-shaping operation, gage members arranged to contact with said jig pins to assist in determining the positions of the pins, and mechanism common to said grippers and gage members for adjusting the grippers widthwise of the form and for also adjusting the gage members for uppers of different sizes.

127. In an upper-shaping machine, the combination with means for shaping toe ends of uppers of different sizes over forms, of a work support for supporting each form, said work support being movable in a direction heightwise of the form relatively to the upper-shaping means in the upper-shaping operation, grippers for gripping the marginal portion of each upper at the opposite sides of the form to control it in the upper-shaping operation, jig pins for engaging each upper in jig holes provided therein to position the upper relatively to the upper-shaping means, gage members arranged to contact with said jig pins to assist in determining their positions, and mechanism common to said work support, grippers and gage members for adjusting the work support in a direction heightwise of the form, for adjusting the grippers widthwise of the form and for adjusting said gage members for uppers of different sizes.

128. In an upper-shaping machine, a band for embracing an upper around an end of a form, a support for the intermediate portion of said band movable lengthwise of the form, supports for the opposite end portions of the band, said last-named supports having grooves therein extending heightwise of the form, and means attached to the band and slidingly mounted in said grooves to permit the end portions of the band to move lengthwise of the form relatively to their supports.

129. In an upper-shaping machine, a band for embracing an upper around an end of a form, a support for the intermediate portion of said band yieldingly movable lengthwise of the form, supports for the opposite end portions of the band, said last-named supports having grooves therein extending heightwise of the form, and a flexible metal plate fastened to the band in the vicinity of each of its opposite end portions and slidingly mounted in the groove in the adjacent support to permit the opposite end portions of the band to move lengthwise of the form relatively to their supports.

130. In an upper-shaping machine, a band for embracing an upper around an end of a form, a support for the intermediate portion of said band yieldingly movable lengthwise of the form, spring-controlled slides movable laterally of the form, members mounted on said slides for movements about axes extending heightwise of the form and arranged to support the opposite end portions of the band, said members having grooves therein extending heightwise of the form, and means attached to the band and slidingly mounted in said grooves to permit the opposite end portions of the band to move lengthwise of the form relatively to their supporting members.

131. In an upper-shaping machine, a band for embracing an upper around an end of a form, a support for the band comprising slides connected respectively to the intermediate portion and the opposite end portions of the band, springs tending to move said slides inwardly toward the form and against the resistance of which they are outwardly movable, and other springs arranged to act in locations substantially at the corners of the band to force the band yieldingly against the form in those locations.

132. In an upper-shaping machine, a band for embracing an upper around an end of a form, a plurality of interconnected links arranged to extend around the corner portions of the band, spring means arranged to act on said links at the corner portions of the band to press the band inwardly against the form, and spring-controlled members separate from said links and arranged to press the band inwardly against the form in the vicinity of its opposite end portions.

133. In an upper-shaping machine, a band for embracing an upper around an end of a form, a plurality of interconnected links arranged to extend around the corner portions of the band, spring means arranged to act on said links to press the band inwardly against the form, slides movable laterally of the form at the opposite sides thereof, springs tending to force said slides inwardly toward the form, and members separate from said links and mounted on said slides for movements about axes extending heightwise of the form for controlling the band in the vicinity of its opposite end portions.

134. In an upper-shaping machine, a band for embracing an upper around an end of a form, a support for the intermediate portion of said band yieldingly movable lengthwise of the form, a plurality of links connected to said support and arranged to extend around the corners of the band, spring means for pressing said links inwardly toward the form at the corner portions of the band, and members separate from said links and arranged to act on the band in the vicinity of its opposite end portions to press it inwardly against the form.

135. In an upper-shaping machine, a band for embracing an upper around an end of a form, a support for the intermediate portion of said band yieldingly movable lengthwise of the form, a plurality of links connected to said support and arranged to extend around the corners of the band, spring means for pressing said links inwardly toward the form, members separate from said links for supporting the opposite end portions of the band, springs for forcing said members inwardly toward the form, and connections between the band and said members so constructed as to permit the band to move lengthwise of the form relatively to said members.

136. In an upper-shaping machine, a band for embracing an upper around an end of a form, members movable laterally of the form for pressing the opposite end portions of the band inwardly against the form, bars mounted for movement lengthwise of the form and provided with means for retracting said members from the form by that movement, and connections between said bars and other portions of the band for retracting said other portions also from the form by the movement of the bars.

137. In an upper-shaping machine, a band for embracing an upper around an end of a form, members movable laterally of the form for pressing the opposite end portions of the band inwardly against the form, bars mounted for movement lengthwise of the form and having wedge faces thereon for retracting said members from the form by that movement, and devices connected to the corner portions of the band and arranged to be operated by said bars to retract said corner portions also from the form.

138. In an upper-shaping machine, a band for embracing an upper around an end of a form, members movable laterally of the form for pressing the opposite end portions of the band inwardly against the form, bars mounted for movement lengthwise of the form and having wedge faces thereon for retracting said members from the form by that movement, levers connected to the corner portions of the band for retracting those portions from the form, and connections between the bars and said levers for operating the levers by the movement of the bars.

139. In an upper-shaping machine, a band for embracing an upper around an end of a form, members movable laterally of the form for pressing the opposite end portions of the band inwardly against the form, bars mounted for movement lengthwise of the form and provided with means for retracting said members from the form by that movement, levers mounted for swinging movements about axes extending heightwise of the form, links connecting said levers to the corner portions of the band, and means for operating the levers by the movement of said bars to retract the corner portions of the band from the form.

140. In an upper-shaping machine, a band for embracing an upper around an end of a form, a support for the intermediate portion of said band yieldingly movable lengthwise of the form in a direction away from the form, and mechanism connected to the corner portions of the band for retracting them from the form and for thereby also imparting to said support movement away from the form.

141. In an upper-shaping machine, a band for embracing an upper around an end of a form, a support for the intermediate portion of said band yieldingly movable lengthwise of the form in a direction away from the form, members movable lengthwise of the form to retract the opposite end portions of the band from the form, and connections between said members and the corner portions of the band for retracting said corner portions from the form and for thereby also moving said support away from the form.

142. In an upper-shaping machine, a band for embracing an upper around an end of a form, members movable lengthwise of the form to retract the opposite end portions of the band from the form, levers each pivotally mounted at one end and connected to one of said members at its other end, and links connecting said levers between their opposite ends to the corners of the band for retracting the corner portions of the band from the form.

143. In an upper-shaping machine, wipers for wiping an end of an upper inwardly over a sole on a form, said wipers having in their wiping edges a groove formed to receive a wire binder provided with flattened end portions and adapted to be applied to the upper around the end of the sole, said groove being so formed as to extend farther into the wipers in the locations where the flattened end portions of the binder are positioned than in other locations.

144. In an upper-shaping machine, wipers for wiping an end of an upper inwardly over a sole on a form, said wipers having in their wiping edges a groove formed to receive a previously prepared binder of less length than said wiping edges to be applied to the upper around the end of the sole, said groove terminating short of the ends of the wipers.

145. In an upper-shaping machine, wipers for wiping an end of an upper inwardly over a sole on a form, said wipers having in their wiping edges a groove formed to receive a wire binder provided with flattened end portions and adapted to be applied to the upper around the end of the sole and having also in their wiping edges notches arranged to receive fastenings driven through said flattened end portions to fasten the binder.

146. In an upper-shaping machine, wipers for wiping an end of an upper inwardly over a sole on a form, said wipers having in their wiping edges a groove formed to receive a wire binder provided with flattened end portions and adapted to be applied to the upper around the end of the sole and having members arranged to press yieldingly on said flattened end portions to assist in holding the binder in the groove.

147. In an upper-shaping machine, wipers for wiping an end of an upper inwardly over a sole on a form, said wipers having in their wiping edges a groove formed to receive a wire binder provided with flattened end portions and adapted to be applied to the upper around the end of the sole and carrying spring-pressed balls arranged to bear on said flattened end portions to assist in holding the binder in the groove.

148. In an upper-shaping machine, wipers for wiping an end of an upper inwardly over a sole on a form, said wipers having in their wiping edges a groove formed to receive a binder to be applied to the upper around the end of the sole and having also spring-pressed balls mounted in recesses therein for engaging the binder to assist in holding it in the groove.

149. A device for presenting an upper-holding binder to lasting mechanism, comprising end-embracing wipers, in position to be applied to an upper by the lasting mechanism, said device comprising means constructed and arranged to guide the binder in locations along the intermediate and side portions of the edges of the wipers, and mechanism movable to advance the binder along said guiding means and to force it into a position in proximity to said edges.

150. A device for presenting an upper-holding binder to lasting mechanism, comprising end-embracing wipers, in position to be applied to an upper by the lasting mechanism, said device comprising members relatively movable to positions in accordance with the contour of the edges of the wipers and arranged to serve as guiding means for the binder, and mechanism movable to advance the binder along said members and to force it into a position in proximity to said edges.

151. A device for presenting an upper-holding binder to lasting mechanism, comprising end-embracing wipers, in position to be applied to an upper by the lasting mechanism, said device comprising a binder-guiding member arranged to engage the intermediate portion of the edges of the wipers, other yieldingly controlled guiding members arranged to adjust themselves to positions determined by engagement with the side portions of the wiper edges, and mechanism movable to advance the binder along said guiding members and to force it into a position in proximity to said edges.

152. A device for presenting an upper-holding binder in a groove formed in the edges of end-embracing wipers, said device comprising a plate having an edge contour substantially complemental to the contour of the intermediate portion of the edges of the wipers, other yieldingly controlled plates having edge contours substantially complemental to the contours of the side portions of the wiper edges and relatively movable to positions determined by contact with said edges, means for determining by engagement with the wipers a position of the device such that said plates present binder-guiding faces substantially in the plane of the groove in the wipers, and means for moving the binder along said plates and into the groove.

153. A device for presenting an upper-holding binder in a groove formed in the edges of end-embracing wipers, said device comprising binder-guiding members arranged to contact with the edges of the wipers in different locations along said edges, means for determining a position for the device such that said members present binder-guiding faces substantially in the plane of the groove in the wipers, and means for moving the binder along said faces and into the groove.

154. A device for presenting an upper-holding binder in a groove formed in the edges of end-embracing wipers, said device comprising binder-guiding members arranged to contact with the edges of the wipers in different locations along said edges and relatively movable to positions in accordance with the contours of said edges, means for determining by engagement with the wipers a position of the device such that said members present binder-guiding faces substantially in the plane of the groove in the wipers, and means for moving the binder along said faces and into the groove.

155. A device for presenting an upper-holding binder to lasting mechanism, comprising end-embracing wipers, in position to be applied to an upper by the lasting mechanism, said device comprising means for moving the intermediate portion of the binder to a position in proximity to the edges of the wipers, and additional means for moving other portions of the binder to positions in proximity to said edges.

156. A device for presenting an upper-holding binder to lasting mechanism, comprising end-embracing wipers, in position to be applied to an upper by the lasting mechanism, said device comprising a plurality of members arranged to engage different portions of the binder respectively and relatively movable to force the different portions of the binder into positions in proximity to the edges of the wipers.

157. A device for presenting an upper-holding binder to lasting mechanism, comprising end-embracing wipers, in position to be applied to an upper by the lasting mechanism, said device comprising a member mounted for advancing movement to force the intermediate portion of the binder into a position in proximity to the edges of the wipers and other members mounted for movements laterally of the wipers to force the end portions of the binder into proximity to said edges.

158. A device for presenting and upper-holding binder to lasting mechanism, comprising end-embracing wipers, in position to be applied to an upper by the lasting mechanism, said device comprising means for guiding the binder to a position in proximity to the edges of the wipers, and a plurality of members arranged to engage respectively different portions of the binder and relatively movable along said guiding means to force the different portions of the binder into positions in proximity to said edges.

159. A device for presenting an upper-holding binder to lasting mechanism, comprising end-embracing wipers, in position to be applied to an upper by the lasting mechanism, said device comprising means for guiding the binder to a position in proximity to the edges of the wipers, a member arranged to engage the intermediate portion of the binder and mounted for advancing movement along said guiding means to force that portion of the binder into a position in proximity to said edges, and additional members arranged to engage other portions of the binder and mounted for advancing movement with said first-named member and also for movements in directions away from each other to force the portions of the binder engaged thereby into proximity to said edges.

160. A device for presenting an upper-holding binder to lasting mechanism, comprising end-embracing wipers, in position to be applied to an upper by the lasting mechanism, said device comprising means for guiding the binder to a position in proximity to the edges of the wipers, a member arranged to engage the intermediate portion of the binder and mounted for advancing movement along said guiding means to force that portion of the binder into a position in proximity to said edges, additional members arranged to engage portions of the binder located nearer its opposite ends and mounted for advancing movements with said first-named member, arms on which said additional members are mounted to turn about axes extending transversely of the plane of the wipers, and means for swinging said arms apart to cause said additional members to force the portions of the binder engaged thereby into the required positions.

161. A device for presenting an upper-holding binder to lasting mechanism, comprising end-embracing wipers, in position to be applied to an upper by the lasting mechanism, said device comprising means for guiding the binder to a position in proximity to the edges of the wipers, and mechanism movable along said guiding means to force the binder into that position, said mechanism comprising a member arranged to engage the intermediate portion of the binder to force that portion into the required position and other members relatively movable in response to resistance of the lasting mechanism to the movement of said first-named member to force other portions of the binder into the required positions.

162. A device for presenting an upper-holding binder in a groove formed in the edges of end-embracing wipers, said device comprising guiding means arranged to engage the edges of the wipers to guide the binder into said groove, and a plurality of members arranged to engage different portions of the binder respectively and movable along said guiding means to force the different portions of the binder into the groove.

163. A device for presenting an upper-holding binder in a groove formed in the edges of end-embracing wipers, said device comprising guiding means arranged to guide the binder into said groove, and mechanism movable along said guiding means to force the binder into the groove, said mechanism comprising a member arranged to engage the intermediate portion of the binder and having an edge contour substantially complemental to the edge contour of the corresponding portion of the wipers, said member being mounted for turning movement about an axis substantially perpendicular to the plane of the wipers to adjust itself to the wipers in forcing the binder into the groove.

164. A device for presenting an upper-holding binder in a groove formed in the edges of end-embracing wipers, said device comprising guiding means arranged to engage the edges of the wipers to guide the binder into said groove, and mechanism movable along said guiding means to force the binder into the groove, said mechanism comprising a member arranged to engage the intermediate portion of the binder and having an edge contour substantially complemental to the edge contour of the corresponding portion of the wipers, and a plate also having an edge contour substantially complemental to the edge contour of the intermediate portion of the wipers and arranged to overlap the binder to assist in controlling it, said plate being movable with said member and being yieldable upon engagement with the edges of the wipers to permit the member to continue its movement to force the binder into the groove.

165. A device for presenting an upper-holding binder in a groove formed in the edges of end-embracing wipers, said device comprising guiding means arranged to engage the intermediate and side portions of the edges of the wipers to guide the binder into said groove, and mechanism mounted for movement against yielding resistance along said guiding means to force the binder into the groove, said mechanism comprising a member arranged to engage the intermediate portion of the binder and other members arranged to engage portions of the binder nearer the ends thereof and movable in directions away from each other to act on the binder.

166. A device for presenting an upper-holding binder in a groove formed in the edges of end-embracing wipers, said device comprising guiding means arranged to engage the intermediate and side portions of the edges of the wipers to guide the binder into said groove, a member arranged to engage the intermediate portion of the binder and mounted for advancing movement along said guiding means to force that portion of the binder into the groove, other members mounted for advancing movement with said first-named member and arranged to engage portions of the binder nearer the ends thereof, and mechanism operative in response to resistance of the wipers to the advancing movement of said first-named member to move said other members apart for forcing the portions of the binder engaged thereby into the groove.

167. A device for presenting an upper-holding binder in a groove formed in the edges of end-embracing wipers, said device comprising guiding means arranged to engage the intermediate and side portions of the edges of the wipers to guide the binder into said groove, a member arranged to engage the intermediate portion of the binder and mounted for advancing movement along said guiding means to force that portion of the binder into the groove, other members mounted for advancing movement with said first-named member and arranged to engage portions of the binder nearer the ends thereof, arms on which said other members are mounted for turning movements about axes perpendicular to the plane of the wipers, and mechanism operative in response to resistance of the wipers to advancing movement of said first-named member to swing said arms apart and thereby cause said other members to act on the binder.

168. A manually operated device for presenting an upper-holding binder to end-lasting mechanism, comprising end-embracing wipers, in position to be applied to an upper by said mechanism, said device comprising means for guiding the binder to the desired position, a carrier movable along said guiding means, a handle connected to said carrier for moving it and for manipulating the device, said carrier having means for forcing the intermediate portion of the binder into the desired position, and members movable with said carrier and also movable to force portions of the binder nearer the ends thereof into the desired positions in response to movement of the handle relatively to the carrier.

169. A manually operated device for presenting an upper-holding binder to end-lasting mechanism, comprising end-embracing wipers, in position to be applied to an upper by said mechanism, said device comprising means for guiding the binder to the desired position, a carrier movable along said guiding means, a handle connected to said carrier for moving it and for manipulating the device, said carrier having means for forcing the intermediate portion of the binder into the desired position, members supported by said carrier for movements in directions away from each other to force portions of the binder nearer the ends thereof into the desired positions, mechanism for operating said members by movement of the handle relatively to the carrier, and a spring against the resistance of which the handle is thus movable.

170. A manually operated device for presenting an upper-holding binder to end-lasting mechanism, comprising end-embracing wipers, in position to be applied to an upper by said mechanism, said device comprising means for guiding the binder to the desired position, a carrier movable along said guiding means, a handle connected to said carrier for moving it and for manipulating the device, said carrier having means for forcing the intermediate portion of the binder into the desired position, members supported by said carrier for movements in directions away from each other to force portions of the binder nearer the ends thereof into the desired positions, mechanisms for operating said members by movement of the handle relatively to the carrier, and means for preventing the operative movements of said members until after the intermediate portion of the binder has been forced substantially into the desired position.

171. A manually operated device for presenting an upper-holding binder in a groove formed in the edges of end-embracing wipers, said device comprising means for guiding the binder into said groove, a member mounted for movement against yielding resistance along said guiding means to force the intermediate portion of the binder into the groove, a handle connected to said member for moving it and for manipulating the device, and mechanism operative in response to movement of the handle relatively to said member to force portions of the binder nearer the ends thereof into the groove.

172. A manually operated device for presenting an upper-holding binder in a groove formed in the edges of end-embracing wipers, said device comprising means for engaging the edges of the wipers to guide the binder into said groove, a carrier mounted for movement against yielding resistance along said guiding means to force the intermediate portion of the binder into the groove, a handle connected to said carrier for moving it and for manipulating the device, members supported on said carrier for movements in directions away from each other to force portions of the binder nearer the ends thereof into the groove, mechanism for operating said members by movement of the handle relatively to the carrier, and a spring controlling said handle and yieldable in response to resistance of the wipers to the movement of the carrier to permit the movement of the handle.

173. A manually operated device for presenting an upper-holding binder in a groove formed in the edges of end-embracing wipers, said device comprising means for guiding the binder into said groove, a member mounted for movement against yielding resistance along said guiding means to force the intermediate portion of the binder into the groove, a handle connected to said member for moving it and for manipulating the device, arms movable with said member and also mounted for swinging movements away from each other, said arms being provided with means for forcing portions of the binder nearer the ends thereof into the groove, mechanism for swinging said arms by movement of the handle relatively to said member, and devices for locking the arms against swinging movement until said member has arrived substantially at the end of its movement.

174. A manually operated device for presenting an upper-holding binder in a groove formed in the edges of end-embracing wipers, said device comprising a plurality of members arranged to engage the edges of the wipers to guide the binder into said groove and relatively movable to adjust themselves to the wipers, a carrier movable along said guiding members and provided with a handle for moving it and for manipulating the device, and a plurality of members movable with said carrier and also relatively movable for engaging respectively different portions of the binder and forcing it into said groove.

175. A manually operated device for presenting an upper-holding binder in a groove formed in the edges of end-embracing wipers, said device comprising a plurality of members arranged to engage the edges of the wipers to guide the binder into said groove and relatively movable to adjust themselves to the wipers, a carrier movable along said guiding members and provided with a handle for moving it and for manipulating the device, said carrier having means for forcing the intermediate portion of the binder into the groove, and members on the carrier movable relatively to each other to force portions of the binder nearer the ends thereof into the groove.

176. A manually operated device for presenting an upper-holding binder in a groove formed in the edges of end-embracing wipers, said device comprising a plurality of members arranged to engage the edges of the wipers to guide the binder into said groove and relatively movable to adjust themselves to the wipers, a carrier movable along said guiding members and provided with a handle for moving it and for manipulating the device, spring means against the resistance of which the carrier is thus movable, said carrier having means for forcing the intermediate portion of the binder into the groove, members on the carrier movable to force portions of the binder nearer the ends thereof into the groove, and mechanism movable to operate said members by movement of the handle relatively to the carrier after the movement of the carrier has been stopped by the wipers.

177. A manually operated device for presenting an upper-holding binder in a groove formed in the edges of end-embracing wipers, said device comprising a plurality of members arranged to engage the edges of the wipers to guide the binder into said groove and relatively movable to adjust themselves to the wipers, a carrier movable along said guiding members and provided with a handle for moving it and for manipulating the device, spring means against the resistance of which the carrier is thus movable, said carrier having means for forcing the intermediate portion of the binder into the groove, arms mounted on said carrier for swinging movements to force portions of the binder nearer the ends thereof into the groove, mechanism for swinging said arms by movement of the handle relatively to the carrier, and means for preventing such movement of the handle until the carrier has arrived substantially at the end of its movement.

178. In an upper-shaping machine, means for shaping the toe end of an upper over a form and in the angle between the feather and the lip of a sole on the form and for also applying a previously formed binder around the toe in said angle to hold the upper with the opposite end portions of the binder against the upper, and fastening-inserting mechanism constructed and arranged relatively to the binder-applying means to pierce the end portions of the binder with fastenings inserted at the opposite sides of the shoe bottom to fasten the binder in upper-holding position.

179. In an upper-shaping machine, wipers for wiping the toe end of an upper inwardly over a sole on a form, said wipers having in their wiping edges a groove spaced from their opposite faces and formed to receive a binder to be applied to the upper around the end of the sole, and fastening-inserting mechanism constructed and arranged to drive fastenings at the opposite sides of the shoe bottom in such relation to the binder as to fasten it in upper-holding position.

180. In an upper-shaping machine, means for shaping the toe end of an upper over a form and in the angle between the feather and the lip of a sole on the form and for also applying around the toe in said angle a wire binder provided with flattened end portions, and fastening-inserting mechanism constructed and arranged to drive fastenings through the flattened end portions of the binder to fasten it in upper-holding position.

181. In an upper-shaping machine, wipers for wiping the toe end of an upper inwardly over a sole on a form, said wipers having in their wiping edges a groove formed to receive a binder to be applied to the upper around the end of the sole, and fastening-inserting mechanism mounted independently of said wipers and constructed and arranged to pierce the binder with fastenings driven at the opposite sides of the shoe bottom to fasten it in upper-holding position.

182. In an upper-shaping machine, wipers for wiping the toe end of an upper inwardly over a sole on a form, said wipers having in their wiping edges a groove formed to receive a binder to be applied to the upper around the toe and also having in their wiping edges notches arranged to expose portions of the binder in said groove, and automatic means for driving fastenings in said notches through the exposed portions of the binder to fasten the binder in upper-holding position.

183. In an upper-shaping machine, wipers for wiping the toe end of an upper inwardly over a sole on a form, said wipers having in their wiping edges a groove formed to receive a wire binder provided with flattened end portions and adapted to be applied to the upper around the toe, and fastening-inserting mechanism constructed and arranged to pierce the flattened end portions of the binder with fastenings driven at the opposite sides of the shoe bottom to fasten the binder in upper-holding position.

184. In an upper-shaping machine, wipers for wiping the toe end of an upper inwardly over a sole on a form, said wipers having in their wiping edges a groove formed to receive a wire binder provided with flattened end portions and having also in their wiping edges notches in positions to receive fastenings driven through the flattened end portions of the binder, and means for driving fastenings in said notches through the end portions of the binder to fasten the binder in upper-holding position.

185. In an upper-shaping machine, means for shaping the toe end of an upper over a form and over a sole on the form and for applying a binder around the toe to hold the upper against a lip on the sole, and means mounted independently of said upper-shaping and binder-applying means for inserting a plurality of fastenings through the binder at each of the opposite sides of the toe to fasten the binder in upper-holding position.

186. In an upper-shaping machine, means for shaping the toe end of an upper over a form and over a sole on the form having a lip on its outer face and for applying around the toe a wire binder provided with flattened end portions to hold the upper against the lip, and means for driving through each of the flattened end portions of the binder a plurality of fastenings to fasten the binder in upper-holding position.

187. In an upper-shaping machine, means for shaping the toe end of an upper over a form and over a sole on the form and for applying a binder around the toe to hold the upper, devices for inserting fastenings at the opposite sides of the shoe bottom in such relation to the binder as to fasten it in upper-holding position, and means for maintaining said devices at substantial distances from the plane of the sole in the upper-shaping operation and for moving them toward said plane preparatory to the driving of the fastenings.

188. In an upper-shaping machine, means for shaping the toe end of an upper over a form and over a sole on the form and for applying a binder around the toe to hold the upper, devices for inserting fastenings at the opposite sides of the shoe bottom to fasten the binder in upper-holding position, said devices each comprising means for holding a fastening, and mechanism for moving said fastening-inserting devices both heightwise and laterally of the form to bring them into positions for the insertion of the fastenings.

189. In an upper-shaping machine, wipers for wiping the marginal portion of the toe end of an upper inwardly over a sole on a form, said wipers being constructed to apply an upper-holding binder around the toe end of the upper, devices for inserting fastenings at the opposite sides of the shoe bottom to fasten the binder in upper-holding position, and mechanism for moving said devices heightwise of the form substantially into engagement with the wipers and for also moving them inwardly along the wipers into positions for the insertion of the fastenings.

190. In an upper-shaping machine, wipers for wiping the marginal portion of the toe end of an upper inwardly over a sole on a form, said wipers being constructed to apply an upper-holding binder around the toe end of the upper, a device arranged to engage the toe end of the sole at a distance from the edge of the sole, devices for inserting fastenings at the opposite sides of the toe to fasten the binder in upper-holding position, and mechanism for moving said fastening-inserting devices laterally of the form to positions determined by said sole-engaging device prior to the fastening-inserting operation.

191. In an upper-shaping machine, wipers for wiping the marginal portion of the toe end of an upper inwardly over a sole on a form, said wipers being constructed to apply an upper-holding binder around the toe end of the upper, a device arranged to engage the toe end of the sole at a distance from the edge of the sole, devices for inserting fastenings at the opposite sides of the toe to fasten the binder in upper-holding position, and mechanism for moving said fastening-inserting devices heightwise of the form substantially into engagement with the wipers and also laterally of the form to positions determined by said sole-engaging device preparatory to the fastening-inserting operation.

192. In an upper-shaping machine, wipers for wiping the marginal portion of the toe end of an upper inwardly over a sole on a form and against a lip on the sole, said wipers being constructed to apply an upper-holding binder around the toe to hold the upper against the lip, a member for engaging the sole at the inner side of the lip and for supporting the lip against the pressure of the wipers, devices for inserting fastenings at the opposite sides of the toe to fasten the binder in upper-holding position, and mechanism for moving said devices laterally of the form to positions determined by said sole-engaging member preparatory to the insertion of the fastenings.

193. In an upper-shaping machine, means for shaping the toe end of an upper over a form and over a sole on the form and for applying an upper-holding binder around the toe, and means for inserting a plurality of fastenings at each of the opposite sides of the shoe bottom to fasten the binder in upper-holding position, said fastening-inserting means comprising, for each of the opposite sides of the shoe bottom, a plurality of fastening-inserting devices movable together toward fastening-inserting positions and also movable relatively to one another to permit them to assume the proper positions.

194. In an upper-shaping machine, means for shaping the toe end of an upper over a form and over a sole on the form and for applying an upper-holding binder around the toe, and means for inserting a plurality of fastenings at each of the opposite sides of the toe to fasten the binder in upper-holding position, said fastening-inserting means comprising, for each of the opposite sides of the toe, a plurality of fastening-inserting devices movable together both heightwise and laterally of the form toward fastening-inserting positions and so mounted as to permit them to move relatively to one another in both those directions to assume the proper positions for the insertion of the fastenings.

195. In an upper-shaping machine, wipers for wiping the marginal portion of the toe end of an upper inwardly over a sole on a form, said wipers being constructed to apply an upper-holding binder around the toe, a plurality of fastening-inserting devices arranged to act at each of the opposite sides of the toe to insert fastenings for securing the binder in upper-holding position, and means for moving said devices heightwise of the form into contact with the wipers and laterally of the form into positions for the insertion of the fastenings, the devices at each side of the toe being mounted for relative movements both heightwise and laterally of the form to permit them to assume the proper relative positions for the fastening-inserting operation.

196. In an upper-shaping machine, means for shaping an end of an upper over a form and over a sole on the form, a plurality of fastening-inserting devices for inserting fastenings respectively at the opposite sides of the shoe bottom to fasten the upper to the sole, and means for moving said devices as a unit heightwise of the form toward the plane of the sole and for also moving them relatively to each other laterally of the form into positions for the insertion of the fastenings.

197. In an upper-shaping machine, means for shaping an end of an upper over a form and over a sole on the form, a plurality of fastening-inserting devices for inserting fastenings respectively at the opposite sides of the shoe bottom to fasten the upper to the sole, each of said devices comprising means for holding a fastening and a driver for driving the fastening, and means for moving said devices as a unit heightwise of the form toward the plane of the sole prior to the operation of the drivers and for also moving them relatively to each other laterally of the form into positions for the driving of the fastenings.

198. In an upper-shaping machine, means for shaping an end of an upper over a form and over a sole on the form, a plurality of fastening-inserting devices for inserting fastenings respectively at the opposite sides of the shoe bottom to fasten the upper to the sole, each of said devices comprising means for holding a fastening and a driver for driving the fastening, spring means for operating the drivers, and mechanism for moving said fastening-inserting devices and spring means as a unit heightwise of the form and for also moving said devices relatively to each other laterally of the form into positions for the driving of the fastenings.

199. In an upper-shaping machine, means for shaping an end of an upper over a form and over a sole on the form, a plurality of fastening-inserting devices for inserting fastenings to fasten the end portion of the upper to the sole, each of said fastening-inserting devices comprising means for holding a fastening and a driver for driving the fastening, separating means for delivering fastenings to said devices, and mechanism for moving said devices as a unit heightwise of the form relatively to said separating means prior to the driving of the fastenings.

200. In an upper-shaping machine, means for shaping an end of an upper over a form and over a sole on the form, a plurality of fastening-inserting devices for inserting fastenings to fasten the end portion of the upper to the sole, each of said fastening-inserting devices comprising means for holding a fastening and a driver for driving the fastening, separating means for delivering fastenings to said devices, mechanism for moving said devices as a unit heightwise of the form relatively to the separating means prior to the driving of the fastenings, and means for conducting the fastenings from the separating means to said devices, said conducting means comprising tubes having telescoping parts relatively movable in the movement of the fastening-inserting devices heightwise of the form.

201. In an upper-shaping machine, means for shaping an end of an upper over a form and over a sole on the form, a plurality of fastening-inserting devices for inserting fastenings to fasten the upper to the sole, each of said devices comprising means for holding a fastening and a driver for driving the fastening, spring means for operating the drivers to drive the fastenings, said spring means and the fastening-inserting devices being movable as a unit heightwise of the form prior to the operation of the drivers, mechanism for retracting the drivers against the resistance of said spring means and relatively to which the fastening-inserting devices are thus movable heightwise of the form, and means for maintaining said mechanism in operative relation to the drivers notwithstanding such movements of the devices.

202. In an upper-shaping machine, means for shaping an end of an upper over a form and over a sole on the form, a plurality of fastening-inserting devices for inserting fastenings to fasten the upper to the sole, each of said devices comprising means for holding a fastening and a driver for driving the fastening, spring-operated levers for operating the drivers, said levers and the fastening-inserting devices being movable as a unit heightwise of the form prior to the operation of the drivers, cam-operated mechanism for operating said levers to retract the drivers and relatively to which said devices and levers are thus movable heightwise of the form, and means for maintaining an operative connection between said mechanism and the levers notwithstanding such movement of the devices and levers.

203. In an upper-shaping machine, means for shaping an end of an upper over a form and over a sole on the form, a plurality of devices for inserting fastenings to fasten the upper to the sole, each of said devices comprising means for holding a fastening and a driver for driving the fastening, spring means for operating the drivers, a carrier supporting said spring means and the different devices, parallel links on which said carrier is mounted for movements heightwise of the form, and means for imparting such movements to the carrier.

204. In an upper-shaping machine, means for shaping an end of an upper over a form and over a sole on the form, a plurality of fastening-inserting devices for inserting fastenings to fasten the upper to the sole respectively at the opposite sides of the shoe bottom, each of said devices comprising means for holding a fastening and a driver for driving the fastening, spring means for operating the drivers, a support for said spring means and the different devices movable heightwise of the form, means for thus moving said support, and mechanisms relatively to which said support is thus movable arranged respectively to retract the drivers against the resistance of their operating means and to move the devices for inserting the fastenings at the opposite sides inwardly toward each other.

205. In an upper-shaping machine, means for shaping an end of an upper over a form and over a sole on the form, a plurality of fastening-inserting devices for inserting fastenings to fasten the upper to the sole respectively at the opposite sides of the shoe bottom, each of said devices comprising means for holding a fastening and a driver for driving the fastening, spring means for operating the drivers, a support for said spring means and the different devices movable heightwise of the form, cam-operated levers relatively to which said support is thus movable arranged respectively to retract the drivers against the resistance of their operating means and to move the devices for inserting the fastenings at the opposite sides inwardly toward each other, and means for maintaining operative connections between said levers and the parts that they operate notwithstanding the movements of said support heightwise of the form.

206. In an upper-shaping machine, means for shaping an end of an upper over a form and over a sole on the form, a plurality of fastening-inserting devices for inserting fastenings to fasten the upper to the sole respectively at the opposite sides of the shoe bottom, means supporting said devices for movements toward each other laterally of the form into fastening-inserting positions, said supporting means being movable with the devices heightwise of the form toward the plane of the sole prior to the fastening-inserting operation, mechanism for imparting to said devices their movements toward each other and relatively to which the devices are thus movable heightwise of the form, and means for maintaining an operative connection between said mechanism and the different devices notwithstanding the movements of the latter heightwise of the form.

207. In an upper-shaping machine, means for shaping an end of an upper over a form and over a sole on the form, a plurality of fastening-inserting devices for inserting fastenings to fasten the upper to the sole respectively at the opposite sides of the shoe bottom, each of said devices comprising means for holding a fastening, arms supporting said devices and mounted for swinging movements toward each other prior to the fastening-inserting operation, means for moving said arms also as a unit heightwise of the form prior to the insertion of the fastenings, a cam-operated lever for imparting to the arms their swinging movements and relatively to which the arms are thus movable heightwise of the form, and means for maintaining an operative connection between the arms and said lever notwithstanding the movements of the arms heightwise of the form.

208. In an upper-shaping machine, wipers for wiping the marginal portion of an end of an upper inwardly over a sole on a form, a plurality of fastening-inserting devices for inserting fastenings to fasten the upper to the sole, each of said devices comprising means for holding a fastening, and means for moving said devices into contact with the outer faces of the wipers and for also moving them relatively to each other along the plane of the wipers into positions for inserting the fastenings.

209. In an upper-shaping machine, wipers for wiping the marginal portion of an end of an upper inwardly over a sole on a form, a plurality of fastening-inserting devices for inserting fastenings to fasten the upper to the sole, each of said devices comprising means for holding a fastening, means for moving said devices heightwise of the form toward the plane of the wipers prior to the insertion of the fastenings, and means for also moving them relatively to each other outwardly along said plane and then inwardly toward the edges of the wipers into positions for inserting the fastenings.

210. In an upper-shaping machine, wipers for wiping an end of an upper inwardly over a sole on a form, a plurality of fastening-inserting devices for inserting fastenings to fasten the upper respectively at the opposite sides of the sole, means for moving said devices as a unit heightwise of the form toward the plane of the wipers, and means for also moving said devices outwardly away from each other and for then moving them inwardly toward each other into positions for the insertion of the fastenings.

211. In an upper-shaping machine, wipers for wiping an end of an upper inwardly over a sole on a form, a plurality of fastening-inserting devices for inserting fastenings to fasten the upper respectively at the opposite sides of the sole, and means for moving said devices heightwise of the form toward the plane of the wipers and also inwardly toward each other and toward the edges of the wipers into positions for the insertion of the fastenings.

212. In an upper-shaping machine, means for shaping an end of an upper over a form and over a sole on the form, a plurality of fastening-inserting devices for inserting fastenings to fasten the upper respectively at the opposite sides of the sole, arms supporting said devices and mounted for swinging movements toward each other to carry the devices into positions for inserting the fastenings, the devices being mounted on the arms for swinging movements laterally of the form, and yieldable means on the arms against the resistance of which the devices may swing in opposite directions.

213. In an upper-shaping machine, means for shaping an end of an upper over a form and over a sole on the form, a device for engaging the sole at a distance from its edge in the upper-shaping operation, and a plurality of fastening-inserting devices for inserting fastenings to fasten the upper to the sole, said fastening-inserting devices being arranged to contact with said sole-engaging device to determine their positions for the fastening-inserting operation.

214. In an upper-shaping machine, means for shaping an end of an upper over a form and over a sole on the form, a device for engaging the sole at a distance from its edge in the upper-shaping operation, a plurality of fastening-inserting devices for inserting fastenings to fasten the upper to the sole, and means for imparting to said fastening-inserting devices inward movements along the plane of the sole prior to the insertion of the fastenings, said sole-engaging device being arranged to contact with the fastening-inserting devices to limit their movements and determine their positions for the fastening-inserting operation.

215. In an upper-shaping machine, wipers for wiping the marginal portion of an end of an upper inwardly over a sole on a form and against a lip on the sole, a member arranged to engage the sole at the inner side of the lip and to support the lip against the pressure of the wipers, a plurality of fastening-inserting devices for inserting fastenings to fasten the opposite sides of the upper to the sole, and means for moving said fastening-inserting devices inwardly to positions determined by said sole-engaging member prior to the fastening-inserting operation.

216. In an upper-shaping machine, wipers for wiping the marginal portion of an end of an upper inwardly over a sole on a form and against a lip on the sole, a member arranged to engage the sole at the inner side of the lip and to support the lip against the pressure of the wipers, a plurality of fastening-inserting devices for inserting a plurality of fastenings at each of the opposite sides of the sole to fasten the upper, the different devices at each side being yieldable relatively to one another laterally of the form, and means for moving the devices at the opposite sides inwardly toward each other, said sole-engaging member being arranged to contact with the different devices to limit their movements and determine their positions for the fastening-inserting operation.

217. In an upper-shaping machine, means for shaping an end of an upper over a form and over a sole on the form, a plurality of fastening-inserting devices for inserting a plurality of fastenings at each of the opposite sides of the sole to fasten the upper, each of said devices comprising means for holding a fastening, and means for moving said devices as a unit heightwise of the form and for also moving them laterally of the form into positions for the insertion of the fastenings, the different devices at each side being yieldable relatively to one another both heightwise and laterally of the form.

218. In an upper-shaping machine, means for shaping an end of an upper over a form and and over a sole on the form, a plurality of fastening-inserting devices for inserting a plurality of fastenings at each of the opposite sides of the sole to fasten the upper, each of said devices comprising means for holding a fastening, arms supporting said devices, and means for moving said arms as a unit heightwise of the form and for also swinging them inwardly toward each other to carry the different devices into positions for the insertion of the fastenings, the different devices being yieldable heightwise of the form relatively to one another and relatively to said arms and being also mounted on the arms for movements relatively to one another laterally of the form.

219. In an upper-shaping machine, the combination with means for shaping an upper over a form, of a plurality of drivers for driving fastenings to fasten the upper, members connected respectively to different drivers for operating them and for also retracting them, means for imparting to one of said members its driver-retracting movement, and a device operated by movement of said last-named member for imparting to the other member its driver-retracting movement, said device being so constructed and arranged relatively to the different members as to permit them to move independently of each other in operating the drivers.

220. In an upper-shaping machine, the combination with means for shaping an upper over a form, of a plurality of drivers for driving fastenings to fasten the upper, members connected respectively to different drivers for operating them and for also retracting them, and intermeshing gear elements associated respectively with the different members to cause their driver-retracting movements to occur in unison, said gear elements being arranged in disconnected relation to at least one of the members and the ratio between them being such as to cause one of them to turn farther than the other and thus render the different members independent of each other in their movements to operate the drivers.

221. In an upper-shaping machine, the combination with means for shaping an upper over a form, of a plurality of drivers for driving fastenings to fasten the upper, members connected respectively to different drivers for operating them and for also retracting them, means for imparting to one of said driver-operating members its driver-retracting movement, a gear element movable with said last-named member in fixed relation thereto, and a second gear element intermeshing therewith, said second element being mounted in disconnected relation to the other driver-operating member but having means to retract the latter, said second element having also a shorter pitch radius than said first-named element to cause it to turn farther than the first and thus render the two driver-operating members independent of each other in their driver-operating movements.

222. In an upper-shaping machine, the combination with means for shaping an upper over a form, of a plurality of drivers for driving fastenings to fasten the upper, spring-operated arms connected respectively to different drivers to operate them and also movable to retract the drivers, mechanism for imparting to one of the arms its driver-retracting movement, a gear element movable with said last-named arm in fixed relation thereto, and a second gear element intermeshing with the first, said second element being arranged in disconnected relation to the other arm but having means for imparting to the arm its driver-retracting movement, said second element also having a shorter pitch radius than said first-named element to cause it to move farther than the first and thus to render the two arms independent of each other in their movements to operate the drivers.

223. In an upper-shaping machine, power-operated means for shaping an end of an upper over a form and for wiping it over a sole on the form, mechanism for driving fastenings through the portion of the upper wiped over the sole by said power-operated means to fasten the end of the upper to the sole, a clutch through which said power-operated means is operated, another clutch through which said fastening mechanism is operated, and automatic means for actuating said last-named clutch to start the fastening mechanism in operation at a predetermined time in the cycle of the machine.

224. In an upper-shaping machine, power-operated means for shaping an end of an upper over a form and over a sole on the form, mechanism for driving fastenings to fasten the end of the upper to the sole, a clutch through which said upper-shaping means is operated, another clutch through which said fastening mechanism is operated, automatic means for actuating said last-named clutch to start the fastening mechanism in operation at a predetermined time in the cycle of the machine, and means for automatically controlling said first-named clutch to bring the upper-shaping means to a stop prior to the upper-fastening operation.

225. In an upper-shaping machine, power-operated means for shaping an end of an upper over a form and over a sole on the form, mechanism for driving fastenings to fasten the end of the upper to the sole, a clutch through which said upper-shaping means is operated, another clutch through which said fastening mechanism is operated, automatic means for actuating said last-named clutch to cause said fastening mechanism to perform its operations and then come to a stop, and means for controlling said first-named clutch automatically to bring the upper-shaping means to a stop to permit the operation of the fastening mechanism and thereafter to start said means again in operation to return the parts to their starting positions.

226. In an upper-shaping machine, power-operated means including wipers for shaping an end of an upper over a form and for wiping it inwardly over a sole on the form, mechanism for driving fastenings to fasten the end of the upper to the sole, a clutch through which said upper-shaping means is operated, another clutch through which said fastening mechanism is operated, and automatic means for actuating said last-named clutch substantially at the end of the wiping operation of the wipers to start the fastening mechanism in operation.

227. In an upper-shaping machine, power-operated means for shaping an end of an upper over a form and over a sole on the form and for applying a binder around the end of the shoe bottom to hold the upper, mechanism for driving fastenings to fasten the binder in upper-holding position, a clutch through which said upper-shaping and binder-applying means is operated, another clutch through which said fastening mechanism is operated, and automatic means for actuating said last-named clutch to start the fastening mechanism in operation at a predetermined time in the cycle of the machine.

228. In an upper-shaping machine, power-operated means for shaping an end of an upper over a form and over a sole on the form and for applying a binder around the end of the shoe bottom to hold the upper, mechanism for driving fastenings to fasten the binder in upper-holding position, a clutch through which said upper-shaping and binder-applying means is operated, another clutch through which said fastening mechanism is operated, automatic means for actuating said last-named clutch to start the fastening mechanism in operation at a predetermined time in the operation of the machine, and means for controlling said first-named clutch automatically to bring the upper-shaping and binder-applying means to a stop prior to the driving of the fastenings and thereafter again to start said means in operation to return the parts to starting positions.

229. In an upper-shaping machine, power-operated means for shaping an end of an upper over a form and over a sole on the form, a plurality of fastening-inserting devices each comprising means for holding a fastening and a driver for driving the fastening through the upper and into the sole, mechanism for moving said devices heightwise of the form and for thereafter causing the drivers to drive the fastenings, a clutch through which said upper-shaping means is operated, another clutch through which said mechanism is operated, and automatic means for actuating said last-named clutch to start said mechanism in operation at a predetermined time in the cycle of the machine.

230. In an upper-shaping machine, power-operated means for shaping an end of an upper over a form and over a sole on the form, a plurality of fastening-inserting devices each comprising means for holding a fastening and a driver for driving the fastening through the upper end into the sole, mechanism for moving said devices heightwise of the form and for thereafter causing the drivers to drive the fastenings, a clutch through which said upper-shaping means is operated, another clutch through which said mechanism is operated, automatic means for actuating said last-named clutch to start said mechanism in operation at a predetermined time, and means for controlling said first-named clutch automatically to bring the upper-shaping means to a stop prior to the driving of the fastenings and to start said means thereafter again in operation to return the parts to their starting positions.

ERIC A. HOLMGREN.